US012024898B2

(12) United States Patent
Pervan et al.

(10) Patent No.: US 12,024,898 B2
(45) Date of Patent: Jul. 2, 2024

(54) MECHANICAL LOCKING OF FLOOR PANELS

(71) Applicant: Välinge Innovation AB, Viken (SE)

(72) Inventors: Darko Pervan, Viken (SE); Niclas Hakansson, Viken (SE); Mattias Sjostrand, Angelholm (SE); Christian Boo, Kagerod (SE); Agne Palsson, Hasslarp (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/348,142

(22) Filed: Jun. 15, 2021

(65) Prior Publication Data

US 2022/0143718 A1 May 12, 2022

Related U.S. Application Data

(63) Continuation of application No. 16/713,357, filed on Dec. 13, 2019, now Pat. No. 11,078,673, which is a
(Continued)

(30) Foreign Application Priority Data

Jan. 31, 2008 (SE) .................................. 0800242-0
May 5, 2008 (SE) .................................. 0800995-3

(51) Int. Cl.
*B27G 13/14* (2006.01)
*B27F 1/08* (2006.01)
(Continued)

(52) U.S. Cl.
CPC .......... *E04F 15/02038* (2013.01); *B27F 1/08* (2013.01); *B27G 13/14* (2013.01);
(Continued)

(58) Field of Classification Search
CPC ...................................................... B27G 13/14
See application file for complete search history.

(56) References Cited

U.S. PATENT DOCUMENTS 261,030 A 7/1882 Orcutt
301,775 A 7/1884 Thompson
(Continued)

FOREIGN PATENT DOCUMENTS

CH 396391 A * 7/1965
DE 19544001 C1 * 11/1996 ............... B23C 5/10
(Continued)

OTHER PUBLICATIONS

EP 1193037 A1 machine translate (Year: 2002).*
(Continued)

*Primary Examiner* — Babajide A Demuren
(74) *Attorney, Agent, or Firm* — Boone IP Law

(57) ABSTRACT

Floor panels are shown, which are provided with a mechanical locking system comprising tongue and grooves provided with protrusions and cavities which are displaceable in relation to each other and configured such that the protrusions can obtain a vertically unlocked position where they match the cavities and a vertically locked position where the protrusions overlap each other.

15 Claims, 51 Drawing Sheets

Related U.S. Application Data continuation of application No. 15/989,372, filed on May 25, 2018, now Pat. No. 10,526,792, which is a continuation of application No. 15/133,735, filed on Apr. 20, 2016, now Pat. No. 10,006,210, which is a continuation of application No. 14/095,052, filed on Dec. 3, 2013, now Pat. No. 9,340,974, which is a continuation of application No. 12/865,136, filed as application No. PCT/SE2009/005010 on Jan. 30, 2009, now Pat. No. 8,627,862.

(60) Provisional application No. 61/050,443, filed on May 5, 2008, provisional application No. 61/006,780, filed on Jan. 31, 2008.

(51) Int. Cl.

| | |
|---|---|
| ***B27M 3/00*** | (2006.01) |
| ***E04B 5/02*** | (2006.01) |
| ***E04F 15/02*** | (2006.01) |
| *E04F 13/08* | (2006.01) |
| *E04F 15/04* | (2006.01) |
| *E04F 21/00* | (2006.01) |
| *E04F 21/18* | (2006.01) |
| *E04F 21/22* | (2006.01) |

(52) U.S. Cl.

CPC ........... *B27M 3/0066* (2013.01); *E04B 5/023* (2013.01); *E04F 15/02* (2013.01); *E04F 15/02005* (2013.01); *E04F 13/0892* (2013.01); *E04F 15/04* (2013.01); *E04F 21/0092* (2013.01); *E04F 21/1844* (2013.01); *E04F 21/22* (2013.01); *E04F 2201/0107* (2013.01); *E04F 2201/0123* (2013.01); *E04F 2201/0138* (2013.01); *E04F 2201/0153* (2013.01); *E04F 2201/0161* (2013.01); *E04F 2201/022* (2013.01); *E04F 2201/025* (2013.01); *E04F 2201/041* (2013.01); *E04F 2201/0523* (2013.01); *E04F 2201/0529* (2013.01); *E04F 2201/0535* (2013.01); *E04F 2201/0541* (2013.01); *Y10T 29/49822* (2015.01); *Y10T 29/49826* (2015.01); *Y10T 83/04* (2015.04)

(56) References Cited

U.S. PATENT DOCUMENTS 526,044 A 9/1894 Merrill
876,341 A 1/1908 Forstner
917,352 A 4/1909 Palmer
1,075,907 A * 10/1913 Dunton ................ B27G 13/005 144/237
1,352,620 A 9/1920 Onsrud
1,533,547 A * 4/1925 Hathaway .............. B27G 13/14 144/237
1,911,598 A 5/1933 Ashmun
2,005,647 A 6/1935 Crouch
2,054,828 A 9/1936 Melde
2,549,251 A * 4/1951 Skclton .................. B27G 13/02 407/59
2,571,861 A 10/1951 Gegumis
2,791,247 A 5/1957 Gerson
2,822,839 A * 2/1958 Frodermann .......... B27G 13/02 144/230
2,863,185 A 12/1958 Riedi
2,876,812 A 3/1959 Waldron
3,082,802 A 3/1963 Dickson et al.
3,774,660 A 11/1973 Morey et al.
3,778,954 A 12/1973 Meserole
3,817,305 A 6/1974 Gibbs
3,913,642 A 10/1975 Porter
3,946,474 A * 3/1976 Hahn .................... B23C 5/2468 407/45
3,986,543 A 10/1976 Slayton et al.
4,068,688 A * 1/1978 Benson .................. B27G 13/14 241/292.1
4,082,129 A 4/1978 Morelock
4,151,869 A 5/1979 Halloran et al.
5,026,112 A 6/1991 Rice
5,182,892 A 2/1993 Chase
5,348,778 A 9/1994 Knipp et al.
5,433,563 A * 7/1995 Velepec ................. B27G 13/14 409/234
5,615,718 A * 4/1997 Venditto .............. B23Q 35/104 144/135.2
5,694,730 A 12/1997 Del Rincon et al.
6,164,349 A 12/2000 Hsieh
6,164,351 A * 12/2000 Weathers ................ B27B 5/325 144/368
6,345,481 B1 2/2002 Nelson
6,363,677 B1 4/2002 Chen et al.
6,367,524 B1 * 4/2002 Brewer ................ B27G 13/007 144/135.2
6,385,936 B1 5/2002 Schneider
6,386,250 B1 5/2002 Liu
6,423,257 B1 7/2002 Stobart et al.
6,450,235 B1 9/2002 Lee
6,591,568 B1 7/2003 Pålsson
6,617,009 B1 9/2003 Chen et al.
6,647,689 B2 11/2003 Pletzer et al.
6,647,690 B1 11/2003 Martensson
6,685,391 B1 2/2004 Gideon
6,766,622 B1 7/2004 Thiers
6,804,926 B1 10/2004 Eisermann
6,862,857 B2 3/2005 Tychsen
6,874,291 B1 4/2005 Weber
6,880,307 B2 4/2005 Schwitte et al.
7,051,486 B2 5/2006 Pervan
7,152,383 B1 12/2006 Wilkinson et al.
7,337,588 B1 3/2008 Moebus
7,451,578 B2 11/2008 Hannig
7,454,875 B2 11/2008 Pervan et al.
7,516,588 B2 4/2009 Pervan
7,533,500 B2 5/2009 Morton et al.
7,584,583 B2 9/2009 Bergelin et al.
7,621,092 B2 11/2009 Groeke et al.
7,634,884 B2 12/2009 Pervan
7,637,068 B2 12/2009 Pervan
7,644,742 B2 1/2010 Burkholder
7,654,055 B2 2/2010 Ricker
7,677,005 B2 3/2010 Pervan
7,716,889 B2 5/2010 Pervan
7,721,503 B2 5/2010 Pervan et al.
7,726,088 B2 6/2010 Muehlebach
7,757,452 B2 7/2010 Pervan
7,802,411 B2 9/2010 Pervan
7,841,144 B2 11/2010 Pervan et al.
7,841,145 B2 11/2010 Pervan et al.
7,841,150 B2 11/2010 Pervan
7,856,789 B2 12/2010 Eisermann
7,861,482 B2 1/2011 Pervan et al.
7,866,110 B2 1/2011 Pervan
7,908,815 B2 3/2011 Pervan et al.
7,930,862 B2 4/2011 Bergelin et al.
7,954,523 B2 6/2011 Liu
7,980,039 B2 7/2011 Groeke
7,980,041 B2 7/2011 Pervan
8,033,074 B2 10/2011 Pervan
8,042,311 B2 10/2011 Pervan
8,061,104 B2 11/2011 Pervan
8,079,196 B2 12/2011 Pervan
8,112,967 B2 2/2012 Pervan et al.
8,171,692 B2 5/2012 Pervan
8,181,416 B2 5/2012 Pervan et al.
8,234,830 B2 8/2012 Pervan et al.
8,281,549 B2 10/2012 Du
8,302,367 B2 11/2012 Schulte
8,336,272 B2 12/2012 Prager
8,341,914 B2 1/2013 Pervan et al.
8,341,915 B2 1/2013 Pervan et al.

(56) References Cited

U.S. PATENT DOCUMENTS

| | | | |
|---|---|---|---|
| 8,353,140 | B2 | 1/2013 | Pervan et al. |
| 8,359,805 | B2 | 1/2013 | Pervan et al. |
| 8,381,477 | B2 | 2/2013 | Pervan et al. |
| 8,387,327 | B2 | 3/2013 | Pervan |
| 8,448,402 | B2 | 5/2013 | Pervan et al. |
| 8,499,521 | B2 | 8/2013 | Pervan et al. |
| 8,505,257 | B2 | 8/2013 | Boo et al. |
| 8,516,767 | B2 | 8/2013 | Engstrom |
| 8,528,289 | B2 | 9/2013 | Pervan et al. |
| 8,544,230 | B2 | 10/2013 | Pervan |
| 8,544,234 | B2 | 10/2013 | Pervan et al. |
| 8,572,922 | B2 | 11/2013 | Pervan |
| 8,596,013 | B2 | 12/2013 | Boo |
| 8,627,862 | B2 | 1/2014 | Pervan et al. |
| 8,640,424 | B2 | 2/2014 | Pervan et al. |
| 8,650,826 | B2 | 2/2014 | Pervan et al. |
| 8,677,714 | B2 | 3/2014 | Pervan |
| 8,689,512 | B2 | 4/2014 | Pervan |
| 8,707,650 | B2 | 4/2014 | Pervan |
| 8,713,886 | B2 | 5/2014 | Boo et al. |
| 8,733,065 | B2 | 5/2014 | Pervan |
| 8,733,410 | B2 | 5/2014 | Pervan |
| 8,763,341 | B2 | 7/2014 | Pervan |
| 8,769,905 | B2 | 7/2014 | Pervan |
| 8,776,473 | B2 | 7/2014 | Pervan et al. |
| 8,806,832 | B2 | 8/2014 | Kell |
| 8,844,236 | B2 | 9/2014 | Pervan et al. |
| 8,857,126 | B2 | 10/2014 | Pervan et al. |
| 8,869,485 | B2 | 10/2014 | Pervan |
| 8,898,988 | B2 | 12/2014 | Pervan |
| 8,925,274 | B2 | 1/2015 | Pervan et al. |
| 8,959,866 | B2 | 2/2015 | Pervan |
| 8,973,331 | B2 | 3/2015 | Boo |
| 9,027,306 | B2 | 5/2015 | Pervan |
| 9,051,738 | B2 | 6/2015 | Pervan et al. |
| 9,068,360 | B2 | 6/2015 | Pervan |
| 9,091,077 | B2 | 7/2015 | Boo |
| 9,103,126 | B2 | 8/2015 | Kell |
| 9,194,134 | B2 | 11/2015 | Nygren et al. |
| 9,212,492 | B2 | 12/2015 | Pervan et al. |
| 9,216,541 | B2 | 12/2015 | Boo et al. |
| 9,238,917 | B2 | 1/2016 | Pervan et al. |
| 9,284,737 | B2 | 3/2016 | Pervan et al. |
| 9,309,679 | B2 | 4/2016 | Pervan et al. |
| 9,316,002 | B2 | 4/2016 | Boo |
| 9,340,974 | B2 | 5/2016 | Pervan et al. |
| 9,347,469 | B2 | 5/2016 | Pervan |
| 9,359,774 | B2 | 6/2016 | Pervan |
| 9,366,036 | B2 | 6/2016 | Pervan |
| 9,376,821 | B2 | 6/2016 | Pervan et al. |
| 9,382,716 | B2 | 7/2016 | Pervan et al. |
| 9,388,584 | B2 | 7/2016 | Pervan et al. |
| 9,428,919 | B2 | 8/2016 | Pervan et al. |
| 9,453,347 | B2 | 9/2016 | Pervan |
| 9,458,634 | B2 | 10/2016 | Derelov |
| 9,482,012 | B2 | 11/2016 | Nygren et al. |
| 9,540,826 | B2 | 1/2017 | Pervan et al. |
| 9,663,940 | B2 | 5/2017 | Boo |
| 9,725,912 | B2 | 8/2017 | Pervan |
| 9,771,723 | B2 | 9/2017 | Pervan |
| 9,777,487 | B2 | 10/2017 | Pervan et al. |
| 9,803,374 | B2 | 10/2017 | Pervan |
| 9,803,375 | B2 | 10/2017 | Pervan |
| 9,856,656 | B2 | 1/2018 | Pervan |
| 9,874,027 | B2 | 1/2018 | Pervan |
| 9,945,130 | B2 | 4/2018 | Nygren et al. |
| 9,951,526 | B2 | 4/2018 | Boo et al. |
| 10,000,935 | B2 | 6/2018 | Kell |
| 10,006,210 | B2 | 6/2018 | Pervan et al. |
| 10,017,948 | B2 | 7/2018 | Boo |
| 10,113,319 | B2 | 10/2018 | Pervan |
| 10,125,488 | B2 | 11/2018 | Boo |
| 10,138,636 | B2 | 11/2018 | Pervan |
| 10,161,139 | B2 | 12/2018 | Pervan |
| 10,180,005 | B2 | 1/2019 | Pervan et al. |
| 10,214,915 | B2 | 2/2019 | Pervan et al. |
| 10,214,917 | B2 | 2/2019 | Pervan et al. |
| 10,240,348 | B2 | 3/2019 | Pervan et al. |
| 10,240,349 | B2 | 3/2019 | Pervan et al. |
| 10,246,883 | B2 | 4/2019 | Derelöv |
| 10,352,049 | B2 | 7/2019 | Boo |
| 10,358,830 | B2 | 7/2019 | Pervan |
| 10,378,217 | B2 | 8/2019 | Pervan |
| 10,458,125 | B2 | 10/2019 | Pervan |
| 10,480,196 | B2 | 11/2019 | Boo |
| 10,519,676 | B2 | 12/2019 | Pervan |
| 10,526,792 | B2 | 1/2020 | Pervan et al. |
| 10,538,922 | B2 | 1/2020 | Pervan |
| 10,570,625 | B2 | 2/2020 | Pervan |
| 10,640,989 | B2 | 5/2020 | Pervan |
| 10,655,339 | B2 | 5/2020 | Pervan |
| 10,669,723 | B2 | 6/2020 | Pervan et al. |
| 10,724,251 | B2 | 7/2020 | Kell |
| 10,731,358 | B2 | 8/2020 | Pervan |
| 10,794,065 | B2 | 10/2020 | Boo et al. |
| 10,828,798 | B2 | 11/2020 | Fransson |
| 10,933,592 | B2 | 3/2021 | Blomgren et al. |
| 10,934,721 | B2 | 3/2021 | Pervan et al. |
| 10,953,566 | B2 | 3/2021 | Fransson et al. |
| 10,968,639 | B2 | 4/2021 | Pervan et al. |
| 10,975,577 | B2 | 4/2021 | Pervan et al. |
| 10,995,501 | B2 | 5/2021 | Pervan |
| 11,045,933 | B2 | 6/2021 | Fransson et al. |
| 11,053,691 | B2 | 7/2021 | Pervan |
| 11,053,692 | B2 | 7/2021 | Pervan |
| 11,060,302 | B2 | 7/2021 | Ylikangas et al. |
| 11,066,835 | B2 | 7/2021 | Boo |
| 11,078,673 | B2 | 8/2021 | Pervan |
| 11,091,920 | B2 | 8/2021 | Kell |
| 11,131,099 | B2 | 9/2021 | Pervan |
| 11,174,646 | B2 | 11/2021 | Pervan |
| 11,193,283 | B2 | 12/2021 | Pervan et al. |
| 11,261,608 | B2 | 3/2022 | Pervan |
| 11,274,453 | B2 | 3/2022 | Pervan |
| 11,326,353 | B2 | 5/2022 | Nilsson et al. |
| 11,331,824 | B2 | 5/2022 | Myllykangas et al. |
| 11,358,301 | B2 | 6/2022 | Fransson |
| 2002/0050114 | A1 | 5/2002 | Friso |
| 2002/0069611 | A1 | 6/2002 | Leopolder |
| 2002/0092263 | A1 | 7/2002 | Schulte |
| 2002/0095894 | A1 | 7/2002 | Pervan |
| 2002/0170259 | A1 | 11/2002 | Ferris |
| 2002/0178674 | A1 | 12/2002 | Pervan |
| 2003/0009971 | A1 | 1/2003 | Palmberg |
| 2003/0009972 | A1 | 1/2003 | Pervan |
| 2003/0024199 | A1 | 2/2003 | Pervan et al. |
| 2003/0037504 | A1 | 2/2003 | Schwitte et al. |
| 2003/0084636 | A1 | 5/2003 | Pervan |
| 2003/0101681 | A1 | 6/2003 | Tychsen |
| 2003/0163968 | A1 | 9/2003 | Nel |
| 2004/0016196 | A1 | 1/2004 | Pervan |
| 2004/0049999 | A1 | 3/2004 | Krieger |
| 2004/0060255 | A1 | 4/2004 | Knauseder |
| 2004/0128934 | A1 | 7/2004 | Hecht |
| 2004/0139678 | A1 | 7/2004 | Pervan |
| 2004/0177584 | A1 | 9/2004 | Pervan |
| 2004/0182036 | A1 | 9/2004 | Sjoberg et al. |
| 2004/0211143 | A1 | 10/2004 | Hannig |
| 2004/0250492 | A1 | 12/2004 | Becker |
| 2005/0050827 | A1 | 3/2005 | Schitter |
| 2005/0144881 | A1 | 7/2005 | Tate |
| 2005/0160694 | A1 | 7/2005 | Pervan |
| 2005/0166514 | A1 | 8/2005 | Pervan |
| 2005/0210810 | A1 | 9/2005 | Pervan |
| 2006/0070333 | A1 | 4/2006 | Pervan |
| 2006/0101769 | A1 | 5/2006 | Pervan |
| 2006/0174577 | A1 | 8/2006 | O'Neil |
| 2006/0174578 | A1 | 8/2006 | Konstanczak |
| 2006/0236642 | A1 | 10/2006 | Pervan |
| 2006/0260254 | A1 | 11/2006 | Pervan et al. |
| 2007/0006543 | A1 | 1/2007 | Engström |
| 2007/0011981 | A1 | 1/2007 | Eisermann |
| 2007/0028547 | A1 | 2/2007 | Grafenauer |
| 2007/0175148 | A1 | 8/2007 | Bergelin et al. |

(56) References Cited

U.S. PATENT DOCUMENTS

| | | | |
|---|---|---|---|
| 2007/0175156 | A1 | 8/2007 | Pervan et al. |
| 2007/0193178 | A1 | 8/2007 | Groeke et al. |
| 2007/0209736 | A1 | 9/2007 | Deringor et al. |
| 2007/0214741 | A1 | 9/2007 | Llorens Miravet |
| 2008/0000182 | A1 | 1/2008 | Pervan |
| 2008/0000186 | A1 | 1/2008 | Pervan et al. |
| 2008/0000187 | A1 | 1/2008 | Pervan et al. |
| 2008/0010931 | A1 | 1/2008 | Pervan et al. |
| 2008/0010937 | A1 | 1/2008 | Pervan et al. |
| 2008/0017274 | A1 | 1/2008 | Burkholder |
| 2008/0028707 | A1 | 2/2008 | Pervan |
| 2008/0028713 | A1 | 2/2008 | Pervan |
| 2008/0034708 | A1 | 2/2008 | Pervan |
| 2008/0041007 | A1 | 2/2008 | Pervan et al. |
| 2008/0041008 | A1 | 2/2008 | Pervan |
| 2008/0066415 | A1 | 3/2008 | Pervan |
| 2008/0104921 | A1 | 5/2008 | Pervan et al. |
| 2008/0110125 | A1 | 5/2008 | Pervan |
| 2008/0134607 | A1 | 6/2008 | Prevan |
| 2008/0134613 | A1 | 6/2008 | Pervan |
| 2008/0134614 | A1 | 6/2008 | Pervan |
| 2008/0155930 | A1 | 7/2008 | Pervan et al. |
| 2008/0209838 | A1 | 9/2008 | Pervan |
| 2008/0216434 | A1 | 9/2008 | Pervan |
| 2008/0216920 | A1 | 9/2008 | Pervan |
| 2008/0236088 | A1 | 10/2008 | Hannig |
| 2008/0241440 | A1 | 10/2008 | Bauer |
| 2008/0295432 | A1 | 12/2008 | Pervan et al. |
| 2009/0019806 | A1 | 1/2009 | Muehlebach |
| 2009/0133353 | A1 | 5/2009 | Pervan et al. |
| 2009/0193741 | A1 | 8/2009 | Capelle |
| 2009/0193748 | A1 | 8/2009 | Boo et al. |
| 2010/0043921 | A1 | 2/2010 | Liu |
| 2010/0135740 | A1 | 6/2010 | Harif |
| 2010/0293879 | A1 | 11/2010 | Pervan et al. |
| 2010/0300029 | A1 | 12/2010 | Braun et al. |
| 2010/0300031 | A1 | 12/2010 | Pervan et al. |
| 2010/0319290 | A1 | 12/2010 | Pervan |
| 2010/0319291 | A1 | 12/2010 | Pervan et al. |
| 2011/0030303 | A1 | 2/2011 | Pervan et al. |
| 2011/0041996 | A1 | 2/2011 | Pervan |
| 2011/0088344 | A1 | 4/2011 | Pervan et al. |
| 2011/0088345 | A1 | 4/2011 | Pervan |
| 2011/0154763 | A1 | 6/2011 | Bergelin et al. |
| 2011/0167750 | A1 | 7/2011 | Pervan |
| 2011/0225922 | A1 | 9/2011 | Pervan et al. |
| 2011/0252733 | A1 | 10/2011 | Pervan |
| 2011/0283650 | A1 | 11/2011 | Pervan et al. |
| 2012/0017533 | A1 | 1/2012 | Pervan et al. |
| 2012/0031029 | A1 | 2/2012 | Pervan et al. |
| 2012/0036804 | A1 | 2/2012 | Pervan |
| 2012/0151865 | A1 | 6/2012 | Pervan et al. |
| 2012/0174515 | A1 | 7/2012 | Pervan |
| 2012/0174520 | A1 | 7/2012 | Pervan |
| 2012/0279161 | A1 | 11/2012 | Håkansson et al. |
| 2013/0008117 | A1 | 1/2013 | Pervan |
| 2013/0014463 | A1 | 1/2013 | Pervan |
| 2013/0019555 | A1 | 1/2013 | Pervan |
| 2013/0042562 | A1 | 2/2013 | Pervan |
| 2013/0042563 | A1 | 2/2013 | Pervan |
| 2013/0042564 | A1 | 2/2013 | Pervan et al. |
| 2013/0042565 | A1 | 2/2013 | Pervan |
| 2013/0047536 | A1 | 2/2013 | Pervan |
| 2013/0081349 | A1 | 4/2013 | Pervan et al. |
| 2013/0111845 | A1 | 5/2013 | Pervan |
| 2013/0145708 | A1 | 6/2013 | Pervan |
| 2013/0160391 | A1 | 6/2013 | Pervan et al. |
| 2013/0232905 | A2 | 9/2013 | Pervan |
| 2013/0239508 | A1 | 9/2013 | Pervan et al. |
| 2013/0263454 | A1 | 10/2013 | Boo et al. |
| 2013/0263547 | A1 | 10/2013 | Boo |
| 2013/0318906 | A1 | 12/2013 | Pervan et al. |
| 2014/0007539 | A1 | 1/2014 | Pervan et al. |
| 2014/0020324 | A1 | 1/2014 | Pervan |
| 2014/0033633 | A1 | 2/2014 | Kell |
| 2014/0033634 | A1 | 2/2014 | Pervan |
| 2014/0053497 | A1 | 2/2014 | Pervan et al. |
| 2014/0059966 | A1 | 3/2014 | Boo |
| 2014/0069043 | A1 | 3/2014 | Pervan |
| 2014/0090335 | A1 | 4/2014 | Pervan et al. |
| 2014/0109501 | A1 | 4/2014 | Pervan |
| 2014/0109506 | A1 | 4/2014 | Pervan et al. |
| 2014/0123586 | A1 | 5/2014 | Pervan et al. |
| 2014/0150369 | A1 | 6/2014 | Hannig |
| 2014/0190112 | A1 | 7/2014 | Pervan |
| 2014/0208677 | A1 | 7/2014 | Pervan et al. |
| 2014/0223852 | A1 | 8/2014 | Pervan |
| 2014/0237931 | A1 | 8/2014 | Pervan |
| 2014/0250813 | A1 | 9/2014 | Nygren et al. |
| 2014/0260060 | A1 | 9/2014 | Pervan et al. |
| 2014/0305065 | A1 | 10/2014 | Pervan |
| 2014/0366476 | A1 | 12/2014 | Pervan |
| 2014/0366477 | A1 | 12/2014 | Kell |
| 2014/0373478 | A2 | 12/2014 | Pervan et al. |
| 2014/0373480 | A1 | 12/2014 | Pervan et al. |
| 2015/0000221 | A1 | 1/2015 | Boo |
| 2015/0013260 | A1 | 1/2015 | Pervan |
| 2015/0059281 | A1 | 3/2015 | Pervan |
| 2015/0089896 | A2 | 4/2015 | Pervan et al. |
| 2015/0121796 | A1 | 5/2015 | Pervan |
| 2015/0152644 | A1 | 6/2015 | Boo |
| 2015/0167318 | A1 | 6/2015 | Pervan |
| 2015/0211239 | A1 | 7/2015 | Pervan |
| 2015/0233125 | A1 | 8/2015 | Pervan et al. |
| 2015/0267419 | A1 | 9/2015 | Pervan |
| 2015/0300029 | A1 | 10/2015 | Pervan |
| 2015/0330088 | A1 | 11/2015 | Derelov |
| 2015/0337537 | A1 | 11/2015 | Boo |
| 2015/0368910 | A1 | 12/2015 | Kell |
| 2016/0032596 | A1 | 2/2016 | Nygren et al. |
| 2016/0060879 | A1 | 3/2016 | Pervan |
| 2016/0069088 | A1 | 3/2016 | Boo et al. |
| 2016/0076260 | A1 | 3/2016 | Pervan et al. |
| 2016/0090744 | A1 | 3/2016 | Pervan et al. |
| 2016/0153200 | A1 | 6/2016 | Pervan |
| 2016/0168866 | A1 | 6/2016 | Pervan et al. |
| 2016/0186426 | A1 | 6/2016 | Boo |
| 2016/0194884 | A1 | 7/2016 | Pervan et al. |
| 2016/0201336 | A1 | 7/2016 | Pervan |
| 2016/0251859 | A1 | 9/2016 | Pervan et al. |
| 2016/0251860 | A1 | 9/2016 | Pervan |
| 2016/0281368 | A1 | 9/2016 | Pervan et al. |
| 2016/0281370 | A1 | 9/2016 | Pervan et al. |
| 2016/0326751 | A1 | 11/2016 | Pervan |
| 2016/0340913 | A1 | 11/2016 | Derelöv |
| 2017/0037641 | A1 | 2/2017 | Nygren et al. |
| 2017/0081860 | A1 | 3/2017 | Boo |
| 2017/0254096 | A1 | 9/2017 | Pervan |
| 2017/0321433 | A1 | 11/2017 | Pervan et al. |
| 2017/0362834 | A1 | 12/2017 | Pervan et al. |
| 2018/0001509 | A1 | 1/2018 | Myllykangas et al. |
| 2018/0001510 | A1 | 1/2018 | Fransson |
| 2018/0001573 | A1 | 1/2018 | Blomgren et al. |
| 2018/0002933 | A1 | 1/2018 | Pervan |
| 2018/0016783 | A1 | 1/2018 | Boo |
| 2018/0030737 | A1 | 2/2018 | Pervan |
| 2018/0030738 | A1 | 2/2018 | Pervan |
| 2018/0119431 | A1 | 5/2018 | Pervan et al. |
| 2018/0178406 | A1 | 6/2018 | Fransson et al. |
| 2019/0024387 | A1 | 1/2019 | Pervan et al. |
| 2019/0048592 | A1 | 2/2019 | Boo |
| 2019/0048596 | A1 | 2/2019 | Pervan |
| 2019/0063076 | A1 | 2/2019 | Boo et al. |
| 2019/0093370 | A1 | 3/2019 | Pervan et al. |
| 2019/0093371 | A1 | 3/2019 | Pervan |
| 2019/0119928 | A1 | 4/2019 | Pervan et al. |
| 2019/0127989 | A1 | 5/2019 | Kell |
| 2019/0127990 | A1 | 5/2019 | Pervan et al. |
| 2019/0169859 | A1 | 6/2019 | Pervan et al. |
| 2019/0232473 | A1 | 8/2019 | Fransson et al. |
| 2019/0271165 | A1 | 9/2019 | Boo |
| 2019/0376298 | A1 | 12/2019 | Pervan et al. |
| 2019/0394314 | A1 | 12/2019 | Pervan et al. |
| 2020/0087927 | A1 | 3/2020 | Pervan |

(56) References Cited

U.S. PATENT DOCUMENTS

| | | | |
|---|---|---|---|
| 2020/0102756 | A1 | 4/2020 | Pervan |
| 2020/0109569 | A1 | 4/2020 | Pervan |
| 2020/0149289 | A1 | 5/2020 | Pervan |
| 2020/0173175 | A1 | 6/2020 | Pervan |
| 2020/0224430 | A1 | 7/2020 | Ylikangas et al. |
| 2020/0263437 | A1 | 8/2020 | Pervan |
| 2020/0284045 | A1 | 9/2020 | Kell |
| 2020/0318667 | A1 | 10/2020 | Derelöv |
| 2020/0354969 | A1 | 11/2020 | Pervan |
| 2020/0412852 | A9 | 12/2020 | Pervan et al. |
| 2021/0016465 | A1 | 1/2021 | Fransson |
| 2021/0047840 | A1 | 2/2021 | Pervan |
| 2021/0047841 | A1 | 2/2021 | Pervan et al. |
| 2021/0071428 | A1 | 3/2021 | Pervan |
| 2021/0087831 | A1 | 3/2021 | Nilsson et al. |
| 2021/0087832 | A1 | 3/2021 | Boo |
| 2021/0087833 | A1 | 3/2021 | Ylikangas et al. |
| 2021/0087834 | A1 | 3/2021 | Ylikangas et al. |
| 2021/0310257 | A1 | 10/2021 | Boo |
| 2021/0348396 | A1 | 11/2021 | Pervan et al. |
| 2021/0381255 | A1 | 12/2021 | Ylikangas |
| 2022/0025657 | A1 | 1/2022 | Pervan |
| 2022/0025658 | A1 | 1/2022 | Kell |

FOREIGN PATENT DOCUMENTS

| | | | | | |
|---|---|---|---|---|---|
| DE | 299 22 649 | U1 | | 3/2000 | |
| DE | 1276894 | B | * | 1/2003 | |
| DE | 10129934 | A1 | * | 1/2003 | ........... B23Q 9/0028 |
| DE | 20318843 | U1 | * | 4/2004 | ........... B23C 5/1009 |
| DE | 10 2004 055 951 | A1 | | 7/2005 | |
| DE | 10 2006 024 184 | A1 | | 11/2007 | |
| DE | 10 2006 037 614 | B3 | | 12/2007 | |
| DE | 10 2007 018 309 | A1 | | 8/2008 | |
| DE | 10 2007 016 533 | A1 | | 10/2008 | |
| DE | 10 2007 032 885 | A1 | | 1/2009 | |
| EP | 1193037 | A1 | * | 4/2002 | ................ B27F 1/16 |
| EP | 1 420 125 | A2 | | 5/2004 | |
| EP | 1 650 375 | A1 | | 4/2006 | |
| EP | 1 650 375 | A8 | | 9/2006 | |
| FR | 1.138.595 | | | 6/1957 | |
| FR | 2 256 807 | | | 8/1975 | |
| FR | 2697463 | A1 | * | 5/1994 | ........... B23Q 35/104 |
| WO | WO 94/26999 | A1 | | 11/1994 | |
| WO | WO 97/47834 | A1 | | 12/1997 | |
| WO | WO 01/02672 | A1 | | 1/2001 | |
| WO | WO 01/48332 | A1 | | 7/2001 | |
| WO | WO 01/75247 | A1 | | 10/2001 | |
| WO | WO 03/083234 | A1 | | 10/2003 | |
| WO | WO-03099532 | A1 | * | 12/2003 | ........... B27G 13/007 |
| WO | WO 2004/048716 | A1 | | 6/2004 | |
| WO | WO 2004/079130 | A1 | | 9/2004 | |
| WO | WO 2006/043893 | A1 | | 4/2006 | |
| WO | WO 2006/104436 | A1 | | 10/2006 | |
| WO | WO 2007/015669 | A2 | | 2/2007 | |
| WO | WO 2007/015669 | A3 | | 2/2007 | |
| WO | WO 2007/020088 | A1 | | 2/2007 | |
| WO | WO 2007/089186 | A1 | | 8/2007 | |
| WO | WO 2007/118352 | A1 | | 10/2007 | |
| WO | WO 2008/004960 | A2 | | 1/2008 | |
| WO | WO 2008/017301 | A2 | | 2/2008 | |
| WO | WO 2008/017301 | A3 | | 2/2008 | |
| WO | WO 2008/116623 | A1 | | 10/2008 | |
| WO | WO 2008/122479 | A1 | | 10/2008 | |
| WO | WO 2009/116926 | A1 | | 9/2009 | |

OTHER PUBLICATIONS

International Search Report mailed May 29, 2009 in PCT/SE2009/050103, Swedish Patent Office, Stockholm, Sweden, 11 pages.
Extended European Search Report mailed Aug. 30, 2016 in EP 13157213.3, European Patent Office, Munich, DE, 8 pages.
Extended European Search Report mailed Jun. 3, 2019 in EP 18197552.5, European Patent Office, Munich, DE, 6 pages.
International Search Report mailed May 26, 2010 in PCT/SE2009/051238, Swedish Patent Office, Stockholm, Sweden, 8 pages.
Extended European Search Report mailed Aug. 30, 2016 in EP 09839365.5, European Patent Office, Munich, DE, 6 pages.
Extended European Search Report mailed Oct. 24, 2017 in EP 09723213.6, European Patent Office, Munich, DE, 8 pages.
Extended European Search Report mailed Oct. 30, 2019 in EP 19181487.0, European Patent Office, Munich, DE, 12 pages.
Extended European Search Report mailed Feb. 25, 2022 in EP 21180198.0, European Patent Office, Munich, DE, 12 pages.
Välinge Innovation AB, Technical Disclosure entitled “Mechanical locking for floor panels with a flexible bristle tongue,” IP.com No. IPCOM000145262D, Jan. 12, 2007, IP.com PriorArtDatabase, 57 pages.

* cited by examiner 5b
5a
6

5a
C
A
37b
38b

A
38b
C
37b
A
B
C
D
B
37a
D
38a

5b
D
B
38a
37a 5b
37a
5a
38b
37b
6
5b
5a
6

5b
37a
5a
38a
37b
6
5b
5a
6

MECHANICAL LOCKING OF FLOOR PANELS

CROSS REFERENCE TO RELATED APPLICATIONS

The present application is a continuation of U.S. application Ser. No. 16/713,357, filed on Dec. 13, 2019, which is a continuation of U.S. application Ser. No. 15/989,372, filed on May 25, 2018, now U.S. Pat. No. 10,526,792, which is a continuation of U.S. application Ser. No. 15/133,735, filed on Apr. 20, 2016, now U.S. Pat. No. 10,006,210, which is a continuation of Ser. No. 14/095,052, filed on Dec. 3, 2013, now U.S. Pat. No. 9,340,974, which is a continuation of U.S. application Ser. No. 12/865,136, filed on Oct. 7, 2010, now U.S. Pat. No. 8,627,862, which is a national stage of International Application No. PCT/SE2009/050103, filed on Jan. 30, 2009, which claims the benefit of U.S. Provisional Application No. 61/050,443, filed on May 5, 2008, the benefit of U.S. Provisional Application No. 61/006,780, filed on Jan. 31, 2008, the benefit of Swedish Application No. 0800995-3, filed on May 5, 2008, and the benefit of Swedish Application No. 0800242-0, filed on Jan. 31, 2008. The entire contents of each of U.S. application Ser. No. 16/713,357, U.S. application Ser. No. 15/989,372, U.S. application Ser. No. 15/133,735, U.S. application Ser. No. 14/095,052, U.S. application Ser. No. 12/865,136, International Application No. PCT/SE2009/050103, U.S. Provisional Application No. 61/050,443, U.S. Provisional Application No. 61/006,780, Swedish Application No. 0800995-3, and Swedish Application No. 0800242-0 are hereby incorporated herein by reference in their entirety.

TECHNICAL AREA

The invention generally relates to the field of floor panels with mechanical locking systems comprising a separate displaceable tongue allowing easy installation. The invention provides new improved locking systems and methods to install and disconnect building panels, especially floor panels and methods to produce the locking system.

BACKGROUND

In particular, yet not restrictive manner, the invention concerns a mechanical locking system for rectangular floor panels with long and short edges. Such floor panels are generally installed with an angling of long edges. Short edges could be connected with angling, horizontal snapping or insertion along the short edge. The installation requires three actions since a displacement in locked position is also required to lock all four edges.

It is also known from US 2003/0101681 A1 that a locking system could be formed on the short edge with a tongue and a groove comprising projections and indentations such that the short edges could be moved horizontally into contact and thereafter displaced along the short edges and locked. The long edges are thereafter locked with angling. This locking system and installation method is based on the same principles as the known insertion of the sort edges. The only advantage is that the displacement of the short edges could be reduced from about 0.1-0.2 m (the width of conventional floor panels) to some centimetres and this small advantage is generally eliminated by the additional costs to form the projections and indentations with the type of machining that is used in floor production. Such locking systems are not used on the market.

It should be emphasized that long and short edges are only used to simplify the description. The panels could also be square, they could have more than 4 edges and the adjacent edges could have angles other than 90 degrees. However, the invention is as well applicable to building panels in general. More particularly the invention relates mainly to the type of mechanically locking systems, which allow that angling of long edges and vertical movement of short edges could lock all four edges of a panel to other panels with a single action method generally referred to as vertical folding. The main principles of the invention could however also be used in other types of known mechanical locking systems as described above and below.

A floor panel of this type (FIG. 1*a*) is presented in WO 2006/043893 (Applicant Välinge Innovation AB), which discloses a floor panel with a locking system comprising a locking element cooperating with a locking groove, for horizontal locking, and a flexible displaceable tongue (30) cooperating with a tongue groove (20), for locking in a vertical direction. The flexible tongue as shown in FIG. 1*b*, bends in the horizontal plane and snaps into the tongue groove during connection of the floor panels and makes it possible to install the panels by a vertical "snap" folding or solely by a vertical movement. Similar floor panels are further described in WO 2003/016654, which discloses locking system comprising a tongue with a flexible tab. The tongue is extending and bending essentially in a vertical direction and the tip of the tab cooperates with a tongue groove for vertical locking.

Vertical locking and vertical folding of this type creates a separation pressure at the short edges when the flexible tongue or flexible parts of the tongue are displaced horizontally in a double action during the angling of the long edges. Parts of the tongue are displaced inwardly during the initial part of the locking and they are thereafter displaced towards the initial position during the final part of the locking action. The inventor has analysed several types of floor panels and discovered that there is a considerable risk that the short edges could be pushed away from each other during installation and that a gap could occur between the edge portions of the short edges. Such a gap could prevent further installation and the floor panels will not be possible to connect. It could also cause serious damage to the locking system at the short edges. Pushing the floorboards sideways towards the short edges during installation could prevent the gap. Such an installation method is however complicated and difficult to use since three actions have to be combined and used simultaneously in connection with angling down of the long edges.

It is also known, as shown in FIG. 1*c* that two adjacent short edges in a first row could be locked with a displaceable tongue (30) which is displaced and for example bended, as shown in FIG. 1*d*, by a side push at one edge section (32) when the adjacent short edges have been folded down and positioned in the same plane. Such an installation is described in DE 1020060376114B3 and a pre-published PCT application made by Välinge innovation AB. This vertical "(side) push" folding, which generally is activated by a pressure from a long side of a third panel in a second row, displaces the separate tongue along the short edge joint but also perpendicular to the joint direction such that a part of the tongue is displaced into a groove of the adjacent short edge. This displacement perpendicular to the joint direction avoids the separation forces during the vertical folding but creates a separation force when the panels are laying flat on the sub floor and when the tongue is pressed into the tongue groove of the adjacent panel. Most vertical push folding systems, especially such systems that comprise a flexible tongue that bends in the length direction of the joint, are difficult to lock when the first and the last rows are installed.

FIGS. 2*a*, 2*b*, 2*c*, 3*a* and 3*b* shows examples of cross sections of known flexible tongues 30, which could be used to lock short edges according to known vertical snap folding technology. FIG. 2*a* shows a separate tongue 30 with a flexible snap tab extending downwards. FIG. 2*b* shows a separate tongue with a flexible snap tab inside a displacement groove. FIG. 2*c* shows a flexible tongue 30 that bends horizontally during locking according to FIGS. 1*a* and 1*b*. FIG. 3*a* show an embodiment of the flexible tongue, which locks with a combined turning and snapping action. Such a locking system could be locked without any separation forces. It is however difficult to produce and creates considerable resistance during locking. FIG. 3*b* shows a flexible tongue that is connected with pre tension into a groove and that snaps out into a tongue groove when the pre tension is released. FIG. 3*c* shows a flexible tongue according to FIGS. 1*c* and 1*d* that is displaced with a side pressure from one groove into an adjacent tongue groove.

Vertical folding according to known technology requires, as shown above, that some parts of the locking system, generally some parts of a separate tongue, are bended or compressed when the edges are locked. This could be avoided with wedge shaped separate tongues using the side push technology. Such wedge shape tongues consist generally of two parts or they are connected to grooves, which are not parallel with the edge. This leads to the fact that expensive materials or complicated production methods must be used.

All these known embodiments will create a separation pressure or locking resistance during installation with vertical folding. This could cause the short edges to separate such that the locking system will be damaged or such that the panels will be difficult to install. Locking strength, locking quality and production costs are in some of the known vertical locking systems not competitive with traditional mechanical locking systems installed with combinations of angling and horizontal snapping Locking systems using the vertical folding installation method could capture a considerable larger market share if separation and resistance problems could be eliminated and if production costs and locking quality could be improved.

A major objective of the invention is to provide solutions that avoid such separation and resistance problems during locking as much as possible and where preferably non-flexible materials or tongues consisting of one separate part only could be used.

Several of the above described known locking principles and installation methods could be used in the described embodiments of the invention and the basic principles of the invention related to specific parts of the locking systems, installation and production methods are also possible to use in the known prior art locking systems.

Definition of Some Terms

In the following text, the visible surface of the installed floor panel is called "front face", while the opposite side of the floor panel, facing the sub floor, is called "rear face". The edge between the front and rear face is called "joint edge". If not defined otherwise upper and lower means towards the front face and towards the rear face. Inner and outer means towards or away from the centre of the panel. By "horizontal plane" is meant a plane, which extends parallel to the outer part of the surface layer. Immediately juxtaposed upper parts of two adjacent joint edges of two joined floor panels together define a "vertical plane" perpendicular to the horizontal plane. By "horizontally" is meant parallel with the horizontal plane and by "Vertically" parallel to the vertical plane.

By "joint" or "locking system" are meant co acting connecting means, which connect the floor panels vertically and/or horizontally. By "mechanical locking system" is meant that joining can take place without glue. Mechanical locking systems can in many cases also be combined with gluing. By "integrated with" means formed in one piece with the panel or factory connected to the panel. By "separate" parts, components element and similar is meant that they are produced separately and not in one piece with the core or the main body of the panel. Separate parts are generally factory connected and integrated with the panel but they could be supplied as lose parts, which are intended to be used during installation of panels.

By a "separate tongue" is meant a tongue, which is made of a separate material, connected to one edges of a panel, which has a length direction along the joint edges and is forming a part of the vertical locking system.

By a "displaceable tongue" is meant any type of a tongue which connects adjacent edges vertically and which is made of a separate material and connected to a floor panel and which is wholly or partly displaceable between an unlocked position and a locked position. A displaceable tongue could be flexible or rigid By "tongue" is generally meant a part in an edge section that extends beyond the upper edge and cooperates with a groove in an adjacent edge such that the edges are locked vertically. A tongue is generally made in one piece with the panel.

By "angling" is meant a connection that occurs by a turning motion, during which an angular change occurs between two parts that are being connected, or disconnected. When angling relates to connection of two floor panels, the angular motion takes place with the upper parts of joint edges at least partly being in contact with each other, during at least part of the motion.

By an "angling locking system" is meant a mechanical locking system which could be connected vertically and horizontally with angling comprising a tongue and a groove that locks two adjacent edges in a vertical direction and a locking strip with a locking element in one edge of a panel called "strip panel" that cooperates with a locking groove on another edge of a panel called "groove panel" and locks the edges in a horizontal direction. The locking element and the locking groove have generally rounded guiding surfaces that guide the locking element into the locking groove and locking surfaces that locks and prevents horizontal separation between the edges.

By "vertical locking" is meant a locking that take place when two edges are displaced essentially vertically against each other.

By "vertical folding" is meant installation of panels with angling of long edges where this long edge angling also is used to connect the short edges horizontally and/or vertically. By "vertical snap folding" is meant an installation where the short edges are locked vertically with snapping of a flexible tongue during the final stage of the long edge angling. Such a locking system is not a pure combination of for example an angling locking system on a long edges and a vertical locking system on short edges since the vertical and the angling actions are combined and the short edges are folded together in the same way as scissors. The locking takes place gradually from one edge section adjacent to one long edge, which is angled, to the other edge section adjacent to the other opposite long edge. By “vertical push folding” is meant an installation where the short edges of two panels are locked when they are laying flat on a sub floor after the angling. The vertical locking is obtained by a side push that displaces a separate tongue in the length direction of the short edges. The horizontal locking is in conventional fold down systems obtained in the same way as for the angling systems with a locking element in one edge of a strip panel that cooperates with a locking groove on another edge of a groove panel.

SUMMARY

The present invention aims at a set of building panels, especially floor panels or a floating flooring with a mechanical locking system on the short edge which is configured to improve installation of floor panel installed with vertical folding and which will counteract or prevent separation of the short edges during installation. The aim of the invention is also to improve installation, strength, quality and production costs of such and similar locking systems. A particular objective is to provide locking systems that could be used to lock thin floorboards, for example with a thickness of 5-10 mm.

The invention mainly relates to floor panels provided with a locking system comprising a tongue and a tongue groove in adjacent edges. The tongue and the tongue groove comprise protrusions and cavities configured such that the adjacent edges can be connected vertically to a vertically unlocked position where the protrusions match the cavities. The tongue and the tongue groove can be displaced in relation to each other and along the adjacent edges such that some of the protrusions overlap each other whereby the adjacent edges are locked vertically.

Such a locking system eliminates essentially all vertical snapping resistance and all separation forces between the adjacent edges during the vertical locking. The only pressure force that is needed in order to displace and lock the adjacent edges vertically is a force in one direction only along the edges when the panels are laying flat on a sub floor with their adjacent top edges in contact. All known locking systems, which are possible to lock vertically with a vertical motion, create a snapping resistance during the vertical movement or a separation pressure force perpendicular to the edges when a tongue is pressed along a joint and perpendicular to a joint from one edge into an adjacent edge.

The invention provides for new embodiments of locking systems preferably at short edges but also at long edges according to different aspects offering respective advantages. Useful areas for the invention are wall panels, ceilings, exterior applications and floor panels of any shape and material e.g. laminate; especially panels with surface materials contain thermosetting resins, wood, HDF, veneer or stone.

The invention comprises according to a first aspect a set of floor panels provided with a locking system comprising a tongue at an edge of a first floor panel and a tongue groove in an adjacent edge of a similar second floor panel for connecting the edge vertically. The tongue and the tongue groove are displaceable in relation to each other. The tongue comprises a protrusion extending horizontally beyond the upper part of the edge and the tongue groove a protrusion and cavity configured such that the adjacent edges can obtain a vertically unlocked position where the protrusion of the tongue matches the cavity of the tongue groove and a vertically locked position where the protrusion of said tongue vertically overlaps the protrusion of said tongue groove.

The locking system could be formed with only one protrusion on the tongue and the tongue groove and one cavity on the tongue groove. It is however preferable that the tongue and the tongue groove comprise several protrusions and cavities which are preferably formed along the joint edge with essentially the same intermediate distance between each other. The protrusions should preferably be essentially identical. The cavities should preferably also be essentially identical. They should be larger than the protrusions and match the intermediate distance of the protrusions.

The invention comprises according to a first preferred embodiment of the first aspect a set of floor panels comprising a locking system with a displaceable tongue integrated with an edge of a first floor panel for connecting the edge vertically to an adjacent edge of a similar second panel having a groove for receiving the displaceable tongue. The displaceable tongue is configured to be displaced essentially horizontally along the joint edges when a sideway pressure is applied at an edge section of the displaceable tongue. The displaceable tongue and the groove each comprise a protrusion and a cavity such that a protrusion matches a cavity in the initial unlocked position and that said protrusions overlap each other vertically when the displaceable tongue is displaced by the sideway pressure along the joint.

The displacement of the displaceable tongue along the joint is according to a second preferred embodiment of this first aspect the invention caused by for example a long edge of a third panel which is angled and connected to the first and second panels when they are located in essentially the same plane and with their short edges in contact. This preferred embodiment allows that two panels in the same row are unlocked vertically until a third panel in a consecutive row is connected. Angling down and up again could be made in a simple way according to known technology since there is no tongue that creates any resistance and that locks vertically. The vertical locking is initiated first when a new row of panels are installed. The displaceable tongue is than displaced along the joint and preferably parallel with the edges. The pressure force is along the joint only and no separation forces that push the adjacent edges away from each other will occur. This is a major advantage against all known fold down systems that have a vertical locking. The overlapping of the protrusions could take place even in the first row since no counter pressure from an previously installed panel is require to for example bend a displaceable tongue.

The displaceable tongue and all separate parts described below could be made of flexible or rigid material, for example metal, preferably aluminium sections or aluminium sheet material, wood, fibreboard such as for example HDF or plastic materials. All materials used in flexible tongues according to known technology could be used and the tongue could be produced by extrusion, injection mouldings, machining and punching or by combinations of these production methods. Any type of polymer materials could be used such as PA (nylon), POM, PC, PP, PET or PE or similar having the properties described above in the different embodiments. These plastic materials could, when for example injection moulding is used, be reinforced with for instance glass fibre, Kevlar fibre, carbon fibre or talk or chalk. A preferred material is glass fibre, preferably extra-long, reinforced PP or POM.

The protrusions could be made in one piece with the panel or of a separate material that is connected to the strip or the groove panel. The displaceable tongue could be connected to the edge of strip panel or of the groove panel.

The above-mentioned aspects have been described with panels having long and short edges. The panels could have more than four edges and they could be square.

The displacement of a protrusion with a displaceable tongue could alternatively be accomplished with a displacement of the adjacent short edges.

A third preferred embodiment of the first aspect is characterized in that the tongue and the groove comprise protrusions and cavities such that a protrusion matches a cavity in an initial vertically unlocked position when the long edges of the panels are offset against each and that the protrusions overlap each other vertically when the short edges are displaced along the joint to a position where the long edges meet each other and are located essentially along the same straight line.

According to another preferred embodiment of this first aspect the displacement groove and the tongue groove are offset vertically relative each other. Such offset grooves could give a much stronger vertical locking especially in thin panels. Vertically offset grooves are not used in the known locking systems where a displaceable tongue is displaced perpendicularly to the edge from one groove into the adjacent groove or where a vertical snapping is used. Offset grooves could be used to improve locking strength even in the known prior art systems described above.

The protrusions and cavities could be made in one piece with the panel on one or both adjacent edges or of a separate material that is connected the one or both adjacent edges and they could be formed on long and/or short edges. The protrusions and cavities of a separate material could be made of flexible or rigid material, for example metal, wood, HDF or plastic. All materials used to make the displaceable tongue, as described above, could be used and the protrusions and cavities could be produced by extrusions, injection mouldings and machining.

A separate part comprising preferably at least one protrusion and one cavity, for example a displaceable tongue for vertical locking or a displaceable locking element for horizontal locking or a combined element that allows vertical and horizontal locking, could be used in combination with horizontal and/or vertical grooves comprising at least one protrusion and cavity, to accomplish a vertical and/or horizontal locking with only a displacement of the separate part along the joint. No bending or displacement from one groove into another groove is required and the outer protrusions of the separate part could be located at the same distance from the edge during displacement along the joint and during locking. Horizontal and/or vertical separation forces could be reduced or eliminated and the separate part could be formed as a rather simple component.

The invention provides according to a second aspect a set of floor panels provided with a locking system comprising a separate part in one edge of a first floor panel and a groove in an adjacent edge of a similar second floor panel for connecting the edges vertically and/or horizontally. The separate part is displaceable along the adjacent edges, which are configured to be locked vertically and/or horizontally by only a displacement of the separate part along and parallel to the adjacent edges.

The locking system according to the third preferred embodiment of the first aspect allows that the short edges could be locked with a vertical motion combined with a displacement of the short edges along the joint. This could be used to install floor panels according to a new method which in easier than the conventional angling/angling or angling/snap methods, especially when installing long panels.

The invention provides according to a third aspect a method to install floor panels with a mechanical angling locking system at long edges and a mechanical locking system at short edges comprising a tongue and a tongue groove each provided with protrusions and cavities wherein the method comprises the step of:

- bringing a new and a second panel into a position were upper parts of their short edges are in contact, in which position the new and a second panels are in the same plane and in a second row with the long edges offset and with the short edges unlocked vertically and preferably locked horizontally;
- displacing one of the panels along the short edges until the long edges are aligned and some of the protrusions at one of the short edges vertically overlaps some of the protrusions at the other of the short edges to lock the short edges vertically and horizontally;
- bringing the aligned long edges into contact with a long edge of a first panel in a first row; and
- angling down the second and the new panel along the aligned long edges to lock the long edges of the first, the second and new panel vertically and horizontally.

This third aspect offers the advantage that the short edge of the new panel could be connected in a very simple way with vertical motion and displacement along the joint and no angling or snapping is required.

The short edges could be connected when they are laying flat on the sub floor or when they are in an angled position relative the first panel with preferably the upper parts of the long edges of the first and second panels in contact.

Floor panels with a locking system comprising a displaceable tongue or locking element according to the first and second aspects are preferably installed with vertical push folding where the displaceable tongue or part is pushed into position along the joint of the short edges when the panels are laying flat on the sub floor with their short edges aligned in essentially the same plane.

The invention provides according to a fourth aspect a method to install floor panels with a mechanical angling locking system at long edges and a mechanical locking system at short edges comprising a tongue groove and a displaceable tongue whereby the said displaceable tongue and tongue groove each comprises protrusions and cavities configured such that adjacent short edges can obtain a vertically unlocked position where the protrusions of one of the adjacent short edges match the cavities of the other adjacent short edge and a vertically locked position where some of the protrusions of respectively adjacent short edges vertically overlap each other wherein the method comprises the step of:

- connecting the long edges of a second and a new panel in a second row to a long edge of a first panel in a first row with angling and positioning the second and the new panel in essentially the same plane and with their adjacent short edges in contact; and
- displacing the displaceable tongue along the adjacent short edges to a position where some of the protrusions, of respectively adjacent short edge, overlap each other to lock the adjacent short edges vertically.

Protrusions and cavities on long edges could be used to improve installation of panels that for example are difficult or impossible to lock with angling. Such installation problems could occur for example around doors or in panels with two different decorative layers on front and rear faces which are intended to be used as a double side panel where the end consumer could be given the option to install the panels with the front side or the rear side as a decorative floor surface.

The invention comprises according to a fifth aspect a method to install floor panels with a mechanical locking system at long edges comprising protrusions and cavities and a mechanical locking system at short edges comprising a displaceable locking element allowing horizontal snapping of short edges whereby said long edges can obtain a vertically and/or horizontally unlocked position where the protrusions of one long edge match the cavities in another adjacent long edge and a vertically and/or horizontally locked position where some of the protrusions, of respective long edge, overlap each other vertically and/or horizontally wherein the method comprises the step of:

locking, at least partially vertically and horizontally, the long edge of a first panel in a first row to a long edge of a second panel in a second row; and connecting the long edge of a new panel in the second row to the first panel in the first row by bringing the upper parts of the adjacent long edges in contact and displacing the new panel along the long edge of the first panel to a position where some of the protrusions of the new and the first panel overlap each other and until a short edge of the new panel snaps into an adjacent short edge of the second panel.

The long edges of the new and the first panel could be locked vertically and horizontally by a vertical or horizontal motion followed by a displacement along the long edge joint. Such locking could be made without any vertical or horizontal snapping. The snapping of the short edges could be made with low snapping resistance if a mechanical snapping system with a displaceable locking element is used. Conventional one-piece snap systems could of course also be used.

The short edges comprising a displaceable tongue could be disconnected with a hooked shaped tool, which could be inserted from the corner section in order to pull back the displaceable tongue. One panel could then be angled up while the other panel is still on the sub floor. Of course the panels could also be disconnected in the traditional way by angling up or displacement along the joint.

The short edges could also be disconnected if the displaceable tongue is formed such that it could be pushed further along the joint to an unlocked position.

The invention comprises according to a sixth aspect a method of uninstalling floor panels with long and short edges provided with a locking system on the short edges comprising a displaceable tongue at one edge of a first floor panel and a tongue groove in an adjacent edge of a similar second floor panel for connecting the short edges vertically. The tongue and the groove each comprises protrusions and cavities configured such that the short edges can obtain a vertically unlocked position where the protrusions of one of the adjacent short edges match the cavities in the other of the adjacent short edges and a vertically locked position where some of the protrusions, of respectively adjacent short edges, overlap each other vertically, wherein the method comprises the steps of:

applying a pressure force at an edge of the displaceable tongue in vertically locked position;

displacing the displaceable tongue to the vertically unlocked position; and separating the short edges from each other by angling upward one of the panels along its long edge.

This sixth aspect offers the advantage that the short edge of the new panel could be unlocked in a very simple way and it is not necessary to grab an edge of the tongue in order to pull it out. The displaceable tongue could be designed such that it is always in an unlocked position when an edge meets the long edge of an installed panel in an adjacent previously installed row. The method could be used to unlock panels comprising a displaceable tongue that locks and unlocks edges vertically and/or horizontally.

The invention comprises according to a seventh aspect a method to produce protrusions and cavities located after each other along an edge of a floor panel with a rotating tool having an axis of rotation. The method comprises the step of:

a) bringing an edge of the floor panel in contact with the tool; and b) displacing the edge of the panel in relation to the tool essentially parallel with the axis of rotation.

This production method makes it possible to produce protrusions and cavities in a very rational way and with high precision. A short edge of panel could for example be moved in the traditional way in the production line and there is no need to stop the panel or to move a tool in order to form the protrusions and cavities.

Several tool configurations could be used such as a screw cutter or a large rotating tool with cutting teethes located on only a limited section of the outer tool part.

A displaceable tongue, which is suitable to use in thin floor panels or to lock panel edges both vertically and horizontally, is generally more difficult to fix to a displacement groove than a conventional tongue where the tongue is inserted perpendicularly to the joint and a friction connection is used. Conventional flexible or displaceable tongues are generally also inserted into a displacement groove, which is located in a plane extending over the upper part of a locking element of a strip. Such conventional locking systems and methods to fix a displaceable tongue to a groove are not suitable for the type of panels described above.

To solve this problem, the invention comprises according to a seventh aspect a method to connect a displaceable tongue to a displacement groove. The method comprises the steps of 1. separating a displaceable tongue from a tongue blank that comprises several displaceable tongues; and
2. connecting the displaceable tongue into a displacement groove of a panel edge by inserting the tongue sideways along the joint.

The cost structure and production capacity and flexibility to produce and fix a preferably displaceable tongue to an edge of a panel could be improved considerably if tongues could be provided in tongue blanks that comprises multiple rows of tongues. Such a tongue blank could be used in the described embodiments but also in known locking systems for example in systems described in FIGS. 1a-3c. The invention comprises according to a ninth aspect a tongue blank comprising several displaceable tongues arranged in several rows with at least two tongues in each row.

Locking of thin floorings could be improved if the displaceable tongue has at least a portion, preferably a middle portion, with upper and lower contact surfaces that lock into an adjacent groove. Such a tongue could be used in the described embodiments but also in known locking systems for example in systems described in FIGS. 1a and 2c The invention comprises according to a tenth aspect a tongue adapted for being received in a sidewardly open groove of a floor panel wherein the tongue is of an elongated shape, and configured such that it, when received in the groove, is displaceable in a plane substantially parallel with a main plane of the floor panel and wherein the tongue has a bevelled or rounded edge part and a middle section with upper and lower contact surfaces that are adapted to lock into an adjacent groove and prevent vertical displacement of the adjacent edges.

Locking systems that comprise a displaceable tongue or locking element that is displaced along the joint with a side push applied at a edge of the displaceable tongue by for example a long side tongue of a panel in a new row, according to the described embodiments or the known locking systems described in FIGS. 1*c* and 3*c*, create an upward pressure force during angling of the long side tongue that could lift the corner section at the edge of the displaceable tongue in an uncontrolled way. This could be avoided if the edge and preferably also the tip of the long side tongue are adapted to reduce vertical friction forces that are created during angling.

The invention comprises according to an eleventh aspect a tongue adapted for being received in a sidewardly open groove of a floor panel wherein that tongue is of an elongated shape, and configured such that it, when received in the groove, is displaceable along the joint when a side pressure is applied on an edge part of said tongue and wherein the edge part has an essentially bevelled edge that is intended to reduce vertical friction during locking.

The invention comprises according to a twelfth aspect an equipment to produce a locking system comprising a separate part inserted into an edge of a panel. The equipment comprises a double-end tenoner with several cutting tools, an inserting device with a pusher adapted to inserts the separate part into the panel edge, a transportation device adapted to displace a panel relative the cutting tools and the inserting device, and a control system. The inserting device is integrated with the double end tenoner as one production unit and the pusher and the transportation device are connected to the same control system that controls the transportation device and the pusher.

All references to "a/an/the [element, device, component, means, step, etc.]" are to be interpreted openly as referring to at least one instance of said element, device, component, means, step, etc., unless explicitly stated otherwise.

Almost all embodiments are described with separate tongues on the strip panel comprising the locking strip and the locking element that locks the adjacent edges horizontally, mainly in order to simplify the description. The separate tongue could be located in the edge of the groove panel comprising the locking groove that cooperates with the locking element.

DETAILED DESCRIPTION OF EMBODIMENTS

Figure 4A:
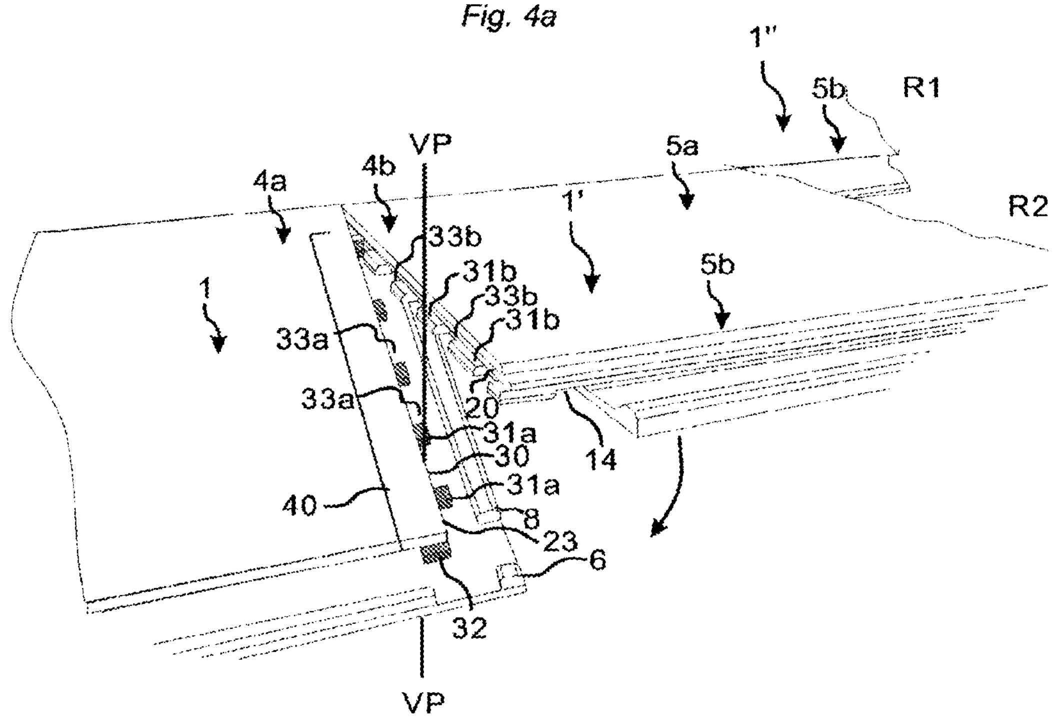
FIGS. 4*a*-4*c* show a locking system according to a basic embodiment of the invention.

FIG. 4*a* shows one embodiment of panels with a vertical push folding locking system according to the invention. The short edges 4*a* and 4*b* comprise a displaceable tongue 30 connected to a displacement groove 40 in one edge cooperating with a tongue groove 20 in an adjacent edge for vertical locking of the edges. The displaceable tongue 30 and the tongue groove 20 comprise protrusions 31*a*, 31*b* and cavities 33*a*, 33*b*. The protrusions 31*a* on the displaceable tongue extend horizontally beyond the vertical plane VP and the upper part of the edge. The short edges comprises furthermore a locking strip 6 with a locking element 8 in one edge that cooperates with a locking groove in an adjacent edge for horizontal locking of the edges. The panels are installed as follows. A first panel 1" in a first row R1 is connected to a second 1 panel in a second row R2. A new panel 1' is moved with its long edge 5*a* towards the long edge 5*b* of first panel 1" at a normal installation angle of about 25-30 degrees, pressed to the adjacent edge and connected with its long edge 5*a* to the long edge 5*b* of the first panel with angling. This angling action also connects the short edge 4*b* of the new pane 1' with the short edge 4*a* of the second panel 1. The fold panel 1' could be locked horizontally to the strip panel 1 with a combined vertical and turning motion along the vertical plane VP and with a contact between the top edges of the second panel 1 and the new panel 1. The upper tongue protrusions 31*a* will during angling pass through the cavities 33*b* on the tongue groove 20. The edges 4*a*, 4*b* are in this stage not locked vertically and could be angled up again. The displaceable tongue 30 has an edge section with a pressing edge 32 exposed at the long edge 5*b* of a second panel 1. The pressing edge could be pushed sideways along the short edge 4*a* joint when the new 1' and the second panel 1 are laying flat on the sub floor. The displaceable tongue 30 could be displaced essentially parallel to the short edge 4*a* such that the upper tongue protrusions 31*a* overlap the lower tongue groove protrusions 31*b* and this overlapping locks the adjacent short edges 4*a*, 4*b* vertically. The pressure forces are parallel to the joint and the risk for edge separation during locking is eliminated. The whole pressing force could be used to lock the panels in the same plane even if the edges are somewhat warped before installation. The locking system is especially suitable to lock wood flooring with sharp edges (without bevels).

Figure 4B:
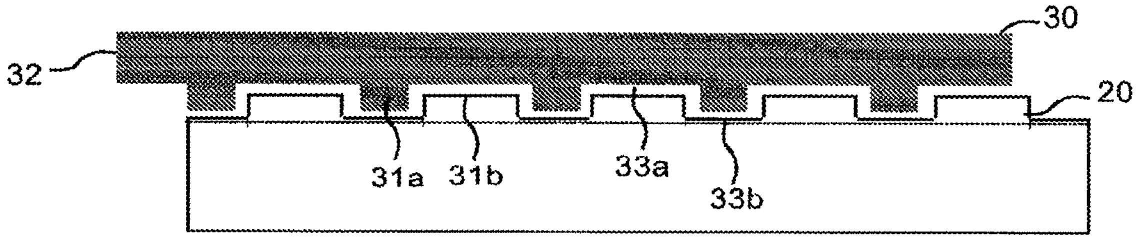
Figure 4C:
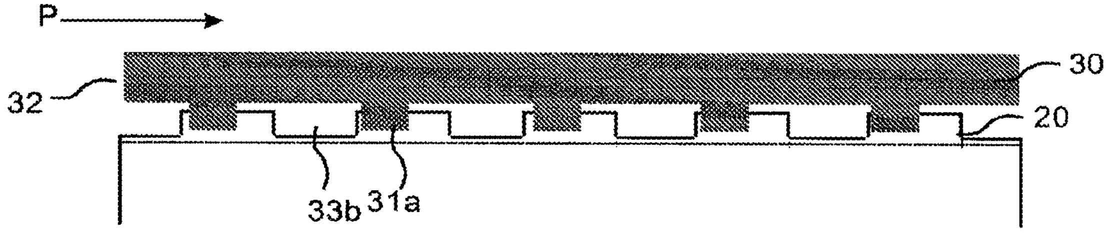

The protrusions and cavities could be formed in several ways. A saw blade principle could be used where preferably several saw blades form the protrusions and cavities. A cutter principle could also be used where several cutters, one for each cavity, are used. A very efficient method is the screw cutter principle. Protrusions and cavities could be produced in a very cost efficient way in a continuous production line and with high accuracy especially if the panel position is synchronized accurately with the tool position and the tool rotation speed. A large rotating tool with cutting teethes located on only a limited section of the outer tool part could also be used to form the cavities and protrusions. Other methods are laser cutting or punching. All methods could be used separately or in combinations FIG. 4*b* shows the displaceable tongue 30 in an unlocked position seen from above. The tongue protrusions 31*a* are located vertically over the groove cavities 33*b*. FIG. 4*c* shows the locked position when a sideway pressure P has displaced the displaceable tongue 30 such that the tongue and groove protrusions 31*a*, 31*b* overlap each other.

The locking system could be formed with only one protrusion 31*a* on the tongue and the tongue groove 31*b* and one cavity 33*b* on the tongue groove. It is however preferable that the tongue and the tongue groove comprise several protrusions and cavities which are preferably formed along the joint edge with essentially the same intermediate distance between each other. The protrusions should preferably be essentially identical. The cavities should preferably also be essentially identical. They should be larger than the protrusions and match the intermediate distance of the protrusions.

Figure 5A:
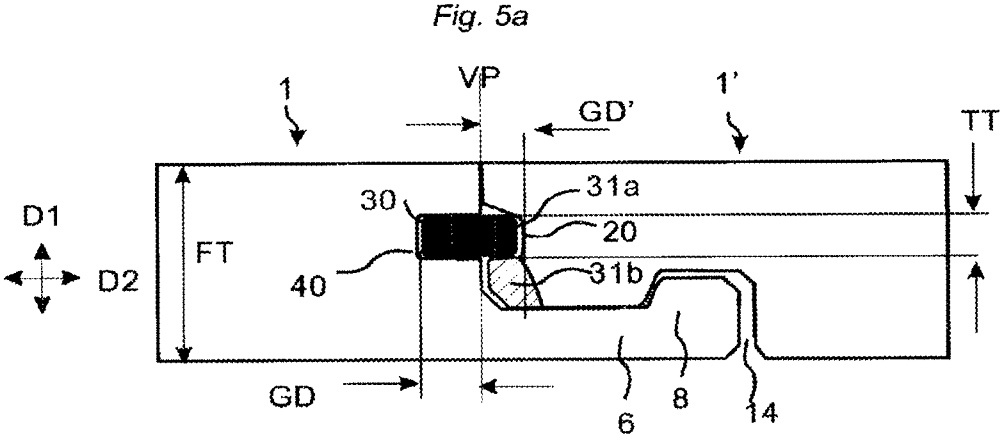
FIGS. 5*a*-5*c* show locking with side push of a displaceable tongue.

FIG. 5*a* shows a cross section of a locking system according to the invention. The displacement groove 40 could be made much smaller than in the prior art systems since no perpendicular displacement is required. Sufficient locking strength could for example be reached with a displacement groove that has a groove depth GD of about 0.5 times the floor thickness FT or even smaller and a tongue groove that has a groove depth GD' of about 0.4 times the floor thickness FT or smaller. As a non-limiting example it could be mentioned that the tongue width TW preferably could be about 5-6 mm. This means that the width of the tongue could be smaller than the floor thickness. The thickness of the tongue TT could be about 0.2 times the floor thickens or even smaller. As a non-limiting example it could be mentioned that the tongue thickness preferably could be about 1.5 mm. This makes the locking system very suitable to lock thin floor panels with a thickness of 5-10 mm vertically (D1) and horizontally (D2). A strong locking has been obtained with displaceable tongues that have a width, which is smaller than 5 mm and a thickness smaller than 1 mm. Embodiments have also been produced with a displacement groove and a tongue groove which each have a depth of less than 2 mm.

Figure 5B:
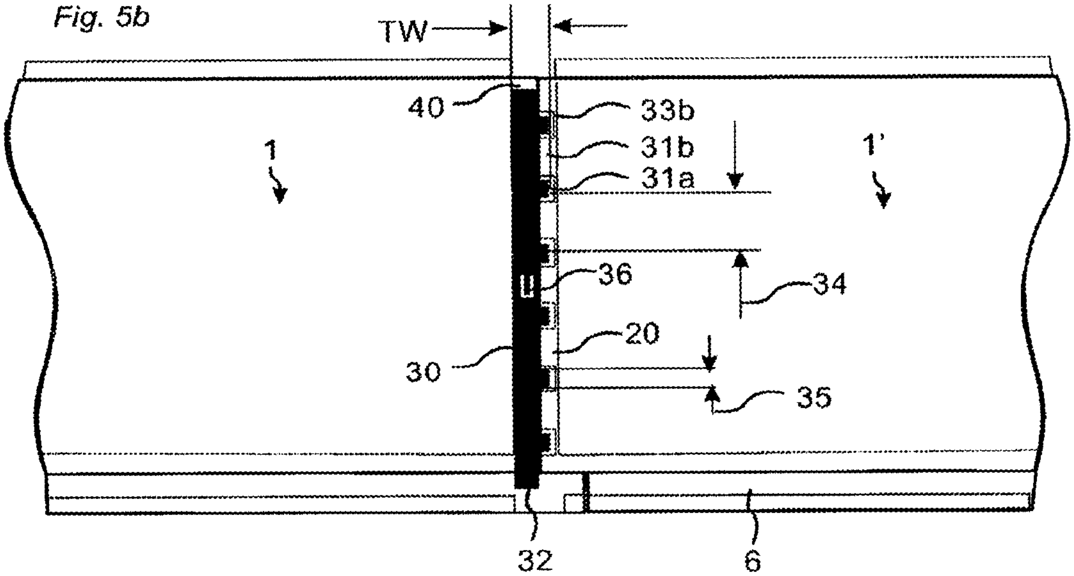
Figure 5C:
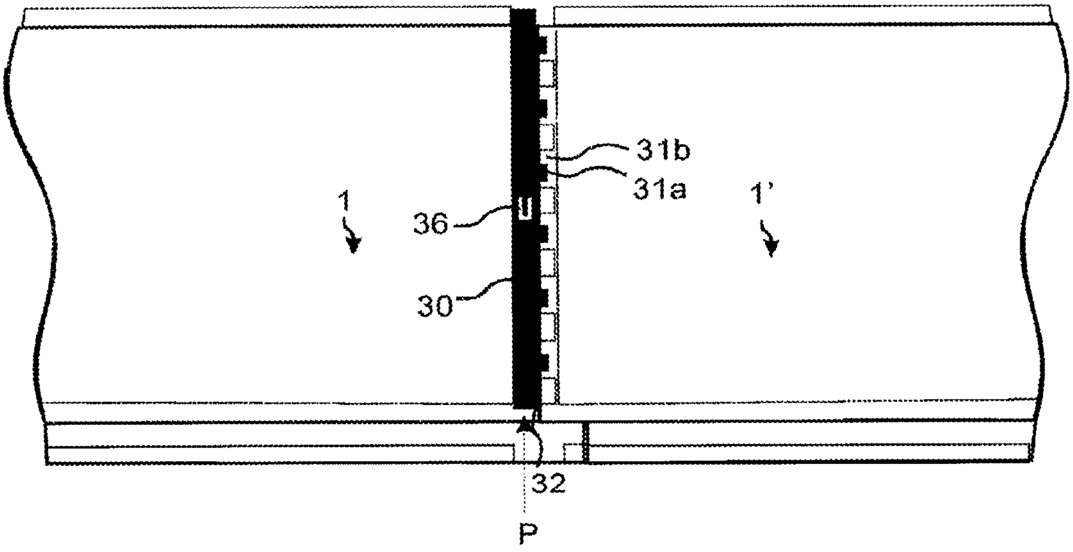

FIG. 5*b* shows the displaceable tongue 30 in an unlocked position seen from above. The tongue protrusions 31*a* are in such unlocked position located vertically over the groove cavities 33*b*. The majority of the protrusions are in this embodiment preferably identical and the intermediate distance 34 measured from centre to centre is essentially the same. A preferable distance is about one to two times the floor thickness. Strong locking has been reached with protrusions having an intermediate distance of about 10 mm. FIG. 5c shows the locked position when a sideway pressure P, preferably applied on a protruding edge section 32 of the displaceable tongue 32, has displaced the displaceable tongue 30 along the joint such that the tongue and groove protrusions 31a, 31b overlap each other. The displacement should preferably be about the same as the length of the protrusion 35. Strong locking has been reached with protrusions having a length of about 4 mm. The displaceable tongue 30 could preferably be connected to the displacement groove 40 in many ways for example with preferably a flexible friction connection 36, with wax or just with friction between the tongue and the groove. The friction connection 36 is in the shown embodiment formed as a flexible tap that creates a vertical pressure against the upper or lower part of the displacement groove 40. Such a friction connection gives the advantages that the displaceable tongue 30 is fixed into the displacement groove 40 in a reliable way, even if the groove opening varies during production. Such friction connection allows that the displacement could be accomplished with a pre-determined friction force.

Figure 6A:
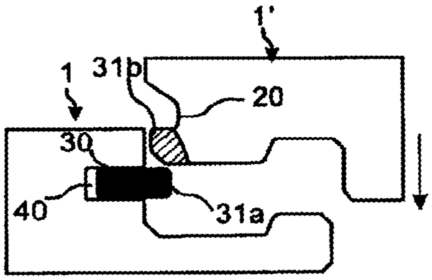
FIGS. 6*a*-6*h* show in several steps locking of short edges.
Figure 6B:
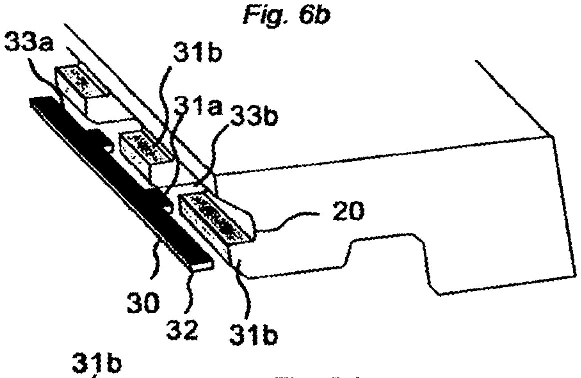
Figure 6C:
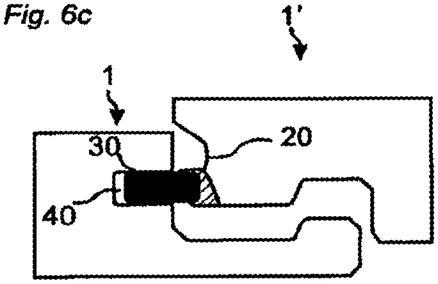
Figure 6D:
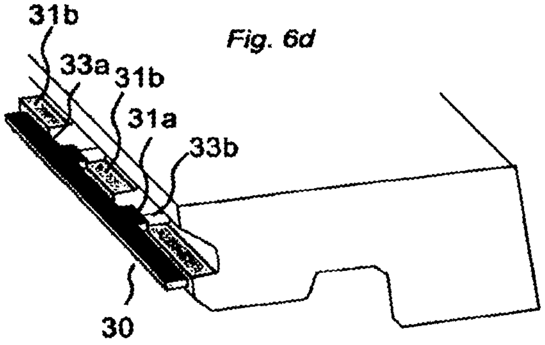
Figure 6E:
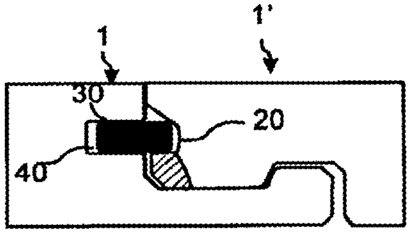
Figure 6F:
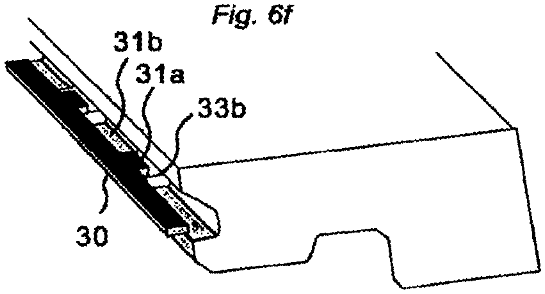
Figure 6G:
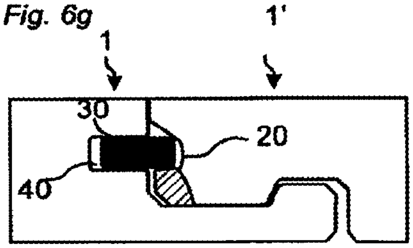
Figure 6H:
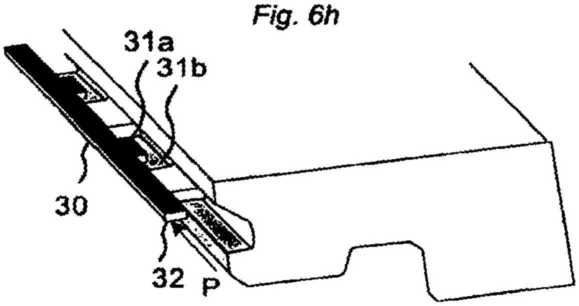

FIGS. 6a-6h show in four steps locking of a section of the short edges according to the invention. A short edge of a new panel 1' is in this embodiment moved vertically towards the second panel 1 as shown in FIGS. 6a-6b. The tongue protrusions 31a match the cavities 33b, they are offset in relation to the groove protrusions 31b and located in a plane under the groove protrusions 31b. Further vertical movement will bring the tongue protrusion 31a in the groove cavity 33b and of course also the groove protrusion 31b in the tongue cavity 33a. FIGS. 6e-6f show the position when the panels 1, 1' have been vertically connected and are laying flat in the same plane on the sub floor. FIGS. 6g-6h show finally the vertically locked position where the protrusions 31a, 31b overlap each other due to the displacement of the displaceable tongue 30 along the joint edge.

Figure 7A:
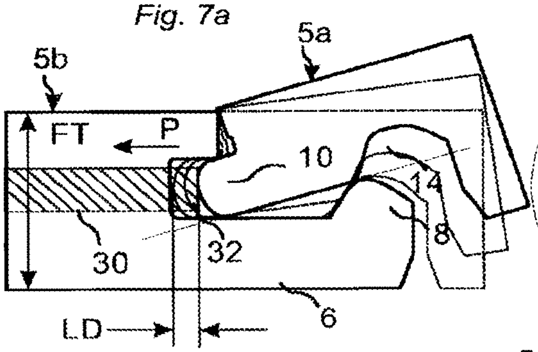
FIGS. 7*a*-7*d* show locking of four panels according to one aspect of the invention.
Figure 7B:
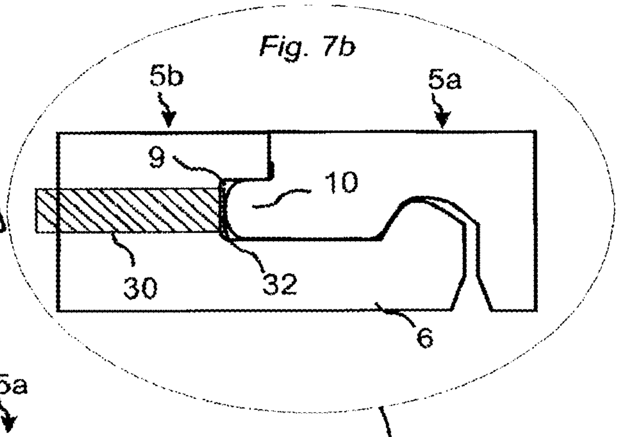
Figure 7C:
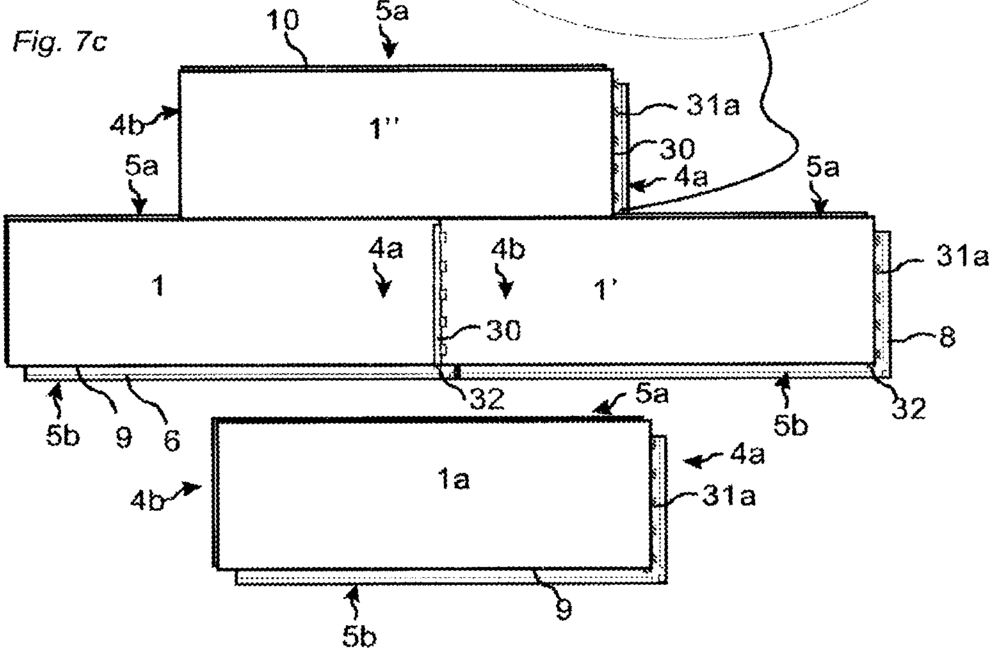
Figure 7D:
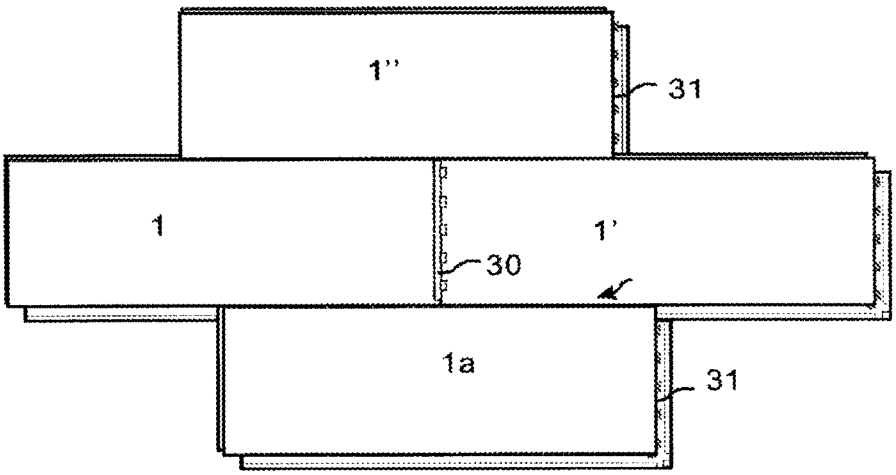

This installation method and locking system is further explained in FIGS. 7a-7d. FIG. 7a shows how the pressing edge 32 could be displaced along the joint by a side pressure P caused by a long edge tongue 10 during angling of the long edges 5a when a new row is installed. The displacement is in an initial step mainly caused by a linear displacement of the long edge tongue 10 until the upper part of the long edges 5a, 5b are close to each other, preferably in contact. FIG. 7b shows the locked position with the displaceable tongue 30 is in its final locked position. The final locking is accomplished with a turning action, which displaces the tip of the tongue 10 and the displaceable tongue 30 further into the tongue groove 9 of the long side edge. This locking distance LD could vary between for example 0.05-0.15 times floor thickness FT depending on the shape of the tip of the tongue 10 and the pressing edge 32. The locking element 8 and the locking groove 14 are generally in contact during the major part of this angling and displacement step. The tongue 10 on a long edge 5a could during this final locking step create a substantial pressure against the pressing edge 32 and the short edges 4a, 4b could be locked firmly against each other in the vertical direction. FIG. 7c shows the position of the second 1 and the new panels 1' before their short edges 4a, 4b are locked vertically and FIG. 7d show the locked position when the tongue 10 of a third panel 1a has displaced the displaceable tongue 30 to its final locked position.

It is obvious that the tongue could be displaced with a pressure P against the pressing edge 32, which is applied by the installer during installation, with for example a tool and not by the angling of the third panel. It is also obvious that displaceable tongues 30 could be connected to an edge of a panel during installation.

Figure 8A:
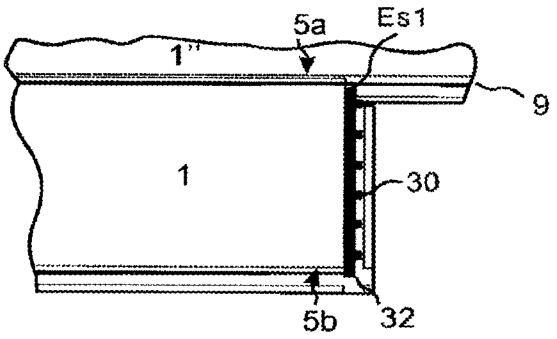
FIGS. 8*a*-8*f* show cross sections of panels during installation.
Figure 8B:
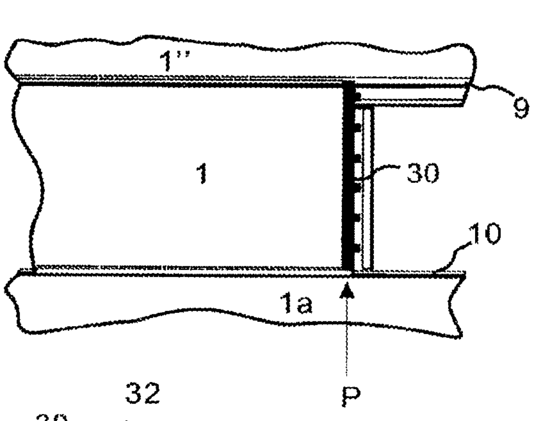
Figure 8C:
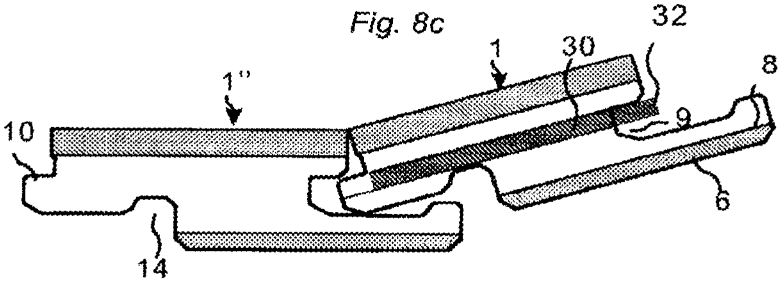
Figure 8D:
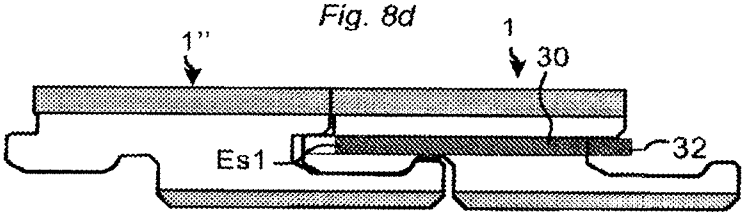
Figure 8E:
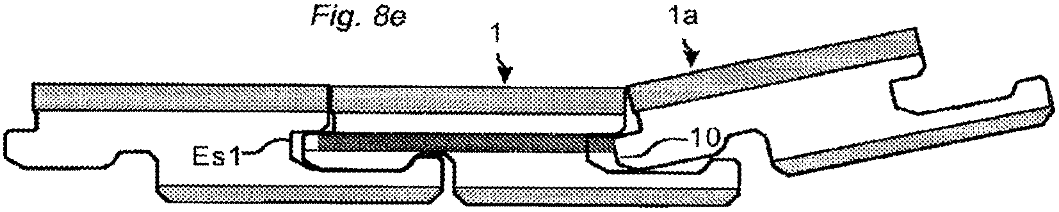
Figure 8F:
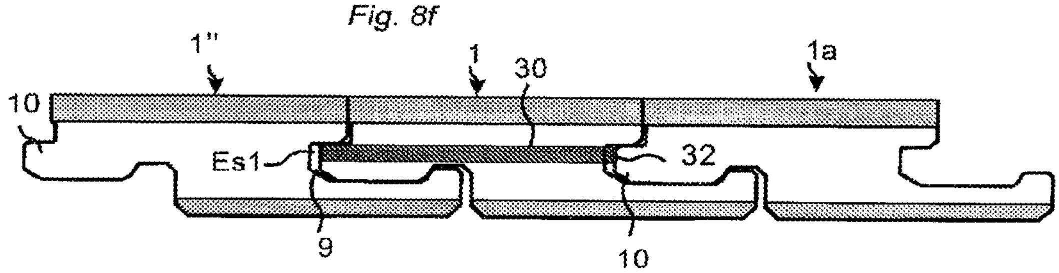

FIGS. 8a-8b show locking of a floorboard, which in this case is a wood flooring, and locking according to the vertical push folding principle. The displaceable tongue 30 is in this embodiment fixed to the floorboard such that it ends approximately at the upper edge of the tongue side 10 of one long edge 5a and protrudes with its pressing extension 32 beyond the other long edge 5b the groove side 9. This is shown in FIGS. 8a, 8c and 8d. A third panel 1a, as shown in FIG. 8e, is connected with angling to the second pane 1 and its tongue 10 presses against the pressing edge 32 of the displaceable tongue 30. FIG. 8f shows how the tongue 30 is displaced with one of its edge sections Es1 spaced from the inner part of the long edge groove 9 of the first panel 1" and the other edge section, the pressing edge 32, in contact with the tip of the tongue 10 of the third panel 1a. This installation principle allows that, depending on the initial position of the displaceable tongue, the floor could be installed in both directions—with the long edge tongue part on the strip or with the long edge strip under the tongue. It could be mentioned that a displacement of about 0.5-3 mm could results in a very strong locking.

Figure 9A:
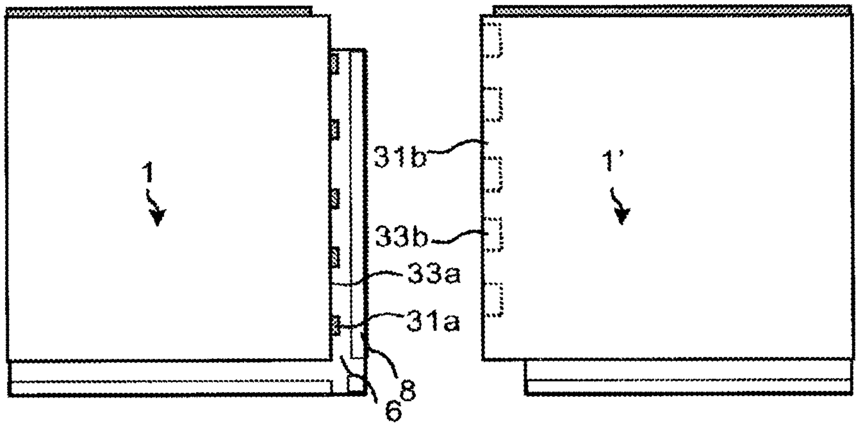
FIGS. 9*a*-9*d* show locking systems formed in one piece with the panel.
Figure 9B:
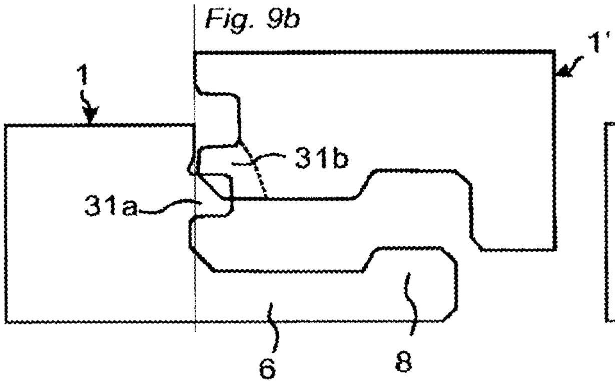
Figure 9C:
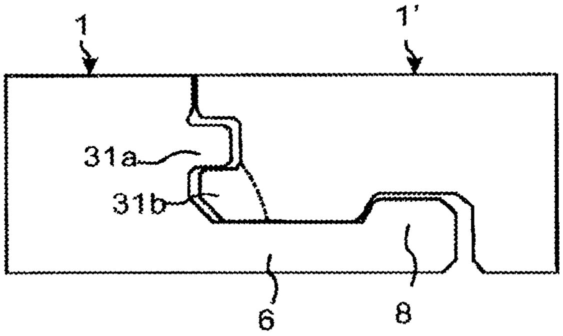
Figure 9D:
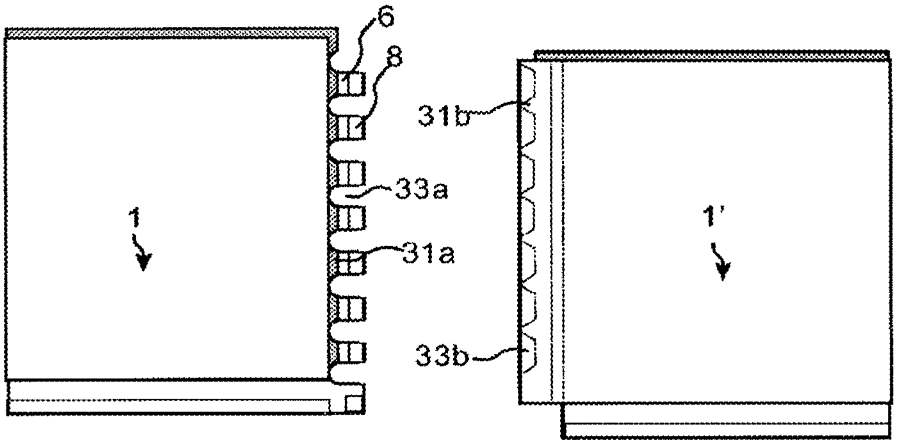

FIGS. 9a-9d shows an embodiment according to the first aspect of the invention where the vertical locking of the short edges is obtained by a displacement of the panels along the short edges. The protrusions on the tongue and on the tongue groove 31a, 31b and the cavities 33a, 33b could be made in one piece with the panel core or of a separate material that is connected to the panel. FIG. 9d shows an embodiment where the strip 6 and its locking element 8 comprise protrusions and cavities. Such an embodiment could be used to simplify production of the tongue protrusions 31a since a tool could be used that could cut through the strip 6 when the tongue protrusions 31a are formed.

Figure 10A:
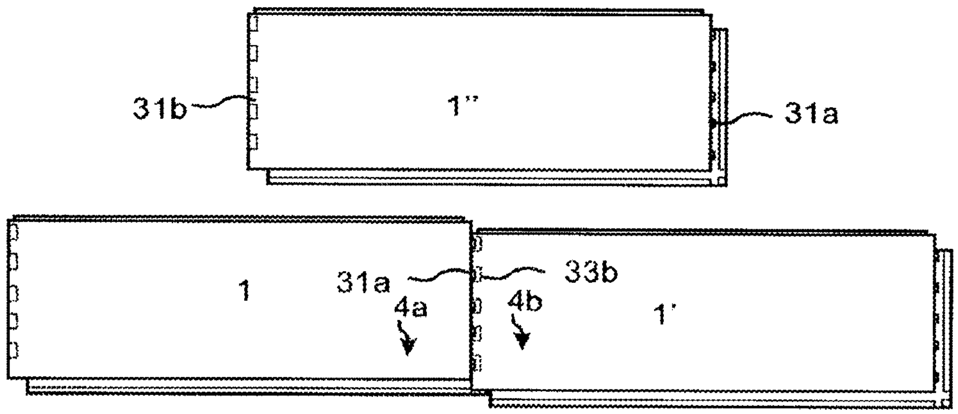
FIGS. 10*a*-10*c* show installation of panels with a one piece locking system combined with a displacement of panels during locking.
Figure 10B:
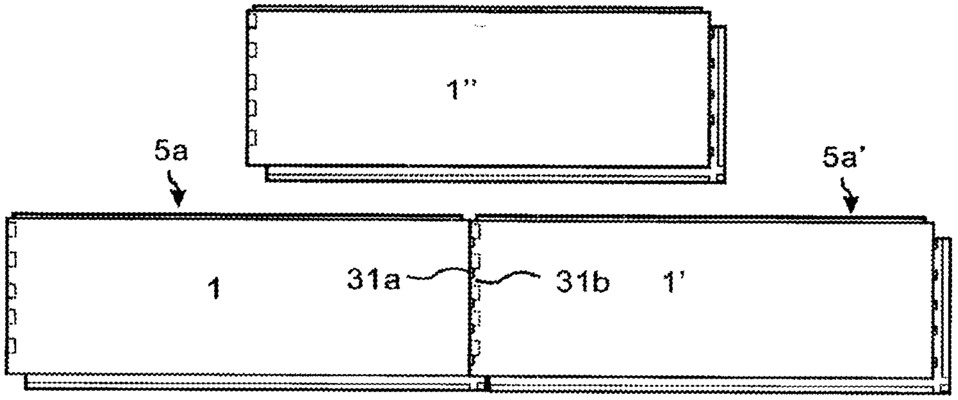
Figure 10C:
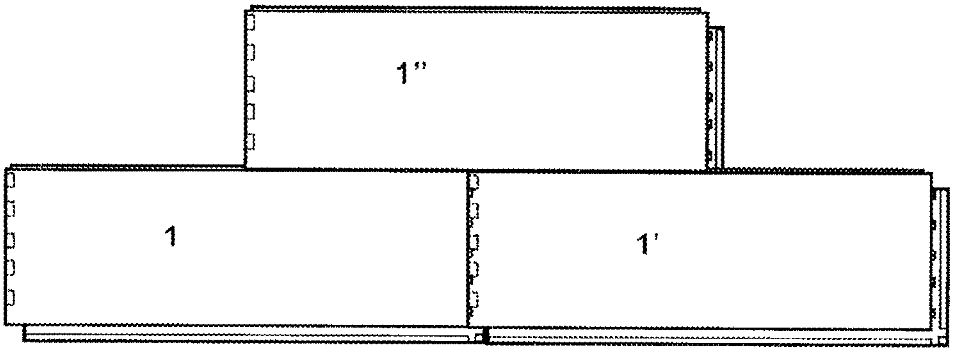

FIG. 10a-10c shows installation of an embodiment with fixed and non-displaceable protrusions 31a, 31b. A short edge 4b of new panel 1' is connected, preferably with a vertical movement, to an adjacent short edge 4b of second panel in the same row such that the protrusions 31a passes the cavities 33b and that the edges are locked horizontally. The short edges 4a, 4b are thereafter displaced in relation to each other and in a horizontally locked position along the adjacent edges such that the long edges 5a, 5a' are aligned along the same straight line as shown in FIG. 10b and locked vertically and horizontally whereby the protrusions 31a, 31b overlap each other. The long edges 5a, 5a' of two panels 1, 1' are thereafter connected to a first panel 1" with preferably angling as shown in FIG. 10c.

Figure 11A:
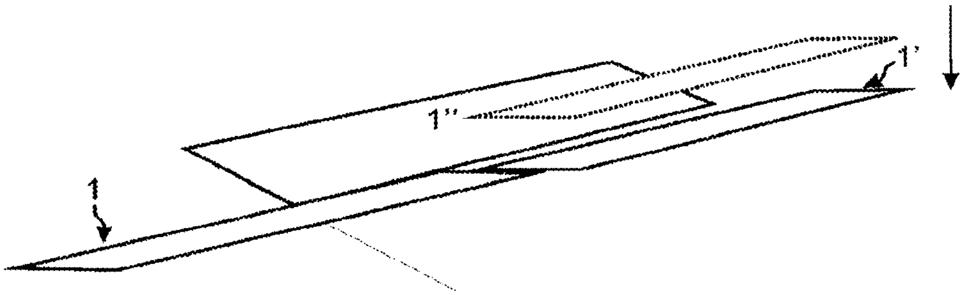
FIGS. 11*a*-11*c* show an alternative installation method based on connection in angled position.
Figure 11B:
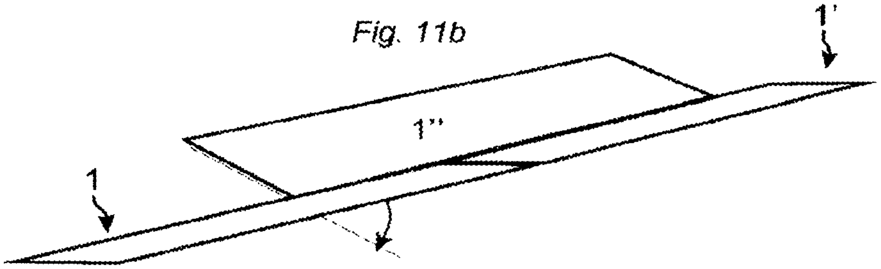
Figure 11C:
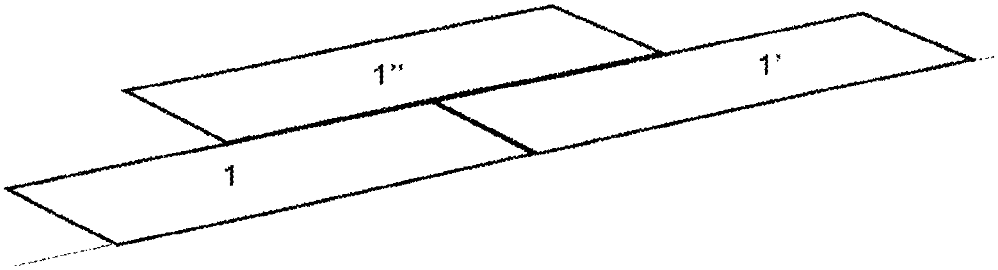

FIGS. 11a-11c show that such connection could be made with the first 1" and second 1 panel in an angled position against each other with their upper parts of the long edges in contact. A short edge of a new panel 1' is than connected with a vertical motion to an adjacent short edge of a second panel, which is in an angled position to the sub floor, in the same way as shown in FIG. 10a. The new panel 1' is than displaced in the angled position with its short edge connected to the short edge of the second panel 1 until its long edge meets the long edge of the first panel 1". The new 1' and the second panel 1 are than angled down and the new panel 1' is locked mechanically vertically and horizontally to the first 1" and the second 1 panels.

The advantage with the above-described installation method is that the short edges could be connected and locked horizontally without any angling. This is an advantage when the panels are long or when an installation is made in corners or around doors where angling is not possible to use.

Figures 12A, 12B, 12C, 12D, 12E, 12F:
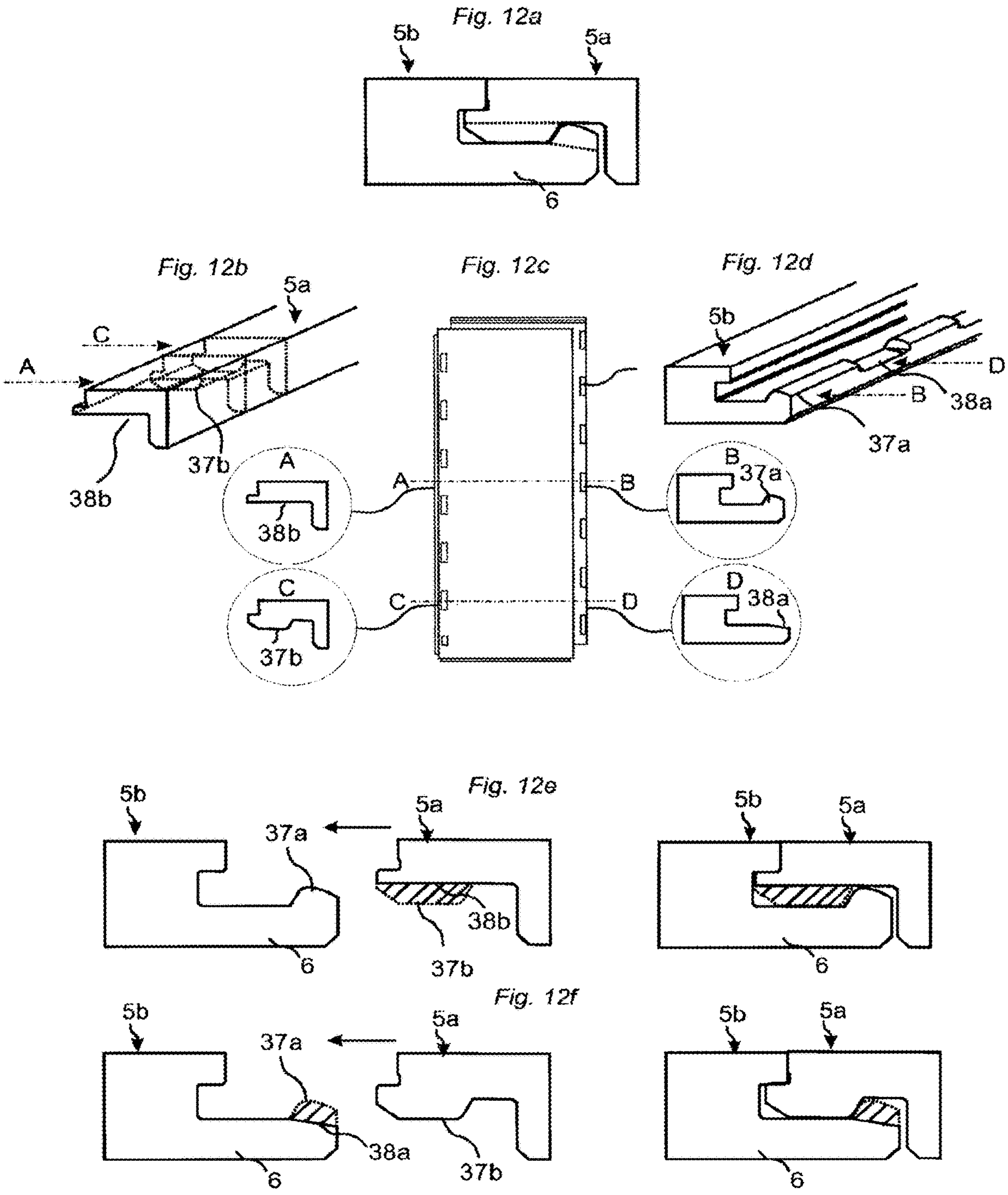
FIGS. 12*a*-12*f* show a locking system on long edges made in one piece with the panel.

FIG. 12*a*-12*f* show that the basic principle of forming protrusions on the short edges that allow a locking with a vertical motion could also be used to form protrusions 37*a*, 37*b* and cavities 38*a*, 38*b* on long edges 5*a*, 5*b* that allow a locking with a horizontal motion of one long edge towards another adjacent long edge. FIGS. 12*e* and 12*f* and 12*a* show that two long edges 5*a* and 5*b* could be connected horizontally in the same plane and locked to each other vertically such that the protrusions 37*a* of the strip panel 5*b* matches the cavities 38*b* of the groove panel 5*a* and the protrusions 37*b* of the groove panel 5*a* matches the cavities 38*b* of the strip panel 5*b*. The long edges 5*a*, 5*b* could thereafter be displaced along the long edges such that said protrusions overlap each other horizontally where one protrusion is positioned behind the other protrusion and they lock the edges horizontally as shown in FIG. 12*a*.

Figure 13A:
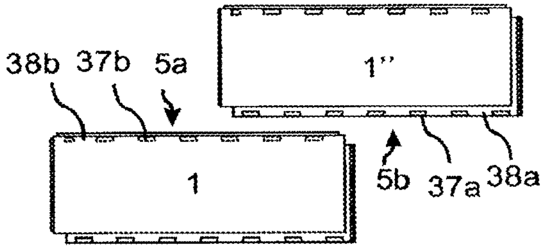
FIGS. 13*a*-13*f* show a method to lock panels with displacement of long edges and snapping of short edges.
Figure 13B:
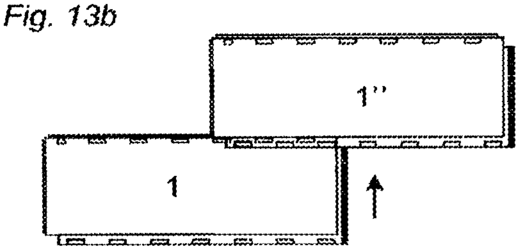
Figure 13C:
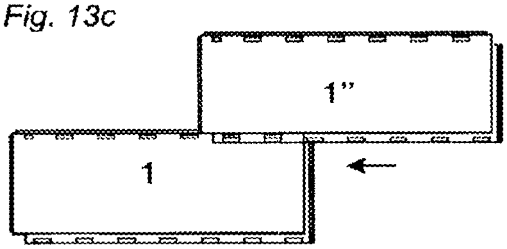
Figure 13D:
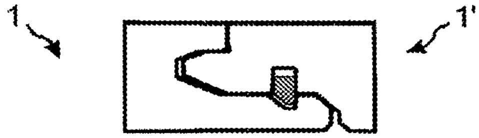
Figure 13E:
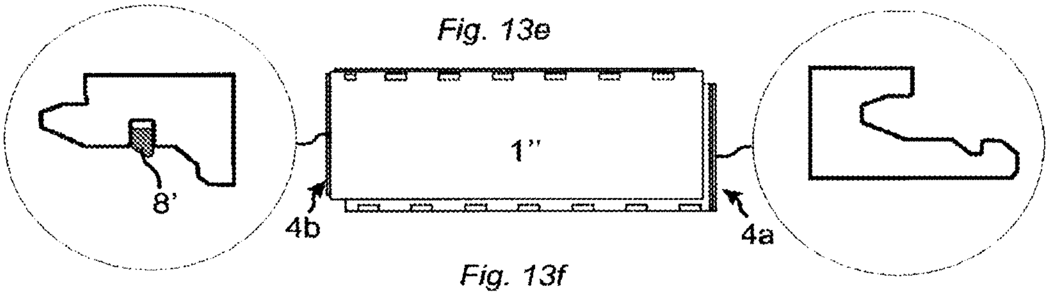
Figure 13F:
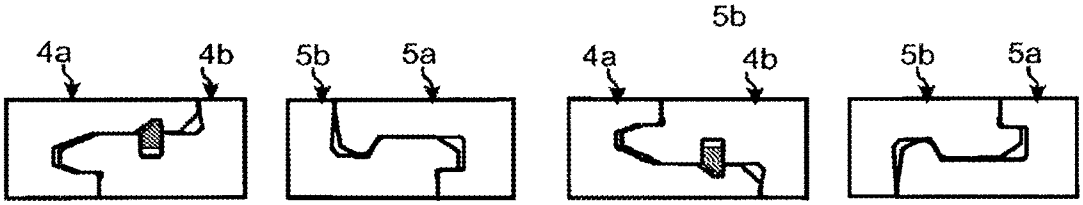

FIGS. 13*a*-13*e* show in detail installation of floor panels with a long edge locking system as shown in FIGS. 12*a*-12*f*. Two long edges 5*a* and 5*b* are connected horizontally in the same plane and locked to each other vertically as shown in FIGS. 13*a* and 13*b* such that the protrusions 37*a* of the strip panel 5*b* matches the cavities 38*b* of the groove panel 5*a* and the protrusions 37*b* of the groove panel 5*a* matches the cavities 38*a* of the strip panel 5*b*. The long edges 5*a*, 5*b* are thereafter displaced along each other such that the protrusions overlap each other and lock the edges horizontally. The short edges 4*a* and 4*b* could be locked by horizontal snapping, preferably with a snapping system that comprises a flexible locking element 8' as shown in FIG. 13*d*. Such installation method could be used to lock double sided panels with decorative surfaces on both opposite sides as shown in FIG. 13*f*.

Figure 14A:
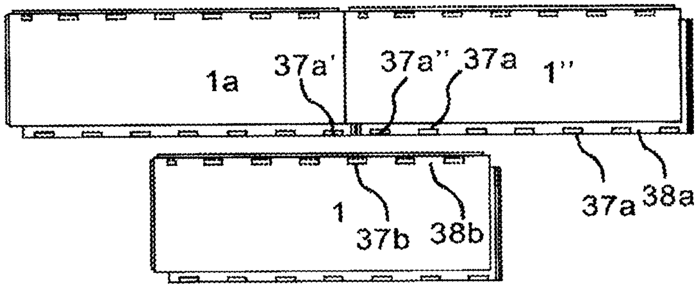
FIGS. 14*a*-14*e* show locking of several panels comprising protrusions on long edges.
Figure 14B:
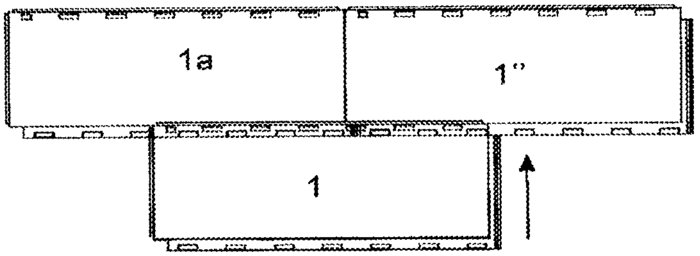
Figure 14C:
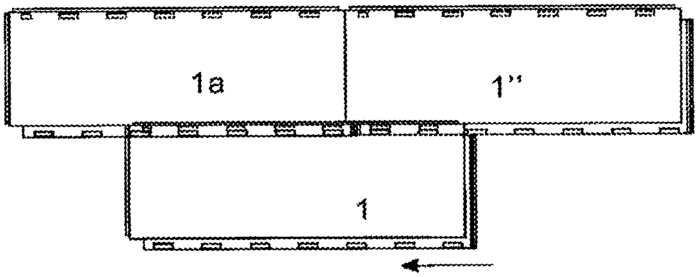
Figure 14D:
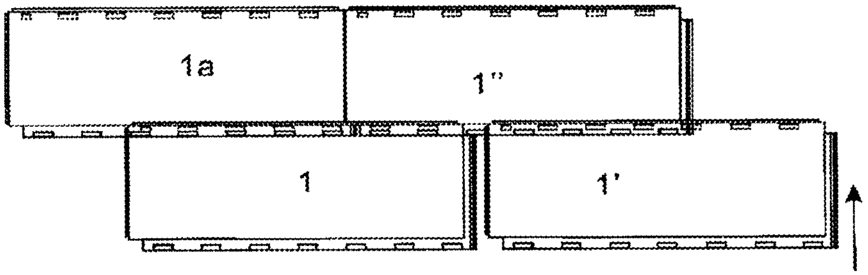
Figure 14E:
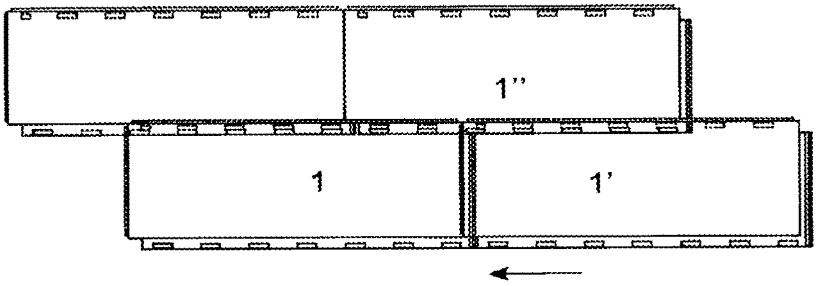

FIGS. 14*a* and 14*b* show that it is essential that the protrusions 37*a*, 37*b* and cavities 38*a*, 38*b* on the long edges are distributed along the edge in a manner that creates a well-defined pattern, preferably with the same intermediate distance, when two floor boards are connected with their short edges and that such a pattern corresponds to the main pattern on the individual panel. The floorboards according to this preferred embodiment are characterized in that the intermediate distance of adjacent protrusions 37*a*', 37*a*" of two connected floorboards 1*a*, 1" is essentially the same as the intermediate distance of two protrusions 37*a*", 37*a* on one of the two floorboards 1*a*, or 1". FIG. 14*c* shows a second floorboard 1 that has been displaced along the joint and locked vertically and horizontally to two connected floorboards 1*a*, 1" in a first row. FIGS. 14*d* and 14*e* shows how a long edge of a new panel 1' in a second row is locked with a horizontal movement towards the long edge of a first panel 1" in a first row, sliding along said long edge and finally with horizontal snapping to an adjacent short edge of a second panel 1 in the same second row.

Figure 15A:
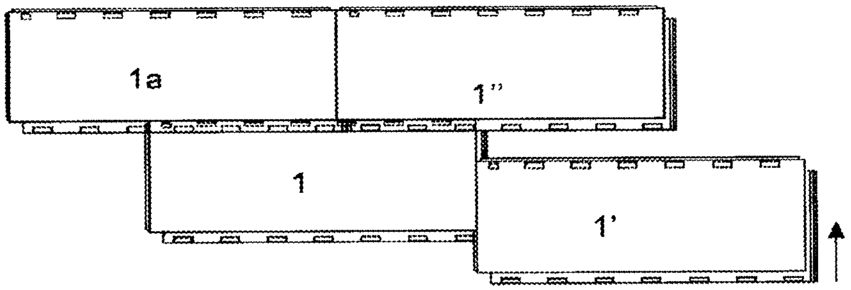
FIGS. 15*a*-15*e* show how panels with protrusions on long and short edges could be locked.
Figure 15B:
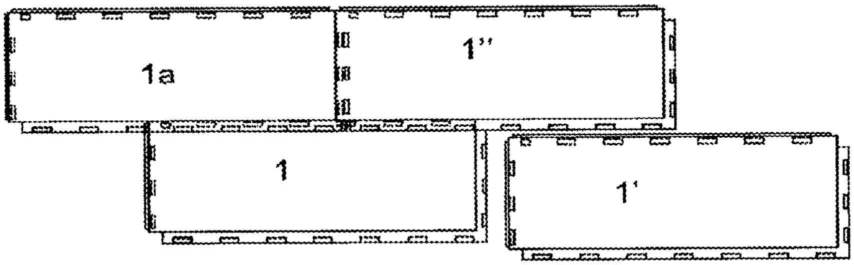
Figure 15C:
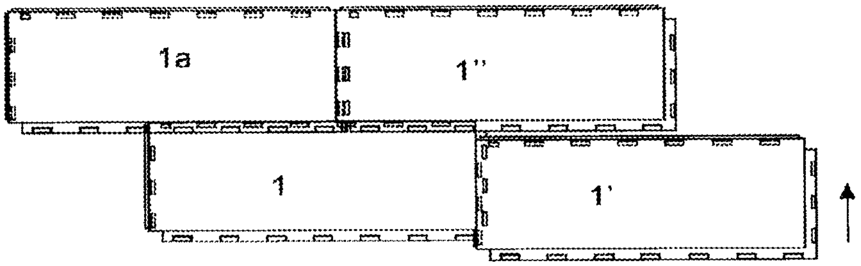
Figure 15D:
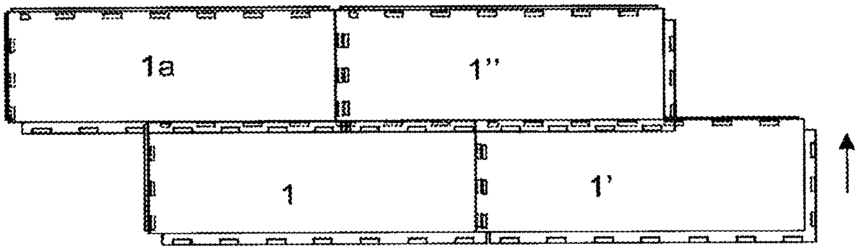

FIGS. 15*a*-15*e* show alternative ways to install panels comprising protrusions on long edges. FIG. 15*a* shows that adjacent short edges of a second 1 and a new panel 1' in a second row could be locked vertically and horizontally with for example angling, horizontal snapping or insertion along the joint. The new panel 1' could thereafter be displaced and connected to the adjacent long edge of a first panel 1" in a first row, provided that the second panel 1 is not completely locked. This will allow the protrusions to match the cavities on the long edge. The second 1 and the new panels could thereafter be displaced along the connected long edges and locked vertically and horizontally.

Figure 15E:
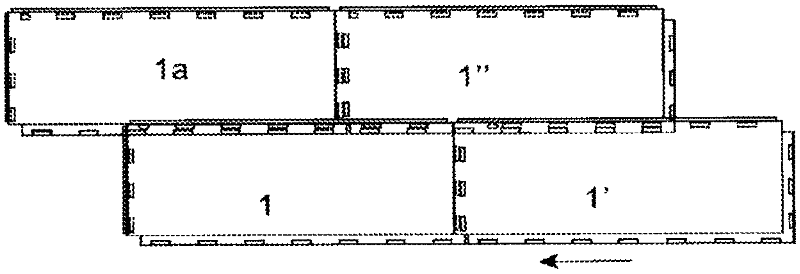

FIGS. 15*b*-15*e* show an alternative installation method. The short edges of the second 1 and new 1' panels could be locked by a vertical or horizontal connection of the edges followed by a displacement along the short edges such that the protrusions overlap each other and until the upper parts of the adjacent long edges are in contact, shown in FIGS. 15*b*-15*d*. The long edges are finally locked by a displacement of both said panels 1, 1' along the long edges of panels installed in an adjacent row and this brings the adjacent long edge protrusions in a horizontally overlapping position as shown in FIG. 15*e*.

The long edges could be form such that friction keeps the edges together until a whole row is displaced. The protrusions could be wedge shaped in the longitudinal direction such that a displacement along the edges will automatically align and preferably press the edges against each other. The individual rows could be prevented from sliding against each other after installation with for example friction, glue or flexible material that are inserted between the first and last panels in a row and the adjacent wall. Mechanical devices that snap or create friction integrated with the locking system and which lock the panels in a longitudinal position and prevent sliding could also be used.

Figure 16A:
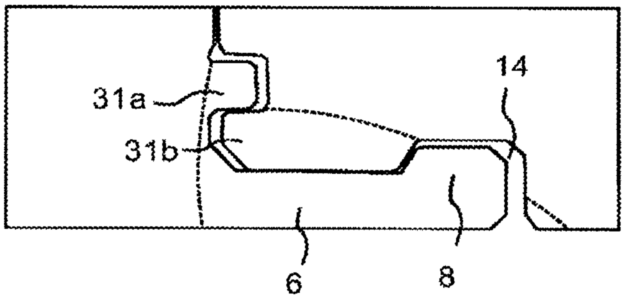
FIGS. 16*a*-16*c* show a one piece locking system, which could be connected with a vertical and/or horizontal displacement.
Figure 16B:
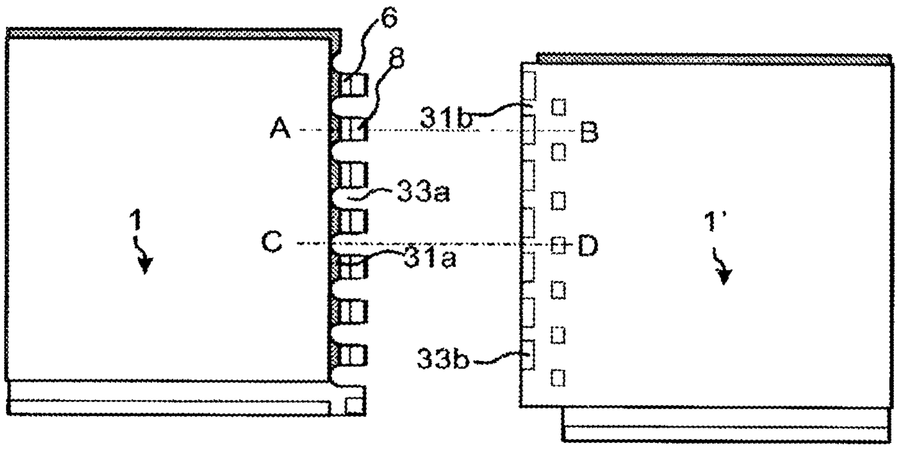
Figure 16C:
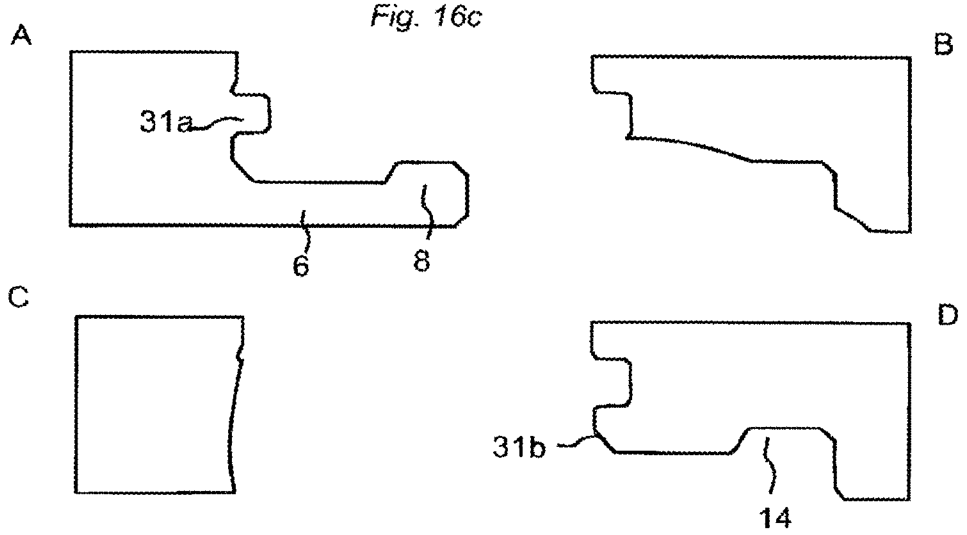
Figure 17A:
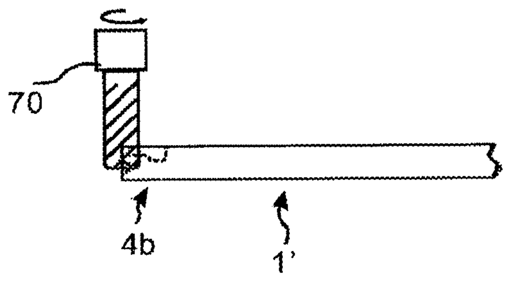
FIGS. 17*a*-17*e* show a method to produce protrusions according to a cutter principle.
Figure 17B:
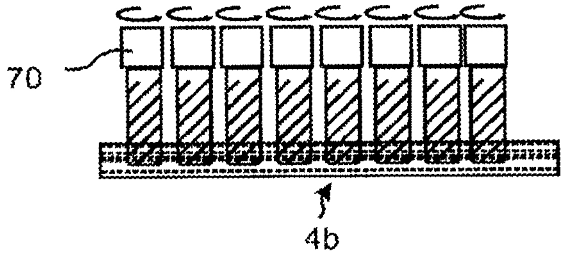
Figure 17C:
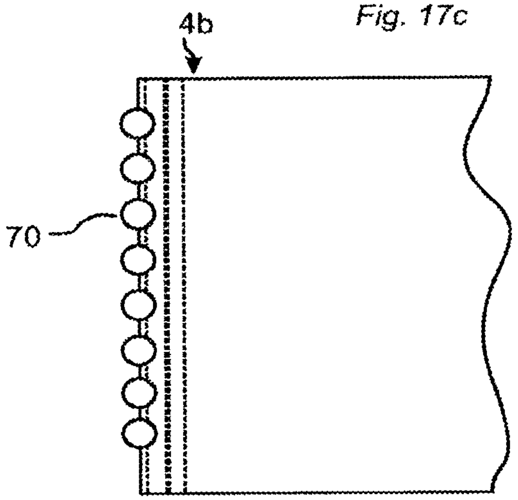
Figure 17D:
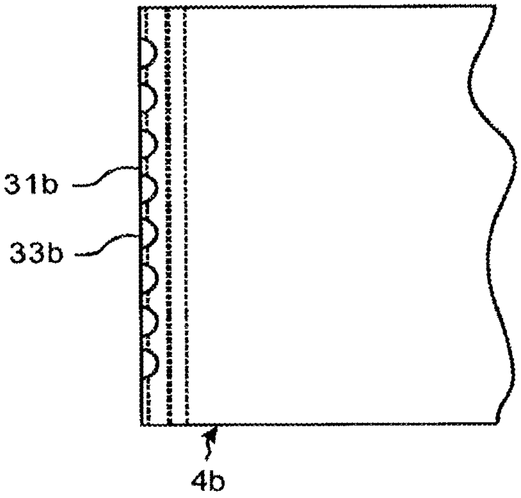
Figure 17E:
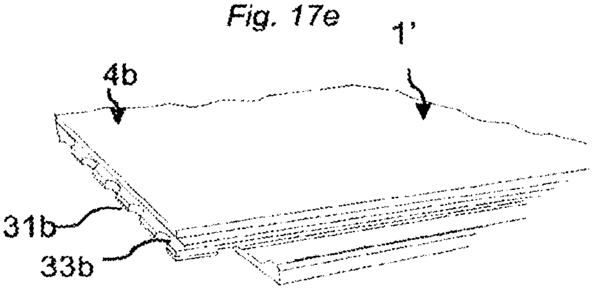
Figure 18A:
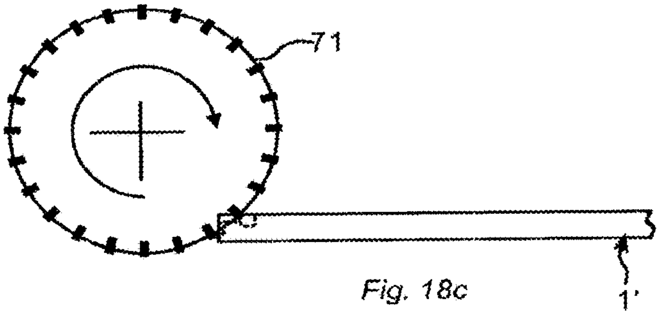
FIGS. 18*a*-18*e* show a method to produce protrusions with a saw blade principle.
Figure 18B:
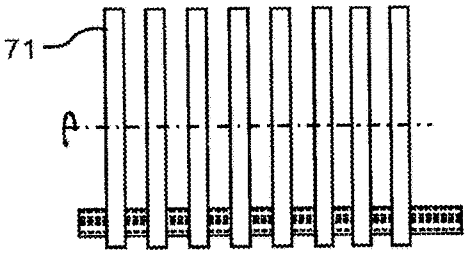
Figure 18C:
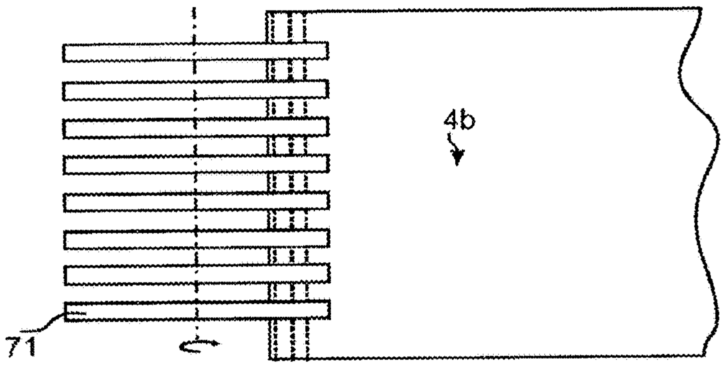
Figure 18D:
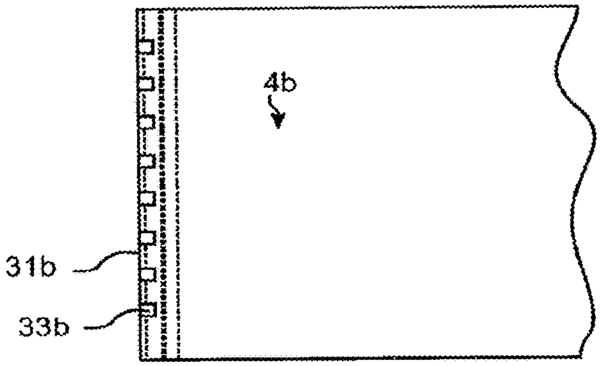
Figure 18E:
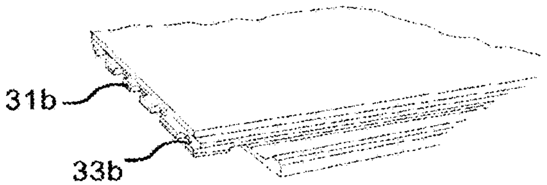

FIGS. 16*a*-16*c* shows that the embodiments shown in FIGS. 9*a*-9*d* and FIGS. 12*a*-12*f* could be combined and that adjacent short edges comprising matching protrusions 31*a*, 31*b* and cavities 33*a*, 33*b* could be connected with a vertical and/or horizontal motion and locked vertically and horizontally with a displacement along the adjacent edges such that the protrusions 31*a*, 31*b* overlap each other and locks the adjacent edges vertically and that the locking element 8 enters into the locking groove 14 and locks the adjacent edge horizontally. Such a locking system could be used to lock the short edges according to FIGS. 15*b*-15*d*.

FIGS. 17*a*-17*e* shows a production method to form cavities 33*b* and protrusions 31*b* according to the cutter principle. Several cutters 70 could be used, one for each cavity. This principle could be used on long and short edges for the tongue and/or the tongue groove side. The forming could take place before or after the profile cut.

FIGS. 18*a*-18*e* show that the above mentioned forming could also be made with the saw blade principle where preferably several saw blades 71 preferably on the same axes, forms the protrusions 31*b* and cavities 33*b*.

FIGS. 19*a*-19*e* show a method to form the above mentioned protrusions 31*b* and cavities 33*b* with a screw cutter principle. Such forming could be produced in a very cost efficient way in a continuous production line and with high accuracy especially if the panel position is synchronized accurately with the tool position and the tool rotation speed. The screw cutter 72 could be used as separate equipment or more preferably as an integrated tool position in a double-end tenoner. It could have a separate control system or more preferably a control system that is integrated with the main control system 65 of the double-end tenoner. The edge is displaced essentially parallel to the axis of rotation AR of the screw cutter tool 72. It is possible to produce any shape, with round or sharp portions. The cutting could take place before, after or in connection with the profile cutting. When forming short edges, it is preferable to use the method as one of the final steps when the long edge and at least the major parts of the short edge locking system have been formed. It is preferable in some embodiments to form the protrusions and cavities on the groove side before the tongue groove 20 is formed. This reduces the amount of lose fibres and chipping on the inner walls of the cavities and protrusions.

Figure 19A:
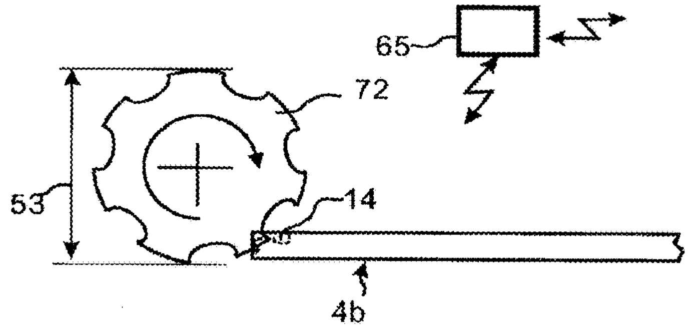
FIGS. 19*a*-19*e* show a method to produce protrusions according to a screw cutter principle.
Figure 19B:
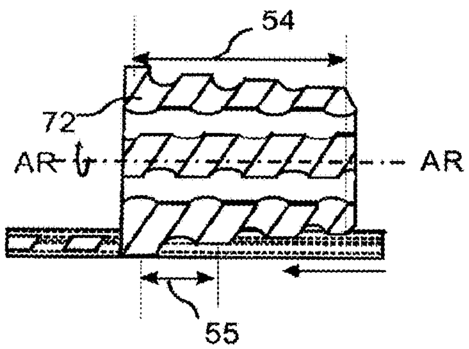
Figure 19C:
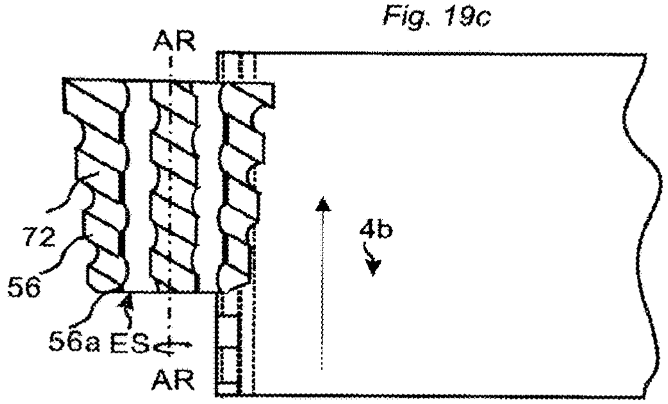
Figure 19D:
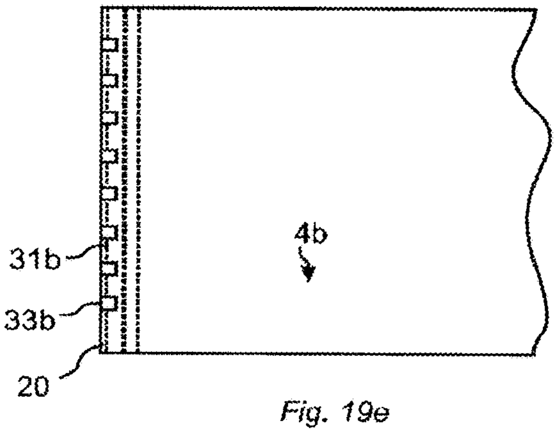
Figure 19E:
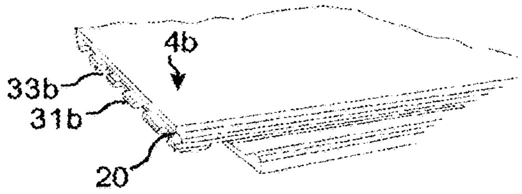

The position in the length direction of a cavity 33*b* formed on a panel edge depends on the position of the first entrance tool tooth 56*a* that comes into contact with the panel edge as shown in FIG. 19*c*. This means that the rotation of the tool must be adjusted to the panel edge that is moved towards the tool. Such an adjustment could be made by measuring the speed of a transportation chain or a belt or the driving device that moves the chain or the belt. This could be suitable when forming the short edges since a chain generally displaces the panels with chain dogs, which are positioned at very precise intermediate distances. Alternatively the adjustments could be made by a measurement of the position of a panel when it approaches the screw cutter tool. This alternative could be used for example when the long edges are machined.

The diameter 53 of the shown screw cutter tool 72 should preferably be smaller on the entrance side ES than on the opposite exit side. The screw cutter tool could however have the same diameter 53 over the whole length 54. The increased cutting depth could in such a tool configuration be reached with an axis of rotation that is slightly angled in relation to the feeding direction of the panel edge.

The pitch 54 of the tool configuration defines the intermediate distance of the cavities and the protrusions. It is therefore very easy to form a lot of cavities and protrusions with very precise intermediate distances over a considerable length of a joint.

The teeth 56 of a screw cutter should preferably be made of industrial diamonds. The tool diameter 53 is preferably about 50-150 mm and the tool length 54 about 30-100 mm. Each tooth should preferably have a cutting depth of 0.05-0.2 mm.

Figure 20A:
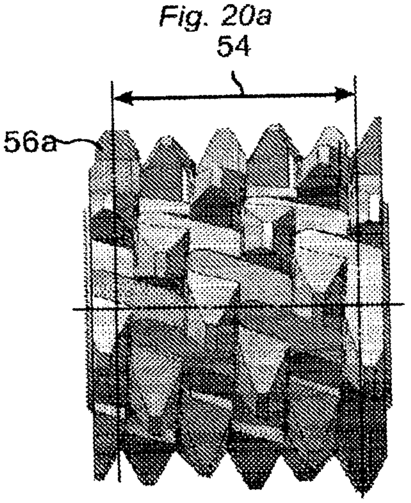
FIGS. 20*a*-20*d* show an example of a screw cutter tool.
Figure 20B:
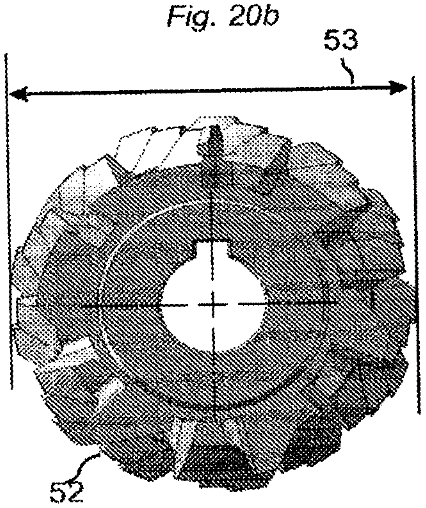
Figure 20C:
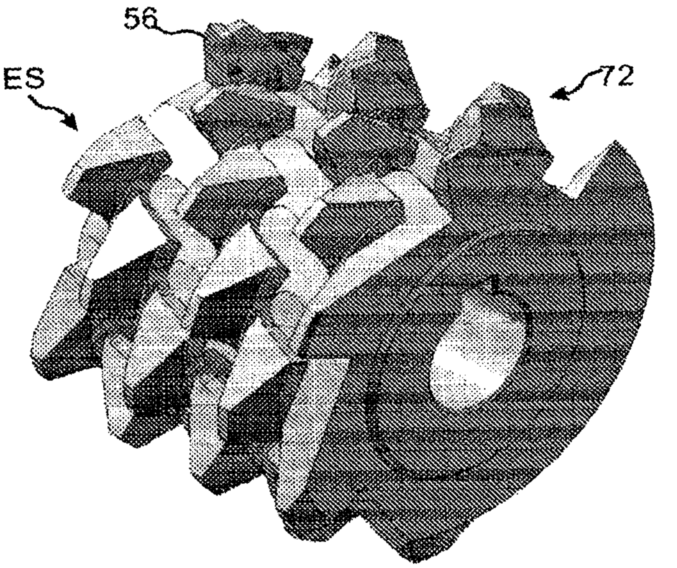

FIGS. 20*a*-20*c* show an example of a screw cutter 72 which has been designed to form cavities and protrusions in a 6-10 mm thick laminate flooring edge with a core of HDF material. It comprises 32 teeth 56, each with a cutting depth of 0.1 mm which allows forming of cavities with 3.2 mm walls. The pitch is 10 mm and the teeth are positioned in 5 screw rows. The diameter 53 is 80 mm and the length 54 is 50 mm. The rotation speed is about 3000 revolutions per minute, which means that the feeding speed could be 3000*10=30.000 mm/min or 30 meter per minute. The feeding speed could be increased to 40 meter if the rotation speed is increased to 4000 revolutions. The pitch could be increased to 20 mm and this could increase the feeding speed further to 80 meter/minute. The screw cutter could easily meet the conventional feeding speed of 55 meter/minute, which is generally used in production of the short edge locking system. The screw cutter could also be designed to allow a feeding speed of 200 meter/minute if required when forming three-dimensional grooves on short edges.

The screw cutter could have more than one entrance 56*a* and double screw rows of teeth and this could increase the feeding speed considerably.

The position of the cavities in relation to an edge corner could be made with a tolerance of less than 1.0 mm and this is sufficient to form a high quality locking system according to the invention.

It is an advantage if the intermediate distance between the chain dogs is evenly divided with the pitch. 300 mm between the dogs and a pitch of 10 mm means that the screw cutter should rotate exactly 30 revolutions, in order to teach the same position. This means that only a small adjustment of the screw cutter is needed in order to reach the correct position and to over bridge eventual production tolerances.

Figure 20D:
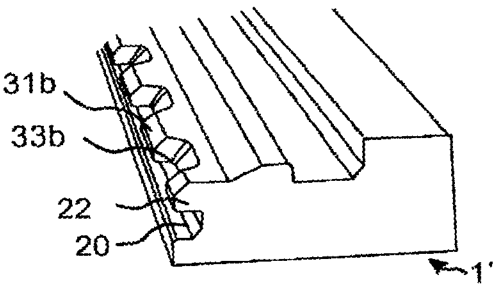

FIG. 20*d* shows an edge part 1' with the surface turned downwards, of an 8 mm laminate flooring, which has been formed with the screw cutter 72 shown in FIGS. 20*a*-20*c*. The protrusions 31*b* and cavities 33*b* are formed on the lower lip 22 of the tong groove 20. The inner part of the cavity 33*b* is smaller than the outer part and has the same geometry as the tool tooth. The cavity could be larger than the tooth if the teeth are displaced in the tool or if the tool rotation is not completely adjusted to the feeding of the panel. The intermediate distance will however still be the same.

The screw cutter principle, which has never been used in flooring production, opens up possibilities to form new locking systems with discontinuous and non-parallel three-dimensional shapes especially on long edges. This new production method makes it possible to produce the above-described locking systems comprising protrusions and cavities in a very rational and cost efficient way. The principle could also be used to produce decorative grooves and bevels with variations in the length direction.

Figure 21A:
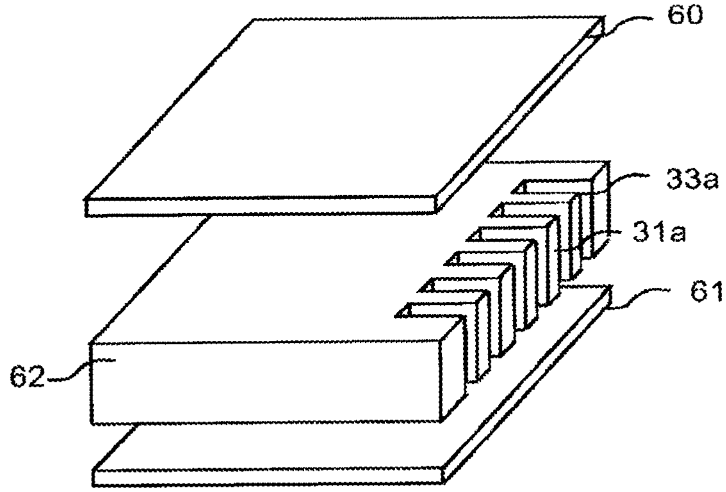
FIGS. 21*a*-21*c* show how protrusions could be formed in a wood flooring and forming of protrusions with a specially designed saw blade.
Figure 21B:
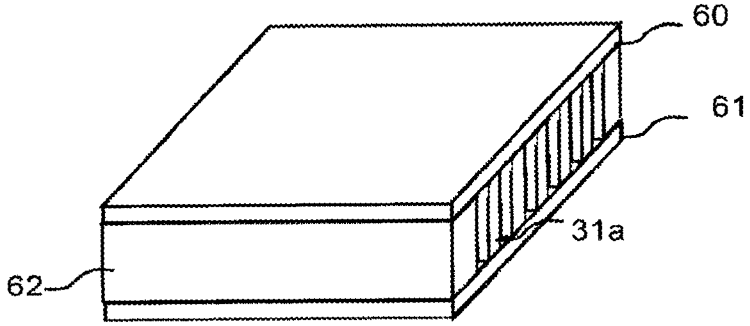

FIGS. 21*a*-21*b* show that forming of the protrusions could be made before the profile cut. A separate material 62 or the panel core with protrusions 31*a* and cavities 33*a* could be connected to an edge of the floorboard and preferably glued between a surface layer 60 and a balancing layer 61 in a wood or laminate floor. Any of the before mentioned production methods could be used to form the protrusions.

Figure 21C:
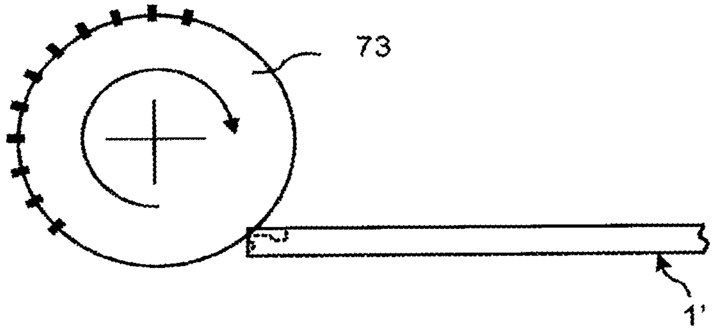

FIG. 21*c* shows that protrusions and cavities could be formed with a large rotating tool 73, similar to a saw blade, which comprise cutting teeth on only a portion of the tool body. This is a simple variant of the screw cutter principle and each rotation forms one cavity. The advantage is that the intermediate distance between the cavities could be changed by an adjustment of the tool rotation speed or the feeding speed of the panel. It is however more difficult to reach a high speed and sufficient tolerances. The large diameter could also be a disadvantage in several applications.

Figure 22A:
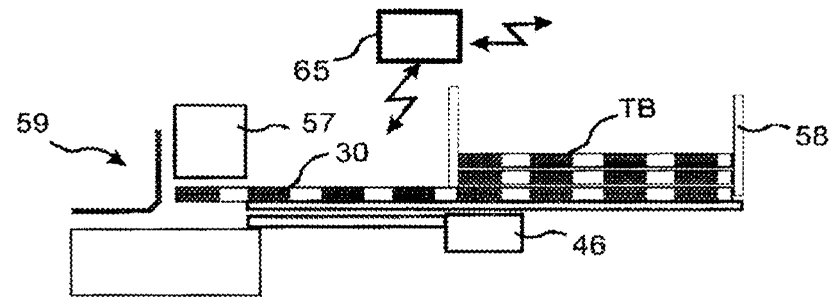
FIGS. 22*a*-22*f* show an equipment to connect a separate part to a panel edge.
Figure 22B:
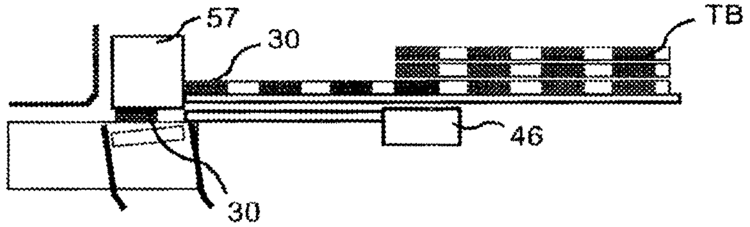
Figure 22C:
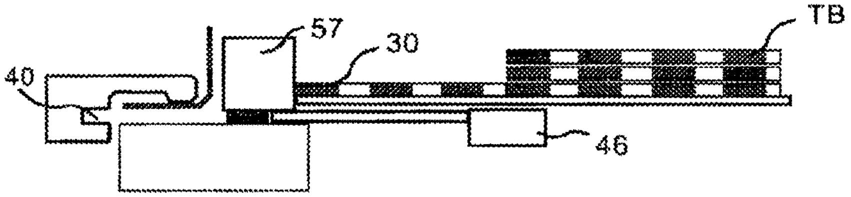
Figure 22D:
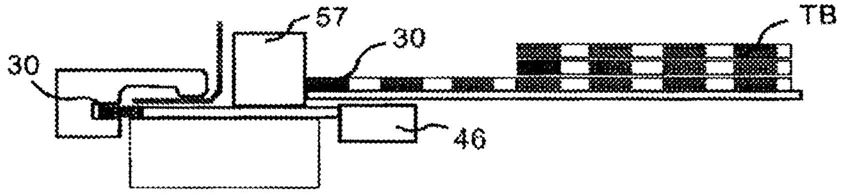
Figure 22E:
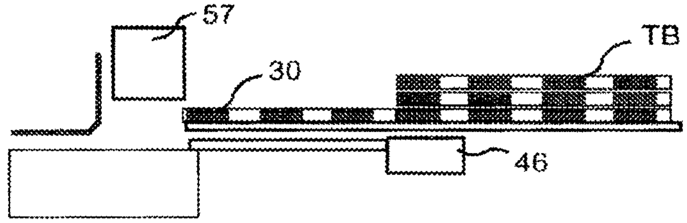
Figure 22F:
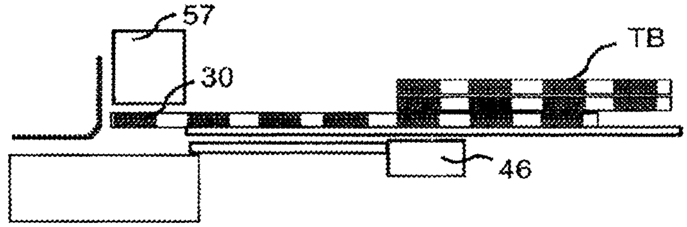

FIGS. 22*a*-22*f* show a method and an inserting device 59 to insert and fix a separate part, preferably a displaceable tongue 30 into an edge of a panel, preferably a floor panel. A tongue blank TB comprising several flexible tongues 30 is displaced from a stacking device 58 to a separation device 57 where the displaceable tongue 30 is separated from the tongue blank TB and displaced preferably vertically to a lower plane (FIGS. 22*a*, 22*b*) where a pusher 46 presses the displaceable tongue 30 into a displacement groove 40 on a panel edge (FIG. 22*d*) A new tongue could thereafter be separated from the blank as shown in FIGS. 22*e*-22*f*. The inserting device 59 should preferably be integrated with the double-end tenoner (not shown), which machines and forms the mechanical locking system. A first advantage of this principle is that the same chain or transportation device could be used to displace and position the edge of the floorboard. A second advantage is that the same control system 65 could be used to control the inserting device and the double-end tenoner. A third advantage is that the chain and the chain dogs could be adapted such that the intermediate distance of the chain dogs is well defined and preferably the same and this will facilitate a precise and easy fixing of the separate part into a groove. A fourth advantage much lower investment cost than in a case when two separate equipments with two separate control systems are used. This equipment and production method could be used in all locking systems comprising a separate part and not only the described embodiments.

The invention provides an equipment to produce a locking system with a separate part inserted into an edge. The equipment comprises a double-end tenoner with a transportation device that displaces a panel, an inserting device 59 with a pusher 46 that inserts the separate part and a control system 65. The inserting device is integrated with the double end tenoner as one production unit and the pusher and the transportation device are connected to the same control system that controls the transportation device and the pusher.

Figure 23A:
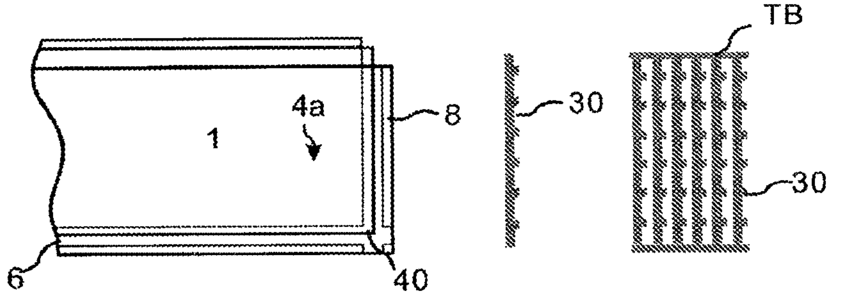
FIGS. 23*a*-23*e* show a method to connect a separate part to an edge by insertion along the joint and a tong blank comprising several tongues.
Figure 23B:
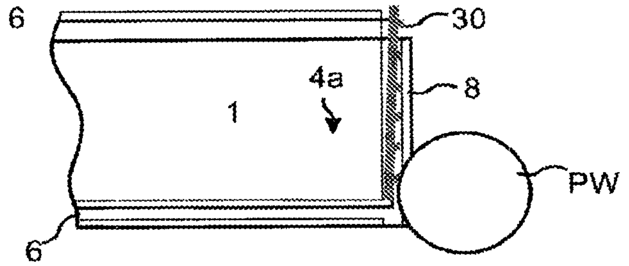
Figure 23C:
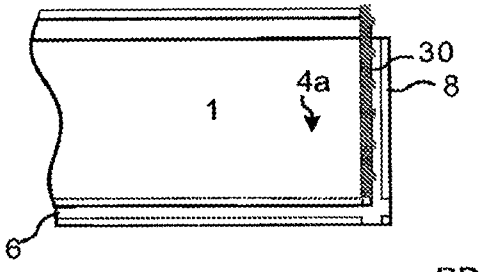
Figure 23D:
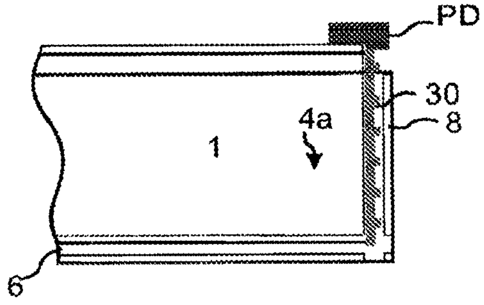

FIGS. 23*a*-23*d* shows connection of a separate tongue or any similar loose element. A displaceable tongue 30 is connected into a groove 40 at the edge with a pusher according to the above-described method. The pusher could preferably connect the whole tongue or only one edge of the tongue. FIG. 23*b* shows that a pressure wheel PW could be used to connect the displaceable tongue 30 further into a groove 40. FIG. 23*d* show that a position device PD could be used to position the tongue in relation to one long edge. This could be made in line in a continuous flow.

Figure 23E:
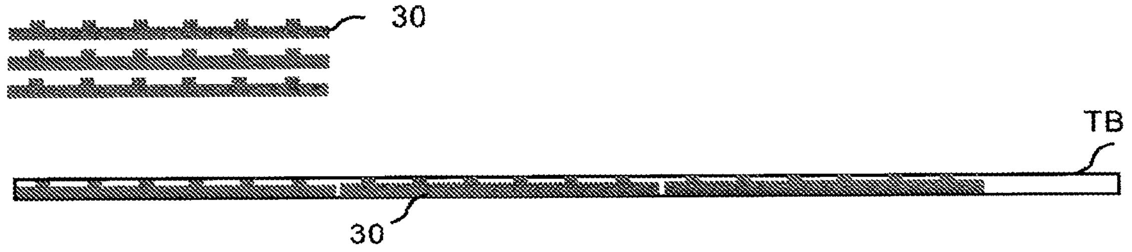

FIG. 23*e* show how a displaceable or flexible tongue 30 could be formed from a tongue blank TB, for example from an extruded section which is punched in order to form and separate the tongues from the extruded tongue blank TB. Friction connections could be formed for example by punching or with heat. The displaceable tongue could also be formed from a wood fibre based material such as HDF, plywood, hardwood etc. Any type of material could be used.

Figure 24A:
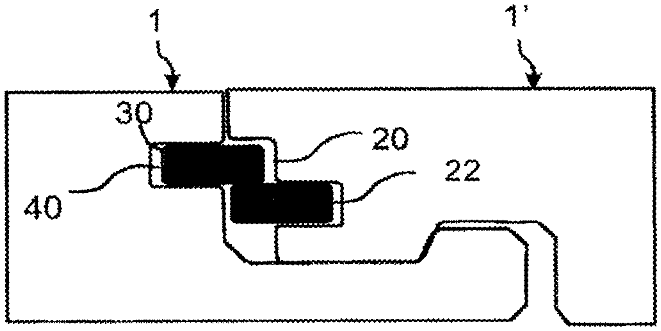
FIGS. 24*a*-24*c* show embodiments of locking systems.
Figure 24B:
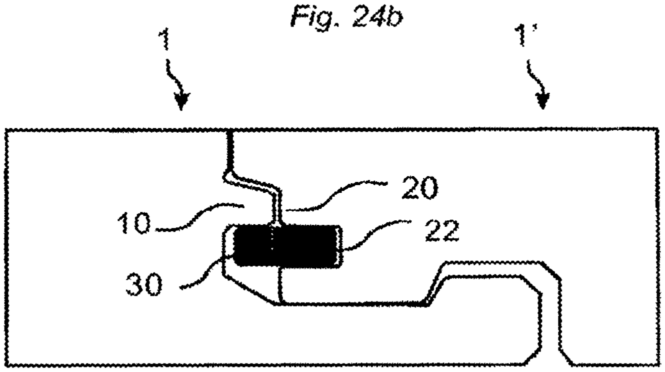
Figure 24C:
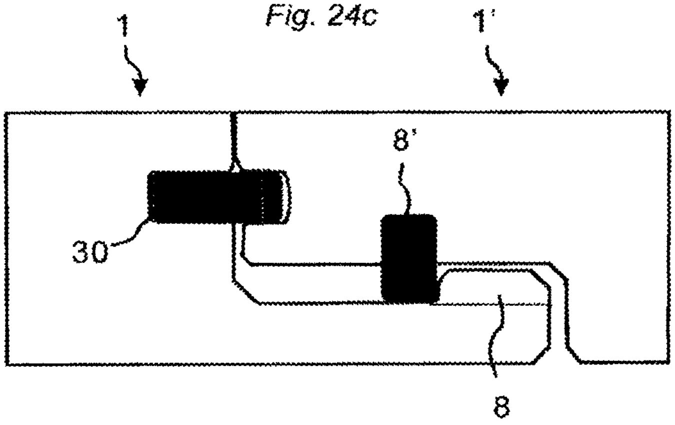

FIGS. 24*a*, 24*b* shows an embodiments where the lower lip 22 of the groove 20, with its protrusions and cavities, is made of a separate material which is connected to the edge. The locking system could comprise a displaceable tongue 30 and/or a displaceable lower lip 22. It is obvious that the tongue 30 could be made in one piece with protrusions and cavities and that only the lower lip could be displaceable. FIG. 24*c* shows that all principles that have been described for the vertical locking could be used to lock floorboards horizontally. A separate locking element 8' with vertically extending protrusions and cavities could be combined with a locking element 8 comprising similar protrusions and cavities. The locking element 8' or the panel edge could be displaced in order to lock panels horizontally where overlapping protrusions lock behind each other. The figure shows an embodiment with a flexible tongue 30 for vertical locking. It is obvious that a conventional one piece tongue could be used.

Figure 25A:
FIGS. 25*a*-25*d* show embodiments of displaceable tongues.
Figure 25B:
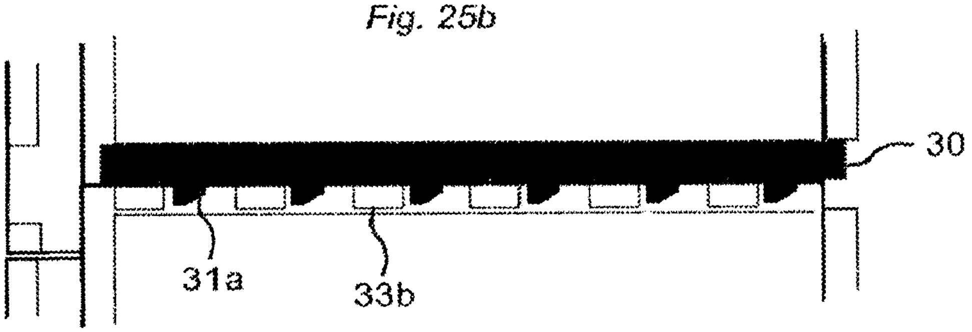
Figure 25C:
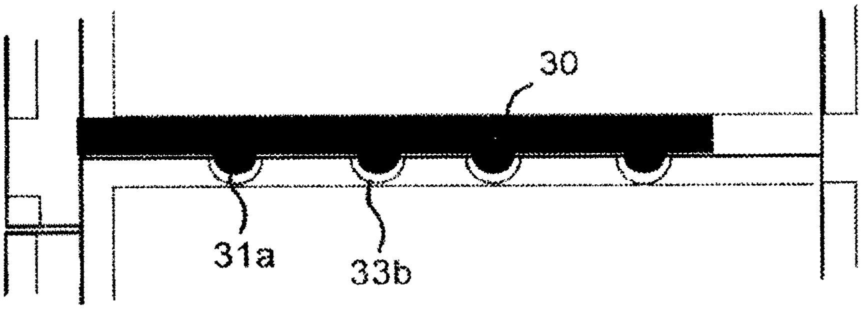
Figure 25D:
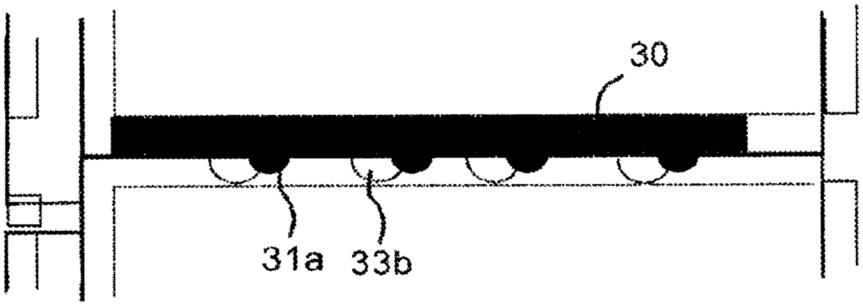

FIGS. 25*a* and 25*c* show embodiments of displaceable tongues 30 in unlocked position, FIGS. 25*b* and 25*d* in locked position. The tongue protrusions 31*a* could be wedge shaped or rounded and the tongue groove cavities 33*b* could also have various shapes such as rectangular, rounded etc. Rounded or wedge shaped protrusions facilitates locking since the overlapping could be obtained gradually during displacement.

Figure 26A:
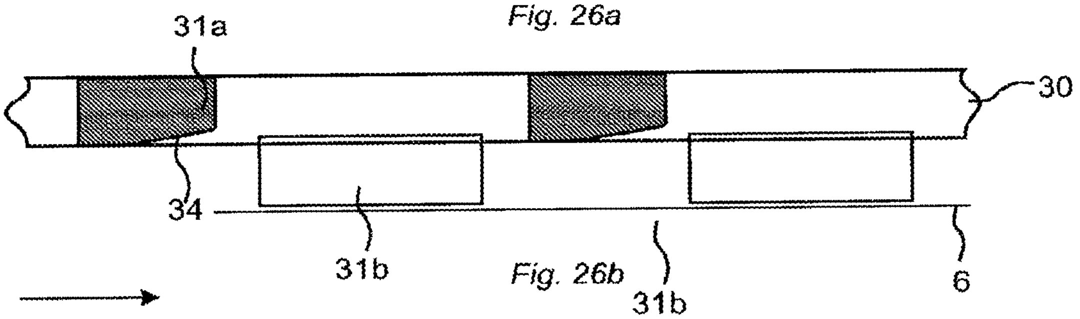
FIGS. 26*a*-26*e* show wedge formed tongue protrusions and locking systems with vertically extending snapping hooks.
Figure 26B:
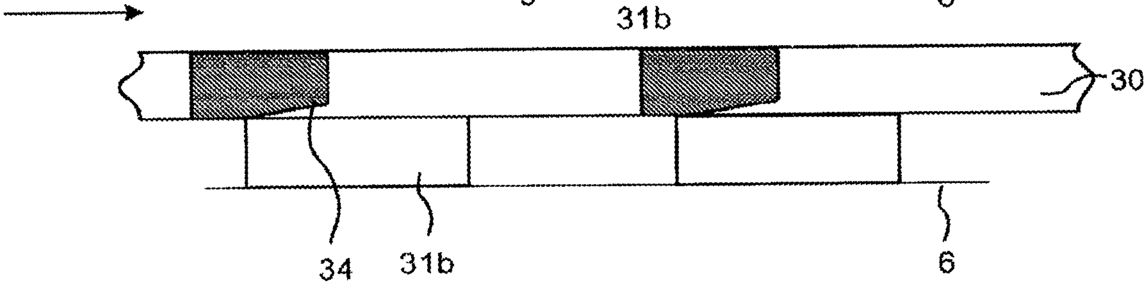

FIGS. 26*a*-26*b* shows that the tongue protrusions could have a lower contact surface 34, which is inclined upwardly to the horizontal plane. This lower surface could be used to press the groove protrusions 31*b* and the edge against the upper part of the strip 6 during displacement in order to lock the edges firmly vertically. The groove protrusions 31*b* could also be formed with vertically inclined walls.

Figure 26C:
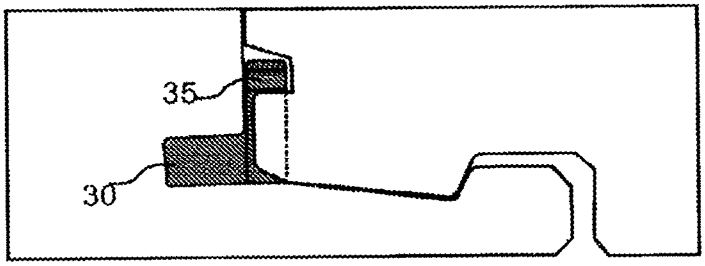
Figure 26D:
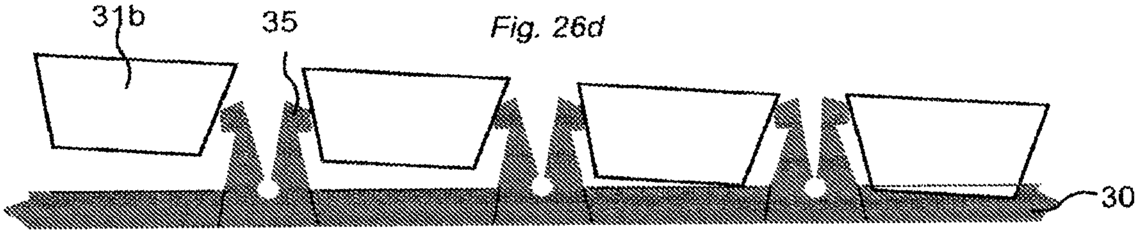
Figure 26E:
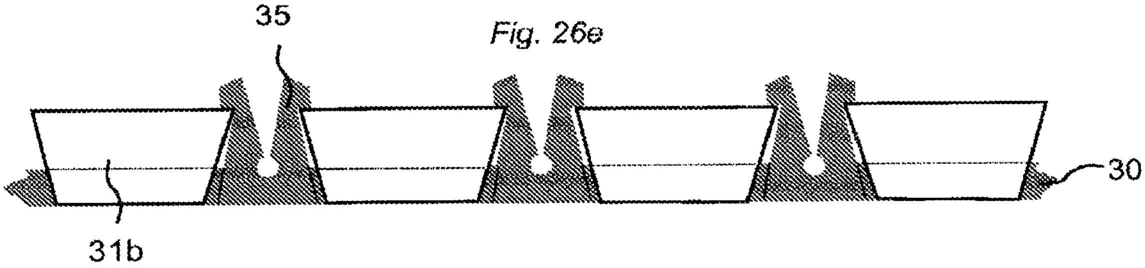

FIGS. 26*c*-26*e* shows that a separate tongue 30 could comprise hooks 35 that during the vertical snap folding snaps automatically and grip against the upper part of the groove protrusions 31*b*. The hooks could extend and flex vertically or horizontally.

Figure 27A:
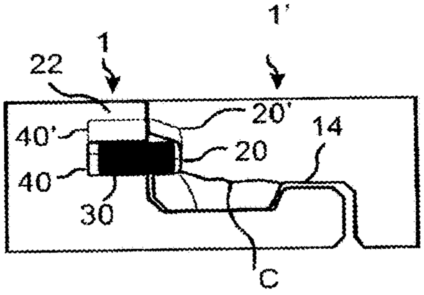
FIGS. 27*a*-27*f* show embodiments of locking systems with vertically offset grooves.

Several tests made by the inventor shows that a high vertical or horizontal load could cause a crack C on the strip panel 1, as shown in FIG. 27*a*. Such a crack occurs mainly between the lower part of the tongue groove 20 and the upper part of the locking groove 14. This problem is mainly related to thin floorings and floorings with a rather soft core with low tensile strength. Generally it is not preferable to solve such problems by just moving the position of the displacement groove 40' and the tongue groove 20' upwards since this will create a thin and sensitive upper lip 22 in the strip panel 1.

Figure 27B:
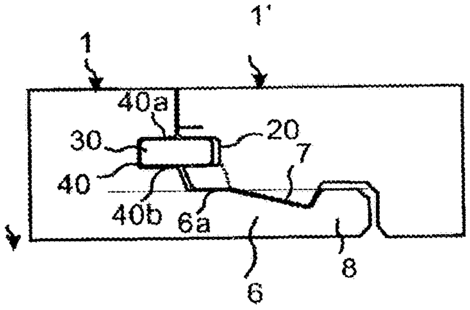

FIG. 27*b* shows that this problem could be solved with a locking system comprising a protrusion 7 on the groove side. This geometry allows that several mainly horizontally extending surfaces on the strip side 1, such as the lower contact surface 6*a*, and the upper 40*a* and lower 40*b* displacement groove surfaces, could be formed with the same tool and this could reduce production tolerances.

Figure 27C:
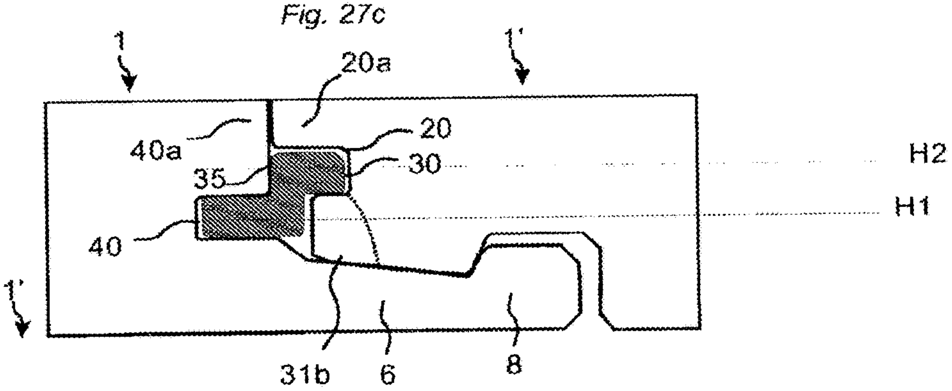
Figure 27D:
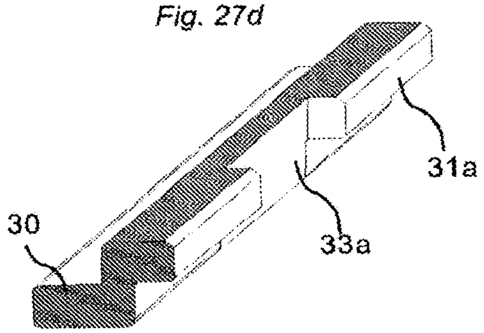

FIG. 27*c* show that this problem also could be solved with a locking system comprising a displacement groove 40 and a tongue groove 30 that are offset vertically in relation to each other. The displacement groove 40 is preferably located in a first horizontal plane H1 in one panel edge (1) and the tongue groove is located in second horizontal plane H2 in another panel edge (1,). The second horizontal plane H2 is located closer to the front face of the panel than the first horizontal plane H1. FIG. 27*d* shows a displaceable tongue 30 that could be used in a locking system with offset grooves.

Figure 27E:
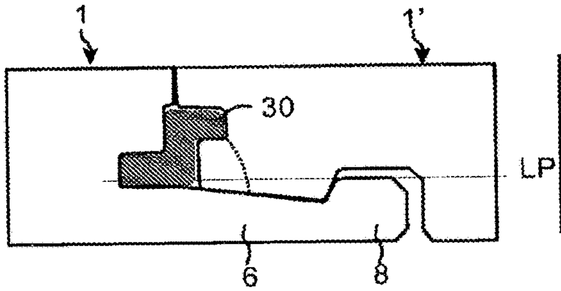

FIG. 27*e* shows a locking system with a displaceable tongue 30 that has a part, which is located under a horizontal locking plane LP that intersects with the upper part of the locking element 8. This gives an even stronger locking. Such a displacement groove could be produced in the conventional way with several tools working in different angles or with scraping or broaching.

Figure 27F:
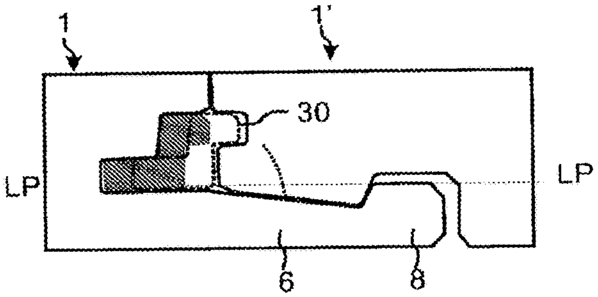

FIG. 27*f* shows that this principle could, with some modifications, also be used in the prior art locking system where a flexible tongue 30 is displaced mainly perpendicularly to the edge from one groove into an adjacent tongue groove with a vertical snap or side push.

Figure 28A:
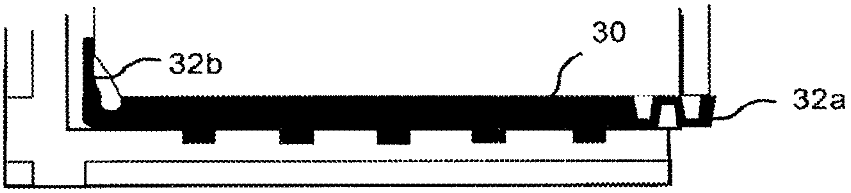
FIGS. 28*a*-28*e* show embodiments where the side push is replaced by a snapping along the joint.
Figure 28B:
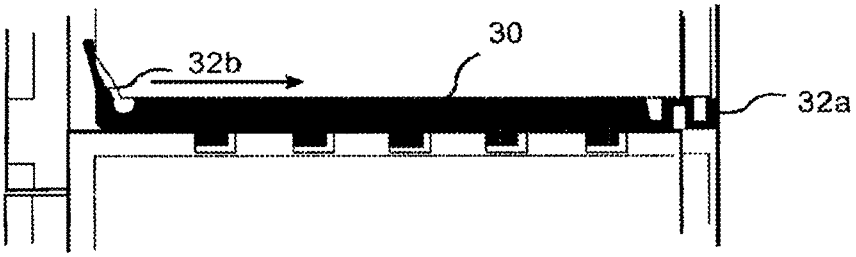
Figure 28C:
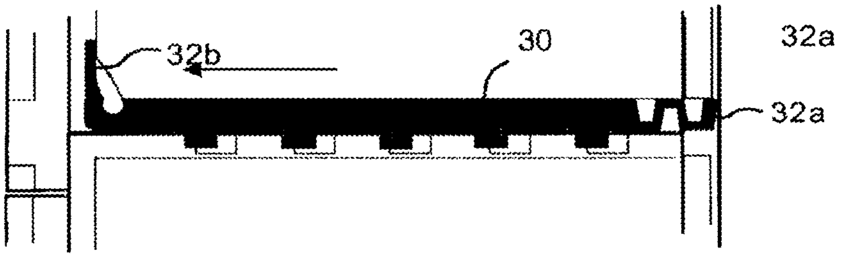
Figure 28D:
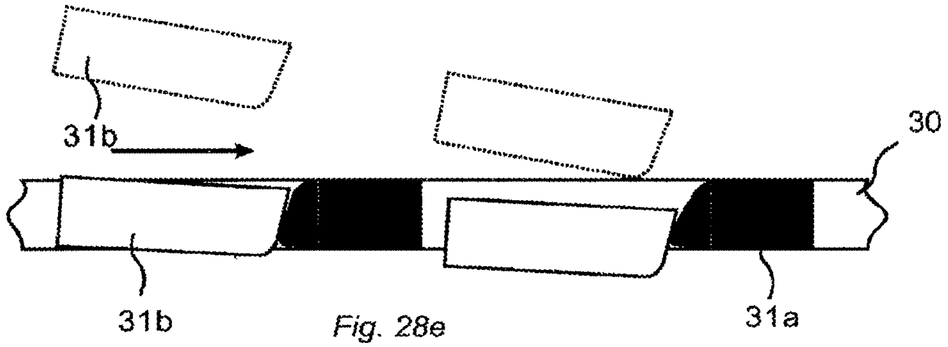
Figure 28E:
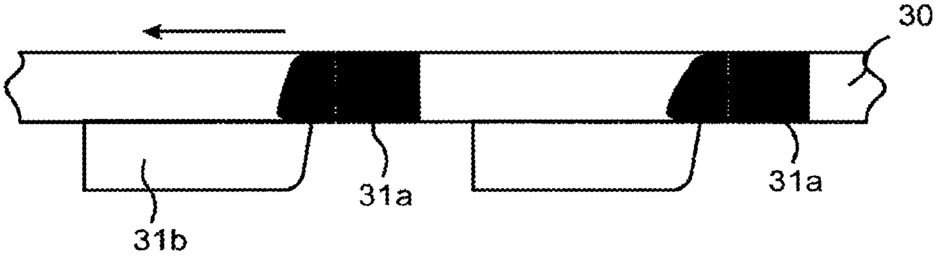

FIGS. 28*a*-28*e* shows another embodiment where a displaceable tongue 30 is displaced automatically during a vertical snap folding such that the displaceable tongue and the tongue groove protrusions overlap each other. The displaceable tongue comprises a flexible edge section 32*a*, which during folding is compressed as shown in FIG. 28*b*. The edge section 32*a* will press back the displaceable tongue 30 towards the original position when the panels edges are in the same plane and lock the edges as shown in FIG. 28*c*. The flexible edge section could also be formed as a flexible link 32*b*, which pulls back the displaceable tongue and locks the edges. These principles could be used separately or in combination. FIGS. 28*d* and 28*e* shows how a wedge shaped surfaces of the tongue and the tongue groove protrusions 31*a*, 31*b* cooperate during folding and displace the displaceable tongue such that it can snap back and lock vertically. Such wedge shaped surfaces could also be used to position the tongue during folding and to over bridge production tolerances.

Figure 3A:
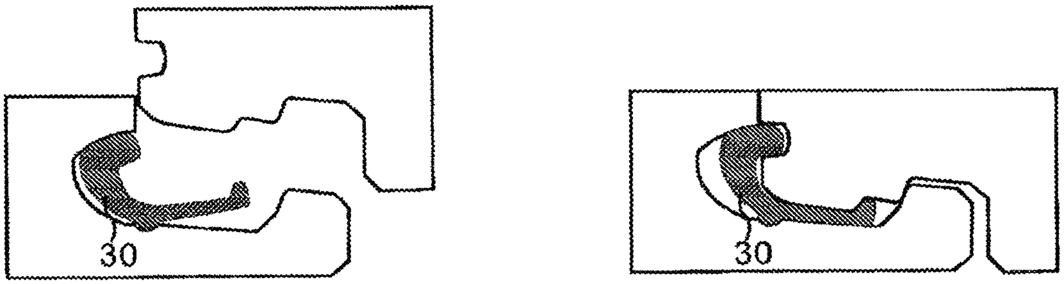
FIGS. 3*a*-3*c* show embodiments of prior art locking systems.
Figure 3B:
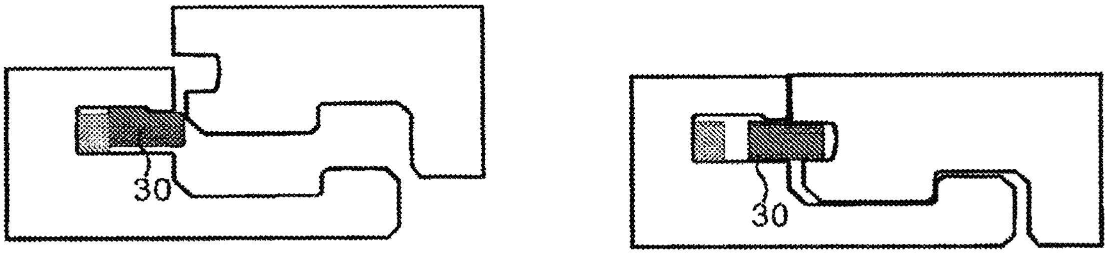
Figure 3C:
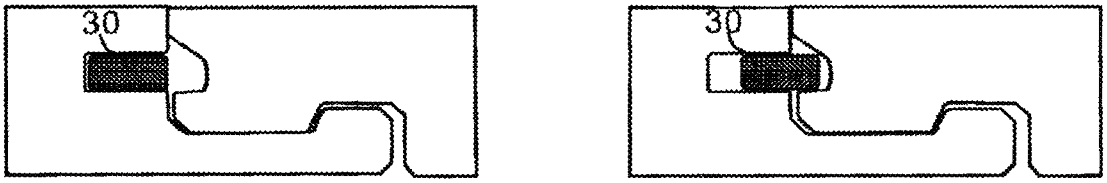
Figure 29A:
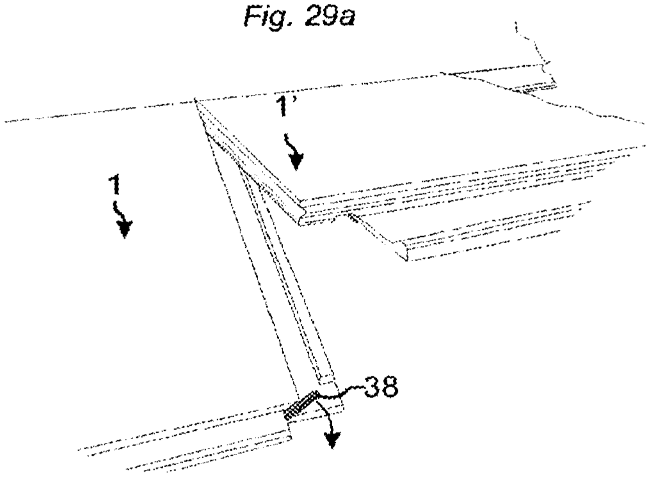
FIGS. 29*a*-29*e* show embodiments where the side push is replaced by a turning action.
Figure 29B:
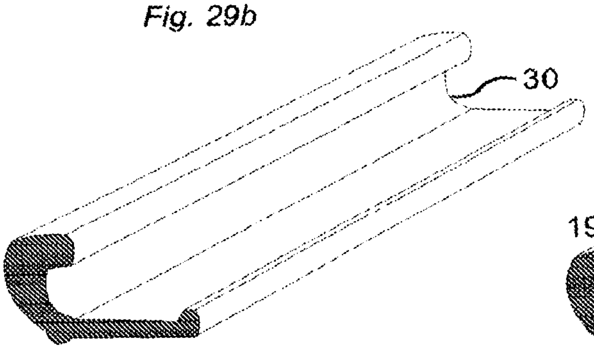
Figure 29C:
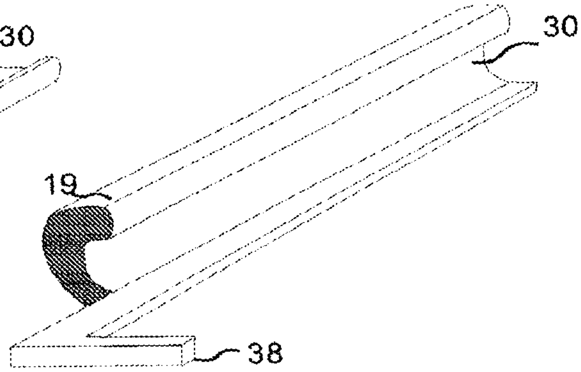
Figure 29D:
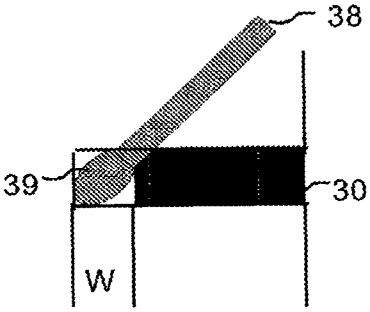
Figure 29E:
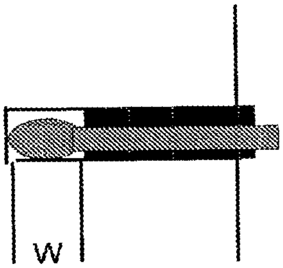

FIGS. 29*a*-29*e* shows that as an alternative to the side push a turning action could be used to lock adjacent edges of two panels 1, 1' when they are in the same plane. Such a locking could be accomplished without any snapping resistance and with limited separation forces. The known turn snap tongue 30 as shown in FIGS. 3*a* and 29*b* could comprise a turning extension 38 which could be used to turn the tongue 30 and to lock the edges as shown in FIG. 29*c*. The locking systems could also comprise two separate parts 39, 30 where one inner part 39 has a cross section such that the width W will increase and push a tongue 30 into an adjacent groove when the turning extension is turned vertically downwards. Displacement of a tongue could also be made with horizontal turning towards the long edge.

Figure 30A:
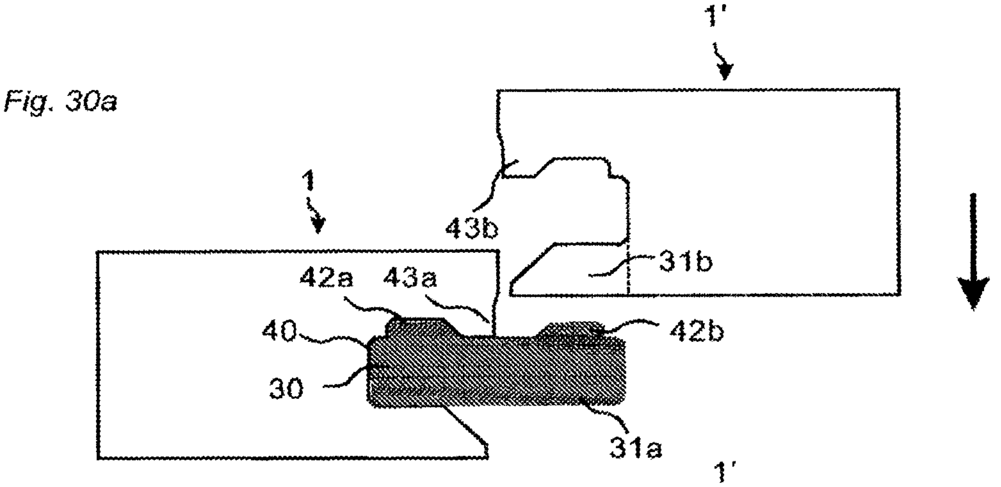
FIGS. 30*a*-30*d* show embodiments of a displaceable tongue, which locks the adjacent edges vertically (D1) and horizontally (D2).
Figure 30B:
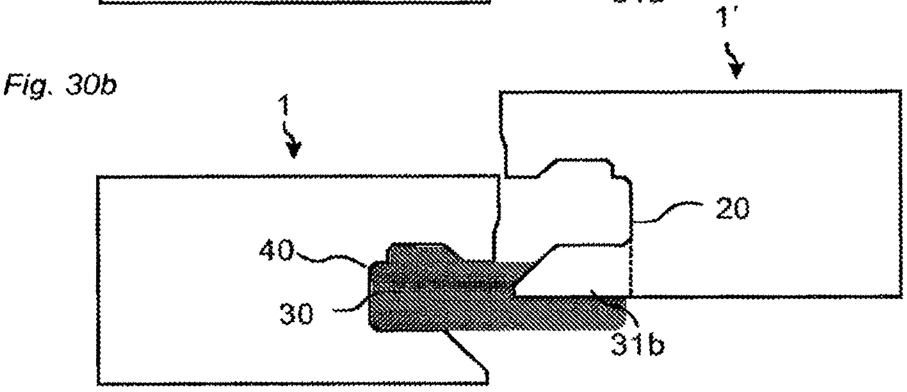
Figure 30C:
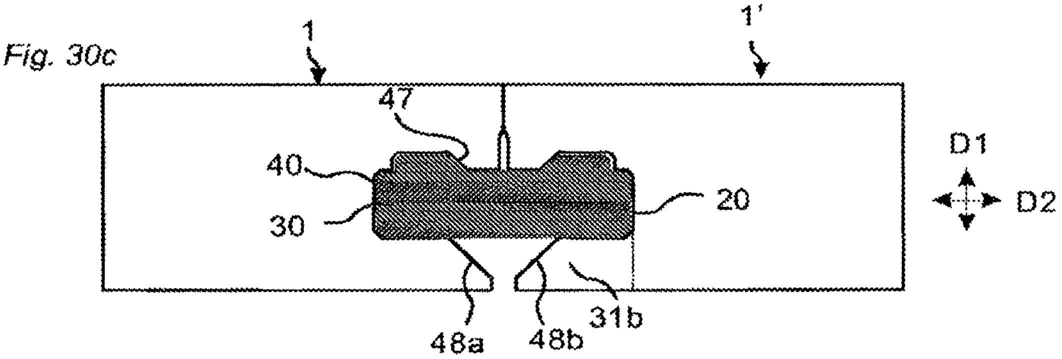
Figure 30D:
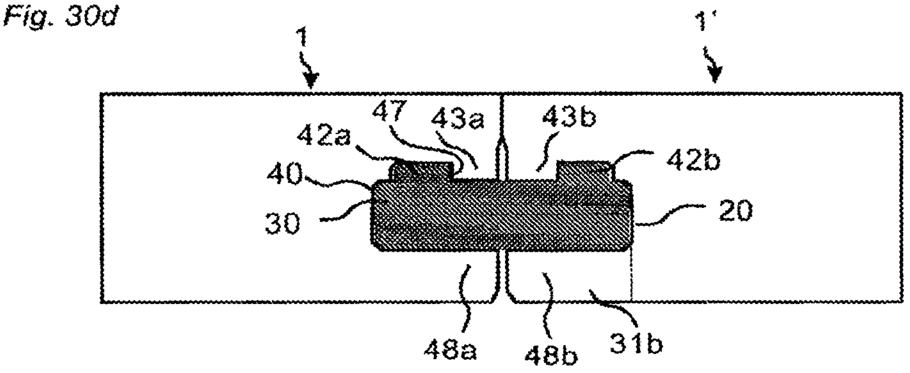

FIGS. 30*a*-30*d* show a locking system with a displaceable tongue (30) that locks the edges vertically (D1) according to the above-described embodiments but also horizontally (D2) when the displaceable tongue 30 is displaced along the joint such that the protrusions overlap each other. The displaceable tongue has at least two locking elements and each panel edge has at least one locking element preferably formed in one piece with the panel core. The displaceable tongue 30 comprises according to the embodiment shown in FIG. 30*a* two tongue locking elements 42*a*, 42*b*. The displacement groove 40 and the tongue groove 20 have also groove locking elements 43*a*, 43*b* made in one piece with the panel that cooperate with the tongue locking elements and lock the adjacent edges horizontally when the protrusions 31*a*, 31*b* are displaced in relation to each other such that they overlap each other as shown in FIGS. 8*a*-8*c*. FIG. 30*a* is drawn to scale and shows a 6.0 mm laminate flooring. The locking system is produced with large rotating tools. To facilitate such production, the locking system comprises lower lip edges 48*a*, 48*b* which have an angled part, adjacent to the displaceable tongue, extending outwardly and downwardly and which are located on a tongue surface which is opposite to a locking element 42*a* or 42*b*. Due to the fact that this locking system does not have a strip with a locking element and a locking groove in the rear side, it is possible to produce such a vertical push folding system even in very thin floor panels. FIG. 30*d* shows an embodiment where the locking elements 42*a,b*, 43*a,b* have essentially vertical locking surfaces 47 which have an angle of about 90 degrees to the horizontal plane. The lower lip edges 48*a,b* are essentially vertical. Such a locking system could have a high vertical and horizontal locking strength. The locking surfaces should preferably exceed 30 degrees to the horizontal plane. 45 degrees and more are even more preferable.

Figure 31A:
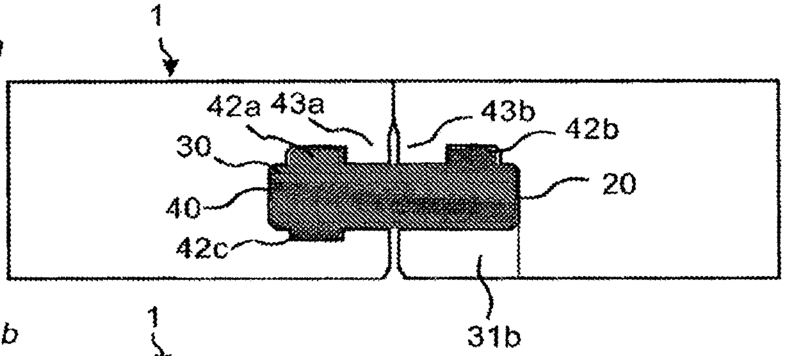
FIGS. 31*a*-31*e* show embodiments of a displaceable tongue, which locks the adjacent edges vertically and horizontally.

FIGS. 31*a*-31*e* show different embodiments of locking systems where the displaceable tongue locks vertically and horizontally. FIG. 31*a* shows a locking system with a displaceable tongue comprising three locking elements 42*a, b,c*.

Figure 31B:
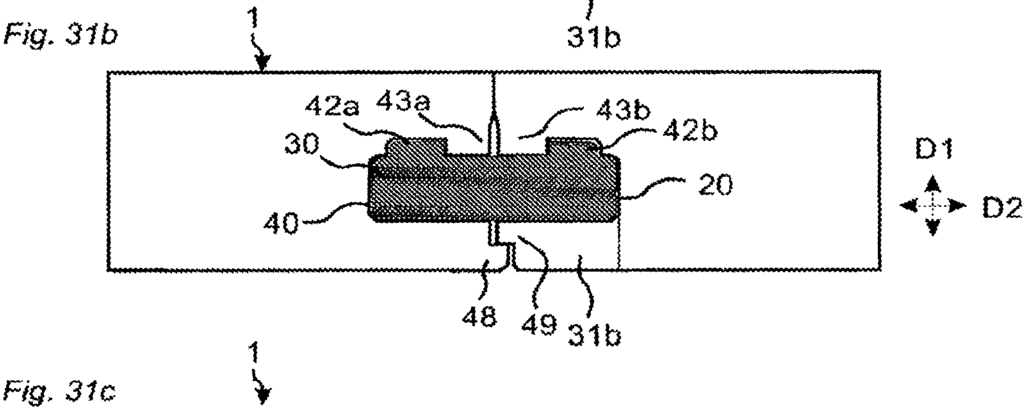

FIG. 31*b* shows a locking system with lower lips 48,49 that overlap each other vertically and locks the edges in one vertical direction. The displaceable tongue 30 could be designed such that it creates a pressure towards the overlapping lower lips 48,49 and this could improve production tolerances and the vertical locking strength.

Figure 31C:
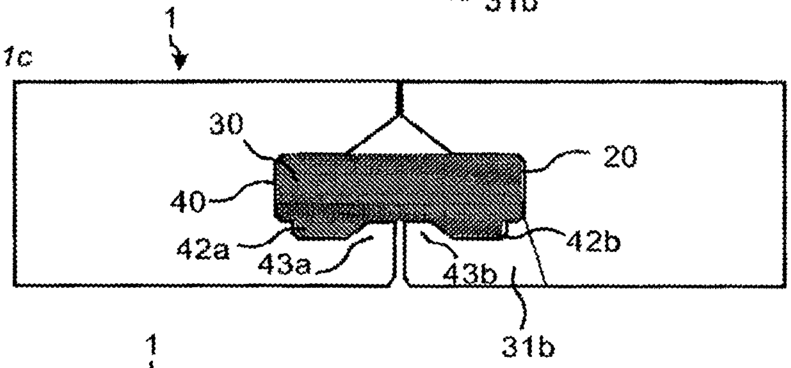

FIG. 31*c* shows a locking systems with two locking elements 42*a*, 43*a* and 42*b*, 43*b* in the lower part of each adjacent panel edge. This locking system is similar to FIG. 8*a* turned upside down.

Figure 31D:
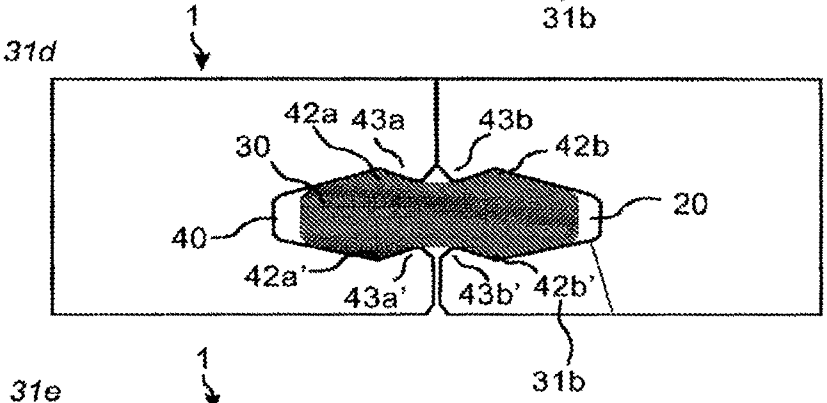
Figure 31E:
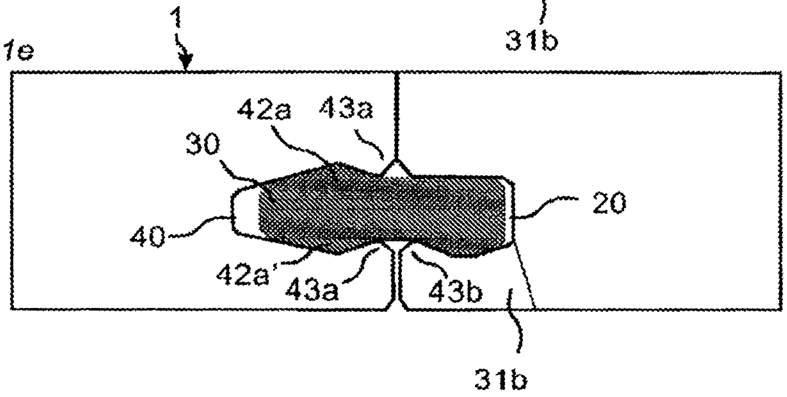

FIG. 31*d* show a locking system with eight locking elements 42*a,b,a,b*'43*a,b,a*',b'. The displaceable tongue could be connected to the edge with an essentially horizontal snapping. FIG. 31*e* shows a similar locking system with three plus three locking elements.

It is obvious that all these locking principles could be combined. One edge could for example have a locking according to FIG. 31*a* and the other according to FIG. 31*d* or 31*e* and all locking systems could have overlapping lower lips.

Figure 32A:
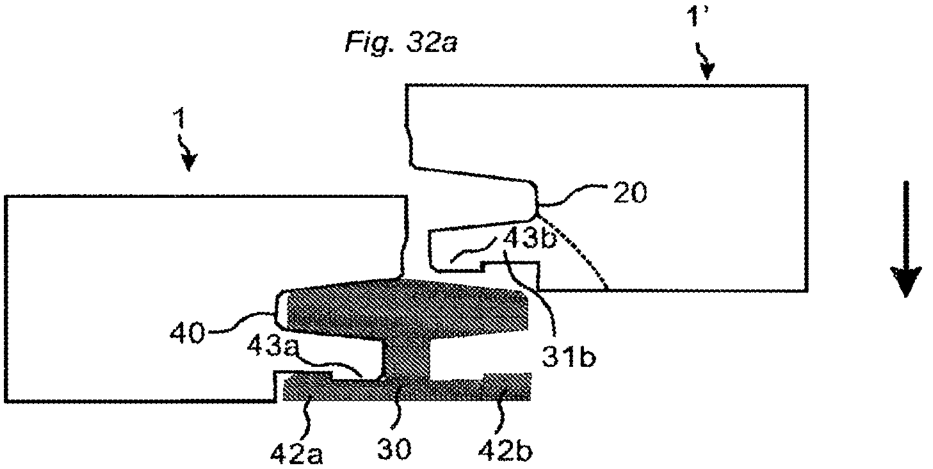
FIGS. 32*a*-32*d* show embodiments of a displaceable tongue, which locks the adjacent edges vertically and horizontally.
Figure 32B:
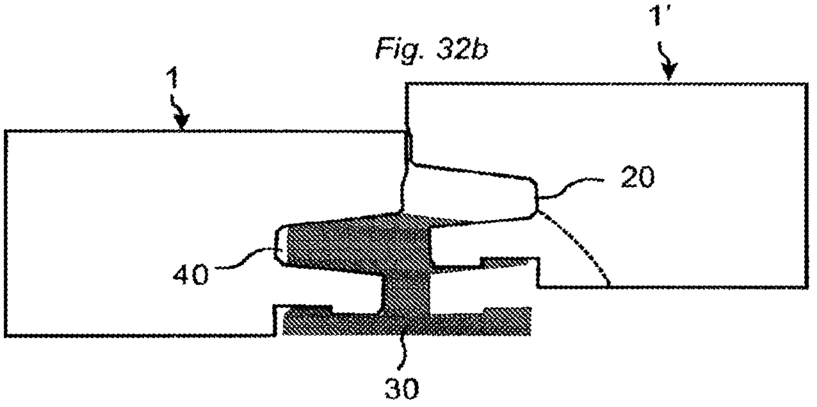
Figure 32C:
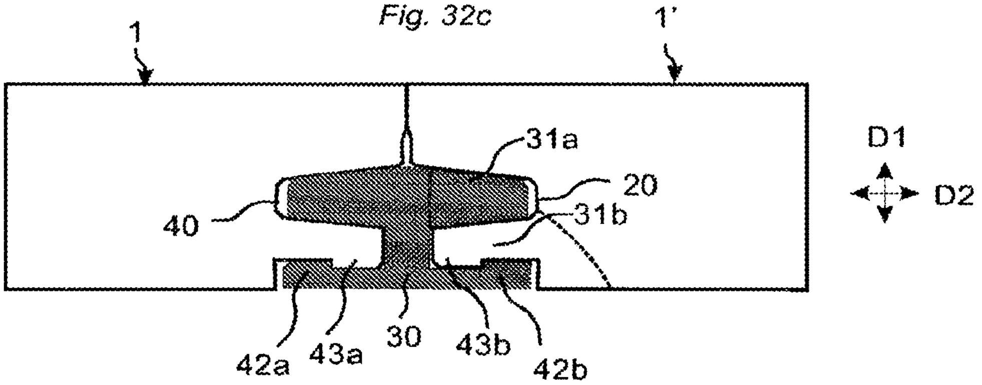
Figure 32D:
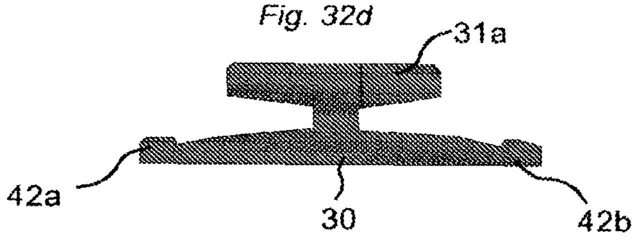

The shown one piece locking elements in FIGS. 30*a*-30*d* and FIGS. 31*a*-31*e* comprises locking elements with inner parts that are formed as an undercut groove. FIGS. 32*a*-32*c* shows however that the one piece locking elements 43*a,b* could also be formed on a rear side of the panel and not in a groove. This simplifies the production. The inner parts of the tongue locking elements 42*a,b* are however in this embodiment formed as an undercut groove. The tongue 30 could be produced by for example machining, injection moulding or extrusion and these production methods could be combined with punching if necessary. The tongue 30 could be formed with many different cross sections, for example with locking elements in lower lips extending beyond the upper lips as shown in FIG. 32*d*. Such an embodiment is easier to produce since it does not comprise any undercut grooves in the panel edges or in the tongue. Such displaceable tongues 30 could be connected to an edge with angling, snapping or insertion along the edge.

Figure 33A:
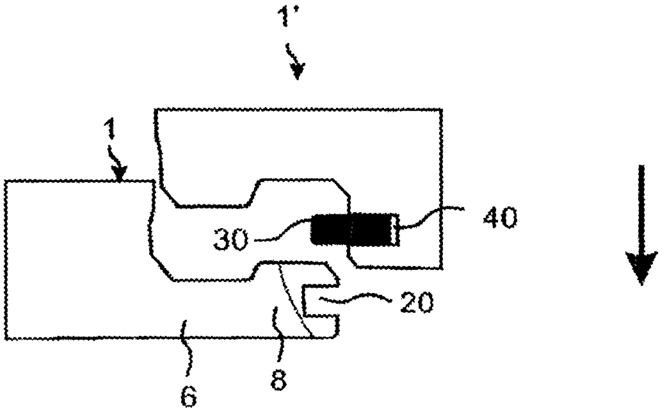
FIGS. 33*a*-33*c* show embodiments where a displaceable tongue locks in a groove on an outer part of a locking strip.
Figure 33B:
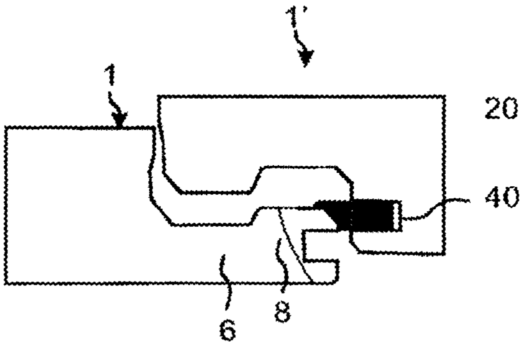
Figure 33C:
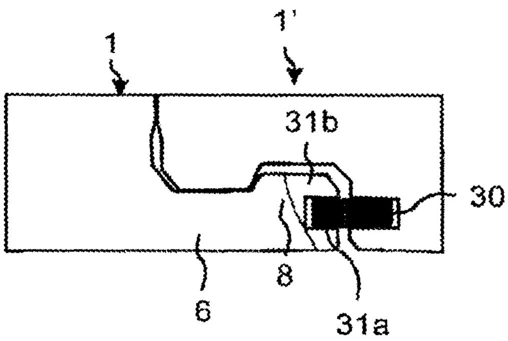
Figure 34A:
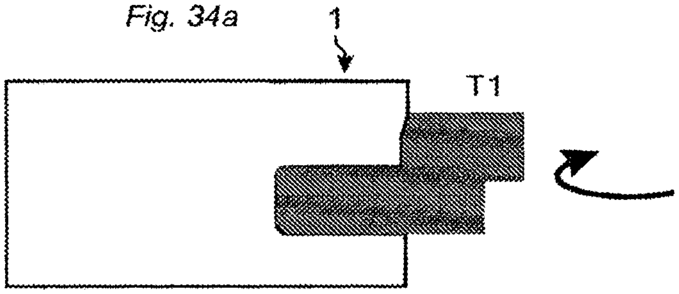
FIGS. 34*a*-34*d* show a production method to form undercut grooves.
Figure 34B:
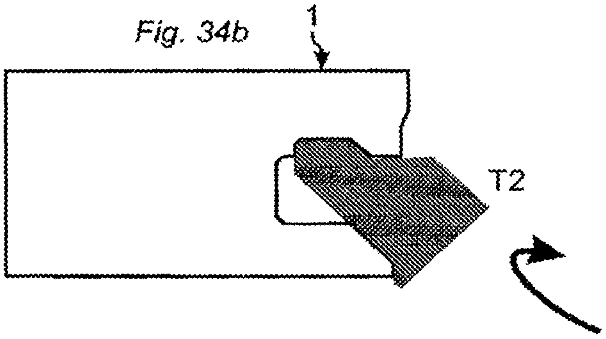
Figure 34C:
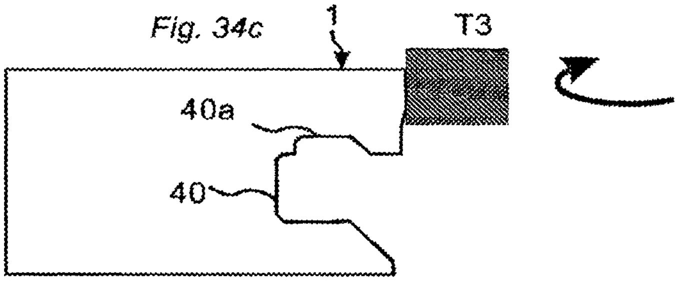
Figure 34D:
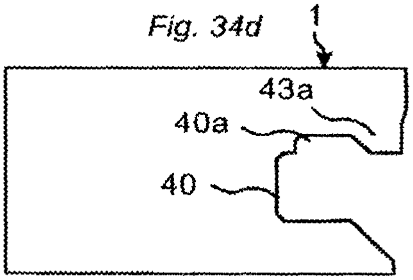

FIGS. 33*a*-33*c* show that the displaceable tongue could be arranged on the groove panel 1' such that it locks in a groove located on an outer part of the strip 6.

FIGS. 34*a*-34*d* show a production method to produce a locking element 43*a* in a locking system shown in FIGS. 8*a*-8*c*. The first tool position T1 could for example form a horizontal groove. Next tool position T2 could form an undercut groove 40*a* and finally a fine cutter in a third tool position T3 could form the upper part of the edge.

Figure 35A:
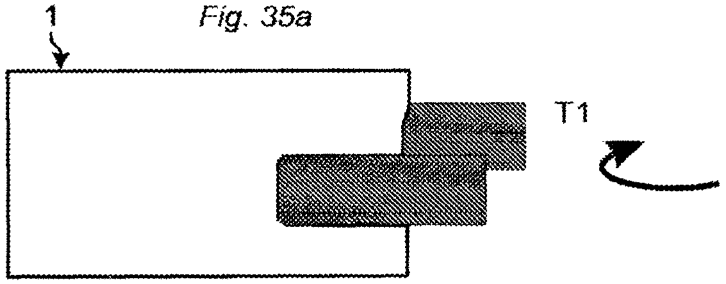
FIGS. 35*a*-35*c* show alternative production methods to form undercut grooves.
Figure 35B:
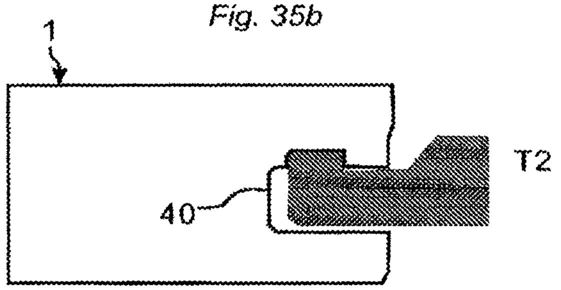
Figure 35C:
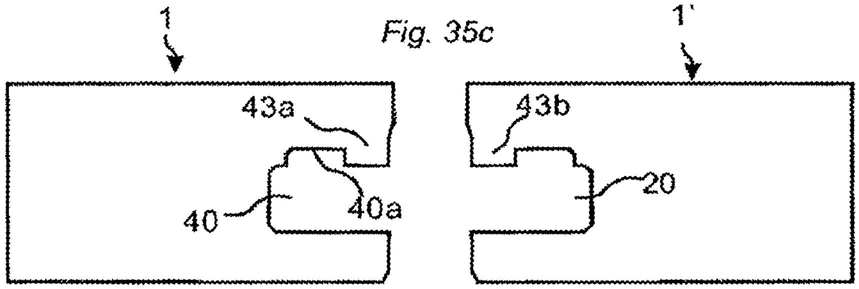
Figure 36A:
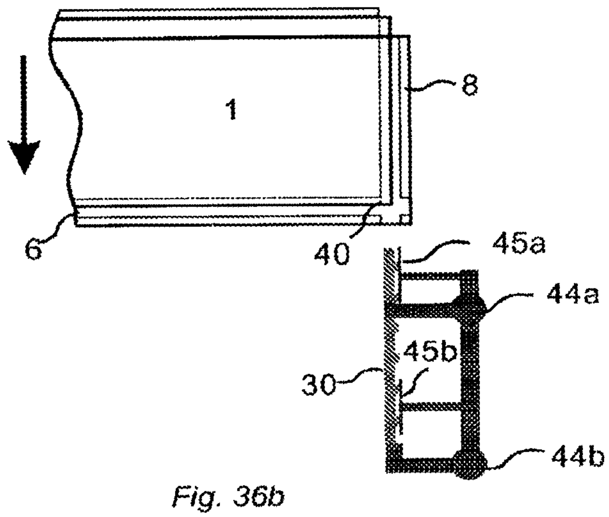
FIGS. 36*a*-36*d* show a method to connect a separate part into an edge with insertion along the joint.
Figure 36B:
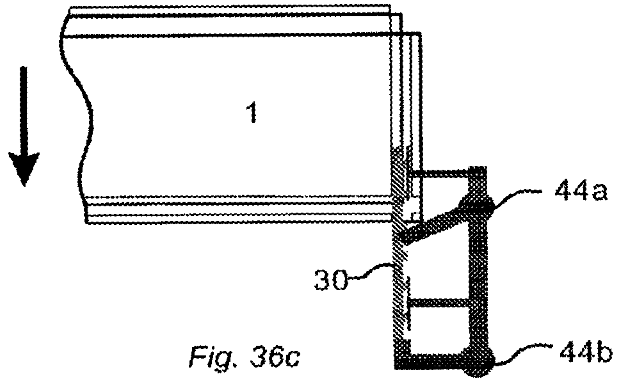
Figure 36C:
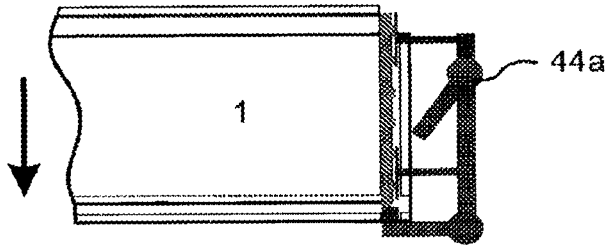
Figure 36D:
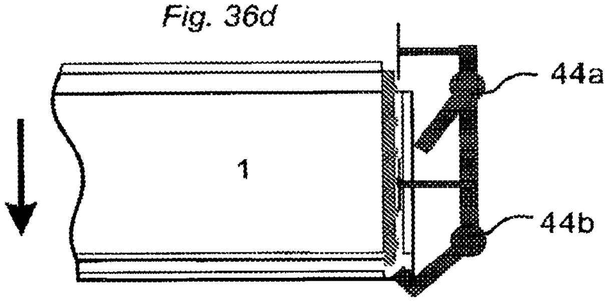

FIGS. 35*a*-35*c* show how a locking system according to FIG. 31*b* could be produced. A horizontal groove is formed by for example a rotating tool T1. The undercut groove 40*a*, which in this case has a vertical locking surface, could have any angle and could be formed by broaching where the panel is displaced relative a fixed tool that cuts like a knife with several small and slightly offset tool blades.

FIGS. 36*a*-36*d* show a method to insert a displaceable tongue 30 into a displacement groove 40 such that the tongue is inserted parallel to and along the groove. This method could be used for any tongues but is especially suitable for displaceable tongues with locking elements. The tongue 30 is preferably separated from a tongue blank and moved to a position in line with the displacement groove where it is held in a pre-determined position by one or several tongue holders 44*a,b*. The panel 1 is displaced essentially parallel with the displaceable tongue and an edge part is inserted into the displacement groove 40 and preferably pressed further into the groove by one or several guiding unites 45*a,b*. The displaceable tongue is released from the tongue holders 44*a,b* by preferably a panel edge that cause the holders to for example rotate away from the edge.

Figure 37A:
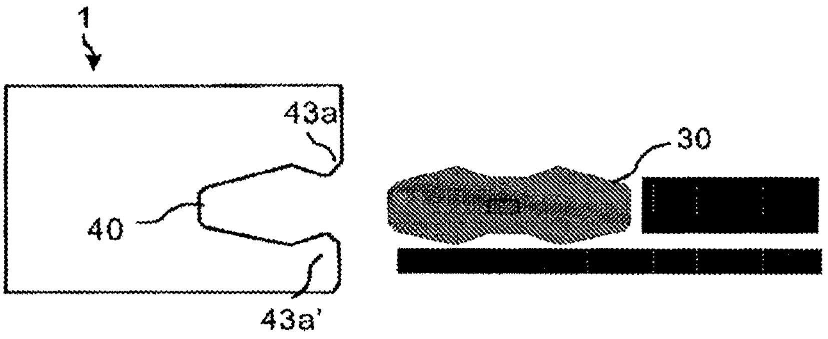
FIGS. 37*a*-37*c* show connection of a separate part.
Figure 37B:
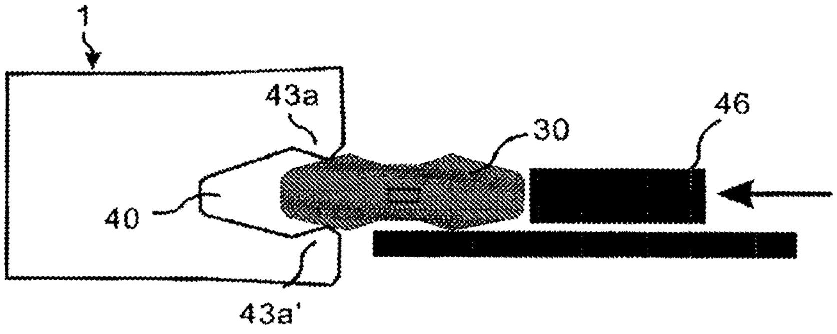
Figure 37C:
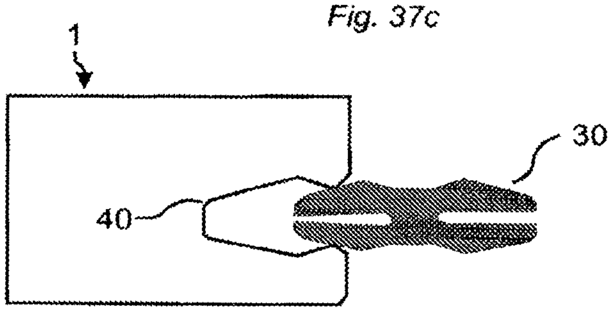

FIGS. 37*a*-37*c* show a method to insert a tongue into a groove such that the tongue is snapped essentially perpendicularly into a groove. The whole tongue or only a part of the tongue could be inserted with snapping whereby a pusher 46 presses an edge of the tongue 30 into a part of the groove 40. A remaining part of the tongue could be inserted with the above-described method along the joint. The snapping connection could be obtained by flexible lips on the panel edge as shown in FIG. 37*b* and/or by flexible lips on the tongue 30 as shown in FIG. 37*c*.

Figure 38A:
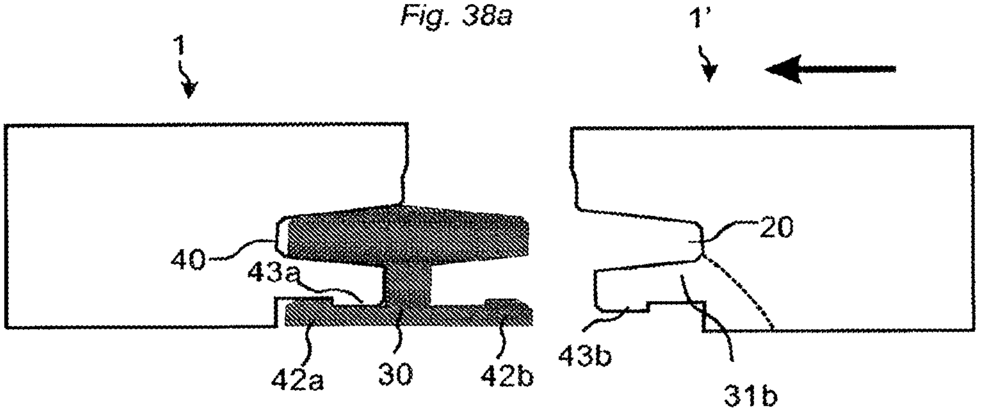
FIGS. 38*a*-38*c* show connection of locking systems comprising a separate flexible part.
Figure 38B:
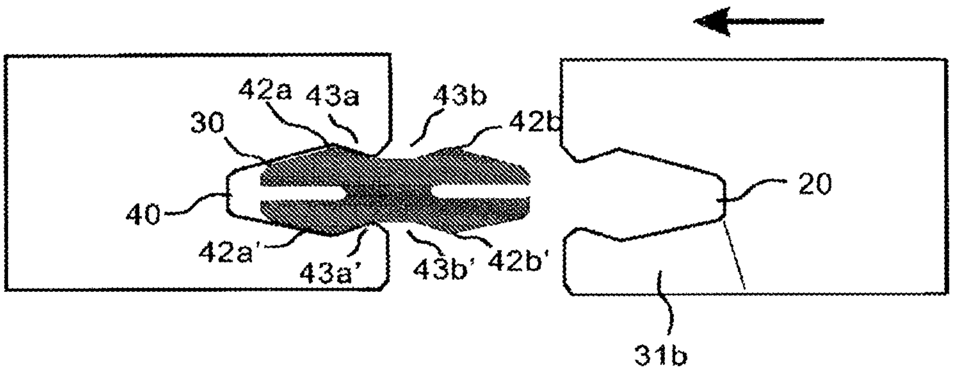
Figure 38C:
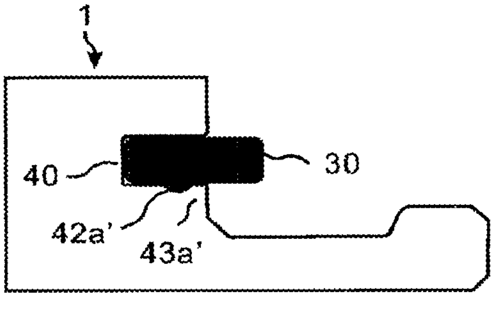

FIGS. 38*a* and 38*b* show that a locking system according to the invention could be locked such that the panel edges are moved essentially horizontally towards each other. They could thereafter be locked with a side push. The locking systems could also be locked with only a snapping if the displaceable tongue prior to locking is arranged in a position where the protrusions are aligned in front of each other. Such an installation could for example be used when angling of a panel is not possible. FIG. 38*c* shows that locking elements 42*a*',43*a*' could be used to replace the friction connection and to keep the tongue into the groove 40 during installation.

Figure 39A:
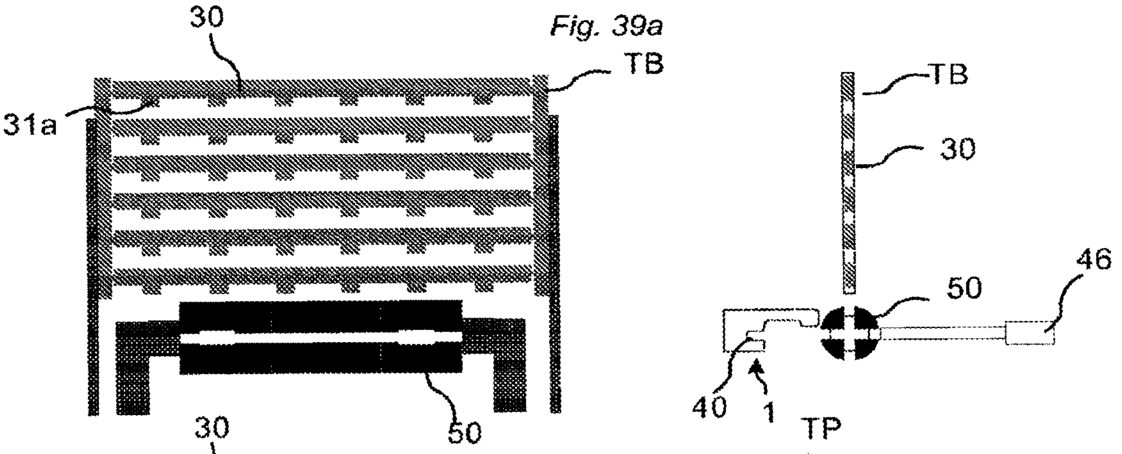
FIGS. 39*a*-39*d* show connection of a separate part with vertical feeding of tongue blanks.
Figure 39B:
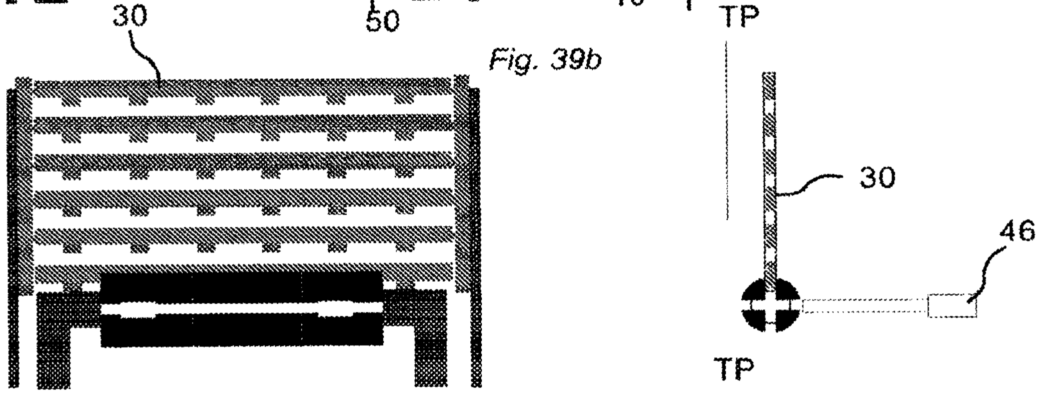
Figure 39C:
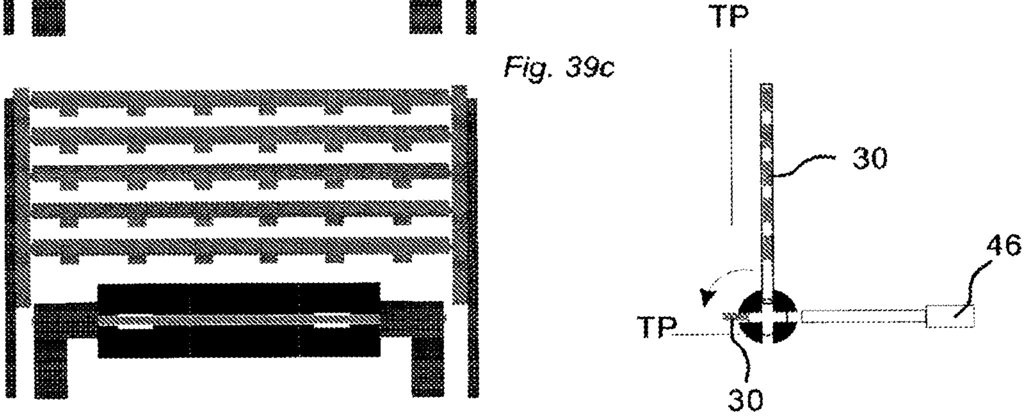
Figure 39D:
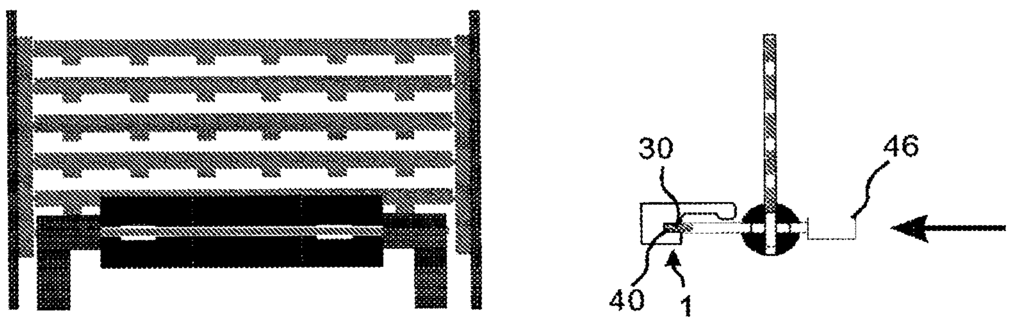

FIGS. 39*a*-39*d* show another method to connect a separate element, preferably a tongue, into a groove. It is an advantage if tongues 30 could be fed vertically towards a panel edge and connected with a horizontal pusher. The problem is that some tongues, especially displaceable and flexible tongues that have a rather complex three dimensional form, could only be produced with a cross section having a main tongue plane TP, defined as a plane in which the tongue is intended to be located horizontally into a groove, that is located in the same plane as the main plane of the tongue blank TB. This problem could be solved as follows. A tongue blank TB is according to the invention positioned and displaced essentially vertically, or essentially perpendicularly to the position of the panel 1, towards a turning unit 50 as shown in FIG. 39*a*. The tongue is connected to the turning unite 50 and separated from the tongue blank, as shown in FIG. 39*b*. The turning unit 50 is thereafter turned about 90 degrees in order to bring the tongue 30 with its main tongue plane TP in a horizontal position such that it could be connected into a groove 40 of a panel 1 edge by a pusher 46 that pushes the tongue 30 out from the turning unit and into the groove 40. This is shown in FIGS. 39*c* and 39*d*. The panel 1 is shown in a horizontal position with the front face pointing downwards.

Figure 40A:
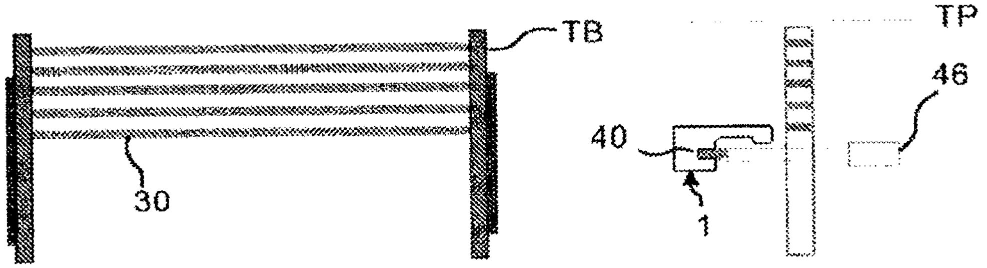
FIGS. 40*a*-40*d* show connection of a separate part with turning.

A displaceable tongue 30 with protrusions could have a rather simple cross section and could easily be produced with a cross section and a main tongue plane TP perpendicular to the main plane of the tongue blank TB. This is shown in FIG. 40*a*. The connection into a groove is than very simple and the tongue 30 could easily be pushed into a groove 40 as shown in FIG. 40*a*.

Figure 40B:
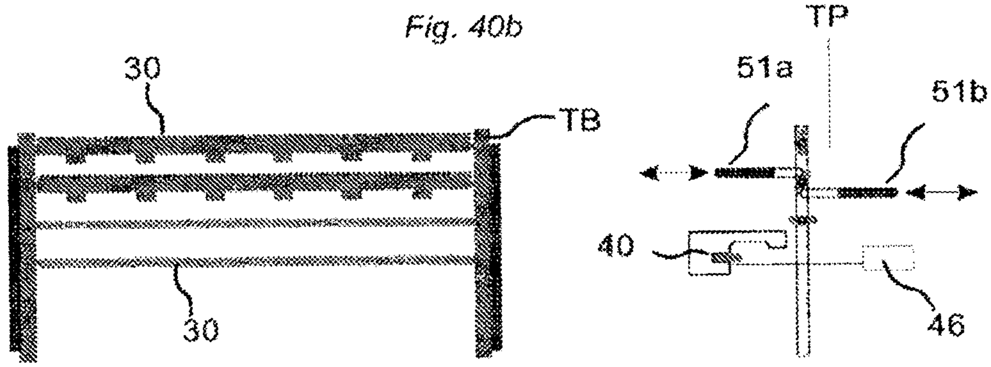

FIG. 40*b* show that any type of tongue 30 connected to a tongue blank TB could be turned prior to the separation from the tongue blank TB and prior to the connection into the groove 40. Such a turning could for example be made with two turning pushers 51*a*, 51*b* that press on the upper and lower part of the tongue 30.

Figure 40C:
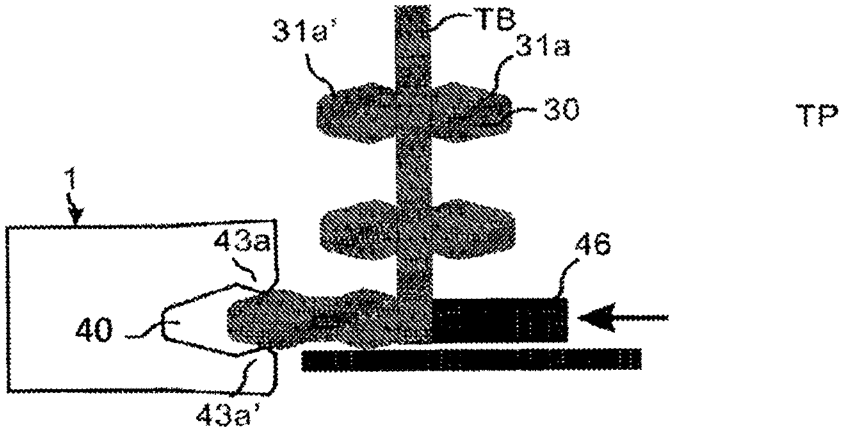
Figure 40D:
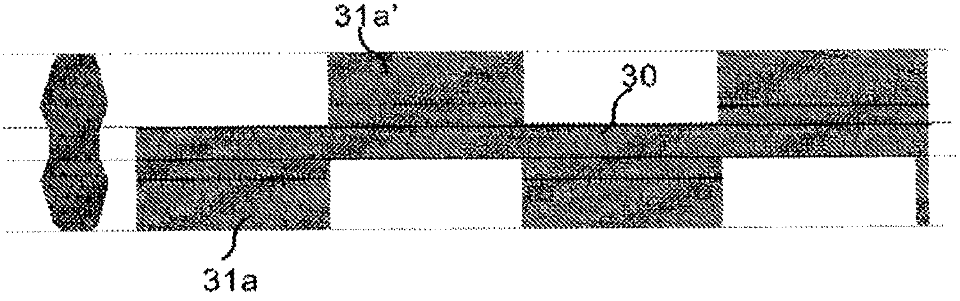

FIG. 40*c* show a tongue 30 that has a rather complex cross section and that is produced with the cross section and a main tongue plane TP perpendicular to the main plane of a tongue blank. The tongue 30 is connected with snapping. FIG. 40*d* show that such complex cross section could be produced with injection moulding if the tongue has protrusions 31*a*. 31*a*' in the inner and outer part.

Figure 41A:
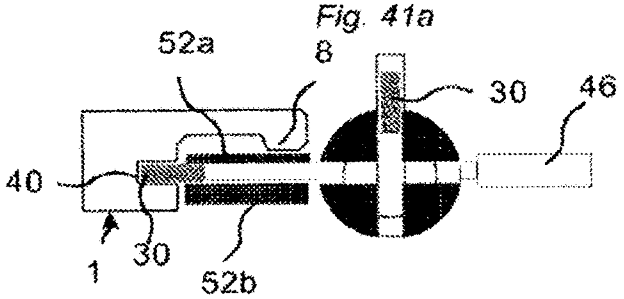
FIGS. 41*a*-41*e* show alternative methods to connect a separate part into an edge.

FIG. 41*a* show that a tongue 30 could be inserted into a groove 40 in a very controlled way if upper 52*a* and/or lower 52*b* guiding devices are used. The groove 40 must be positioned such that it gives space for the upper guiding device 52*a* to be located between the locking element 8 and the displacement groove 40. The panel is even in this figure shown with the front side downwards.

Figure 41B:
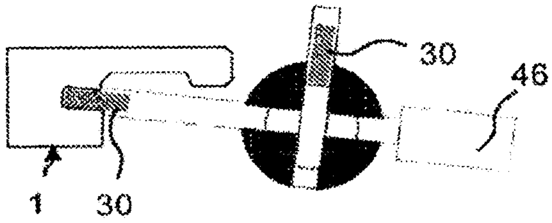

FIG. 41*b* show that more space could be created for the guiding device it the tongue 30 is inserted in a plane that is not parallel to the horizontal plane.

Figure 41C:
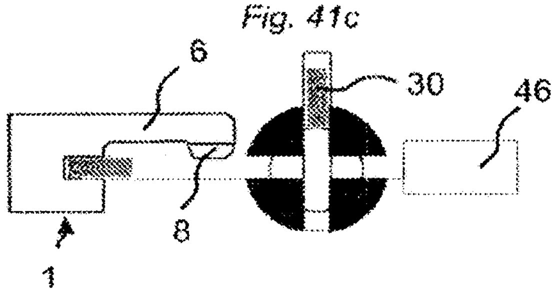
Figure 41D:
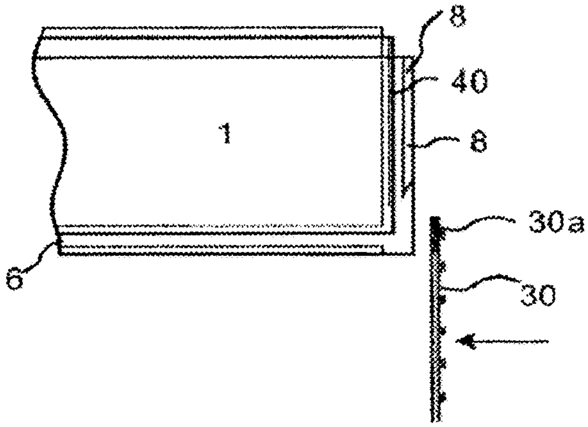
Figure 41E:
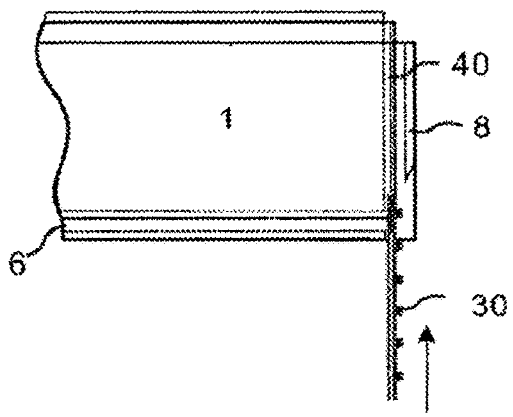

FIGS. 41*c*, 41*d*, and 41*e* show that the insertion of a tongue edge 30*a* into a groove 40 could be facilitated if a part of the locking element 8 of the strip 6 and/or of the tongue 30 and/or of the groove 40 is removed such that the tongue edge could be inserted into a part of the groove 40 with less or preferably even without any resistance. The remaining part of the tongue 30 could thereafter be inserted along the joint.

Figure 42A:
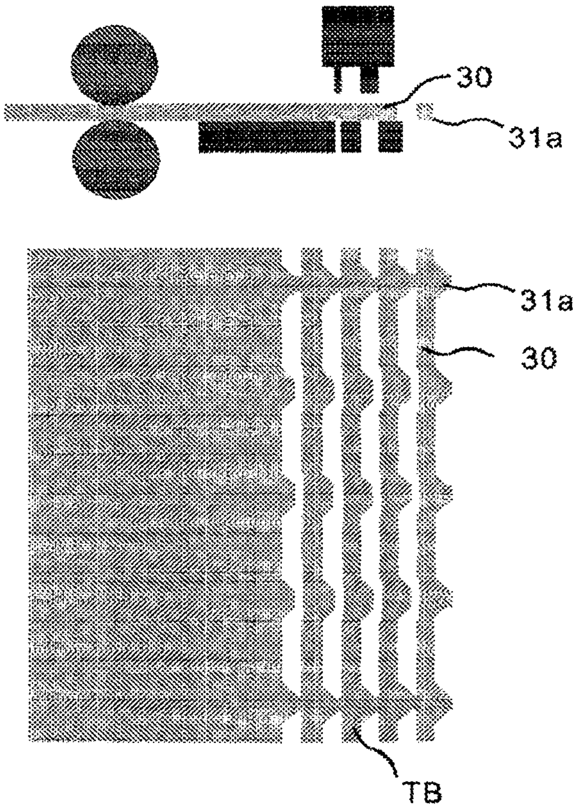
FIGS. 42*a*-42*b* show how a displaceable tongue could be formed by punching.
Figure 42B:
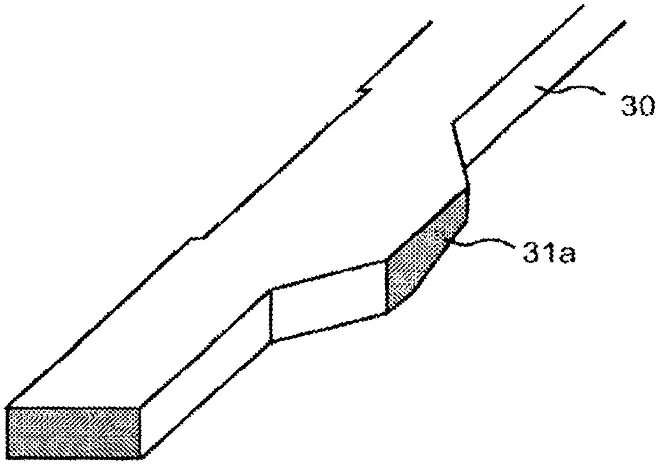

FIG. 42*a* show that a tongue blank TB with several displaceable tongues 30 comprising protrusions 31*a* could be formed by punching a sheet shaped material preferably consisting of HDF, compact laminate, plywood, wood or aluminium or any similar material. FIG. 42*b* show that punching could be used to compress the material and to form three-dimensional sections for example wedge shaped protrusions 31*a*.

Figure 43A:
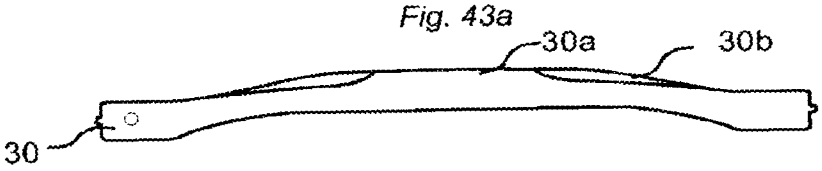
FIGS. 43*a*-43*g* show how principles of the invention could be used in prior art locking systems.
Figure 43B:
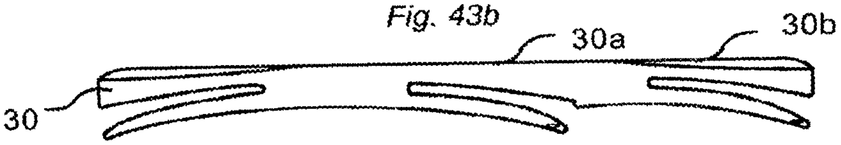
Figure 43C:
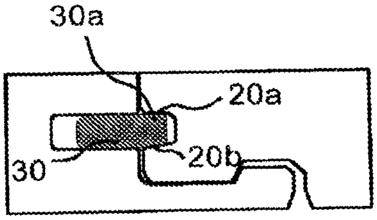
Figure 43D:
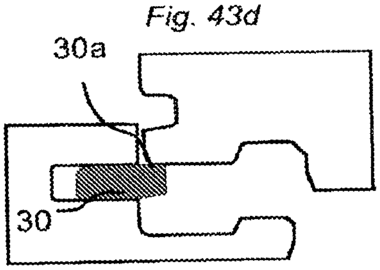
Figure 43E:
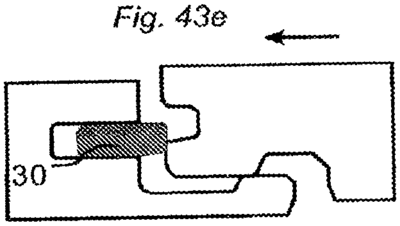
Figure 43F:
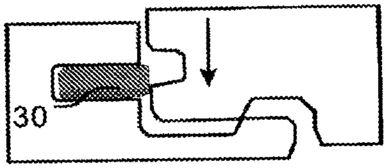
Figure 43G:
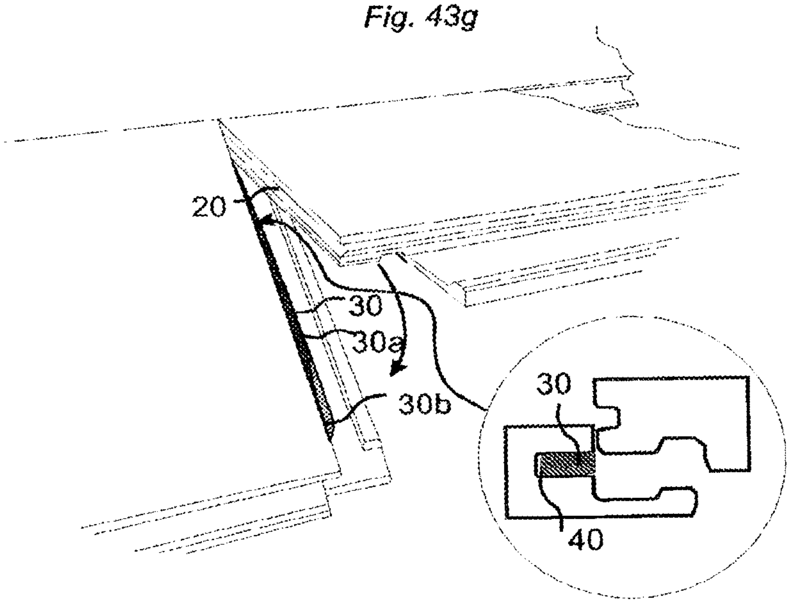

It could be an advantage in thin floorings or soft core material to use a separate or flexible tongue that locks against an upper and lower tongue groove surface as shown in FIG. 27*b* and that has an protruding part 30*a* that comprises essentially horizontal upper and lower contact surfaces. This principle could also be used in the known prior art systems, which uses a vertical snap folding method. A flexible tongue 30 could be formed with a protruding part 30*a* that locks against the upper and lower tongue groove surfaces 21*a* and 20*b* as shown in FIGS. 43*a*-43*c*. A locking system with such a tongue could be difficult or impossible to lock with a vertical motion as shown in FIG. 43*d*. It could however be locked with a combined horizontal and vertical motion as shown in FIGS. 43*e*, 43*f* and this method could be used to for example lock the first rows. A locking with vertical folding could however be made if the displaceable tongue comprises a bevel 30*b* at and edge part that during folding will push the protruding part 30*a* into the displacement groove as shown in FIG. 43*g*.

Figure 44A:
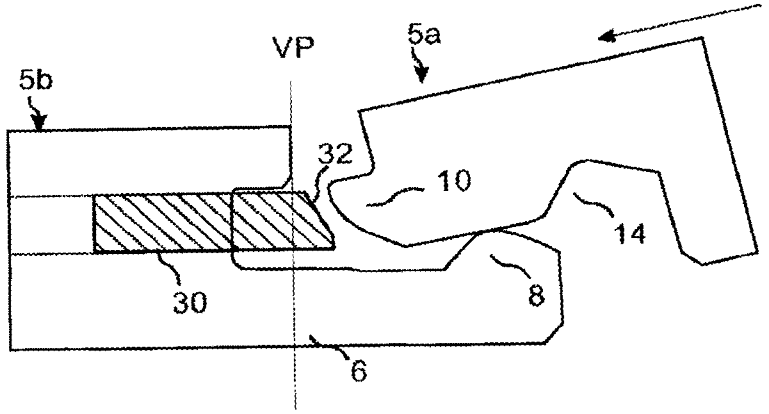
FIGS. 44*a*-44*d* show how an edge part of a displaceable tongue could be formed in order to reduce friction during locking.
Figure 44B:
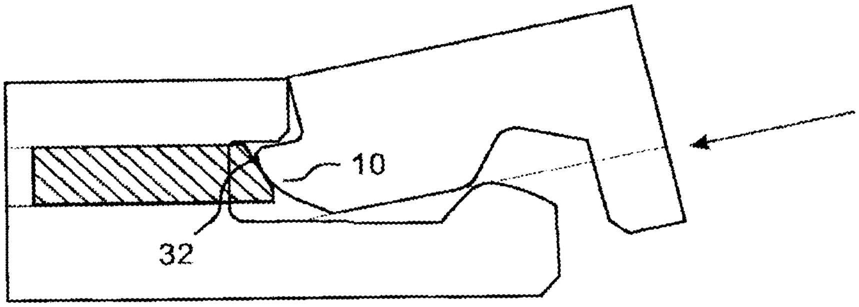
Figure 44C:
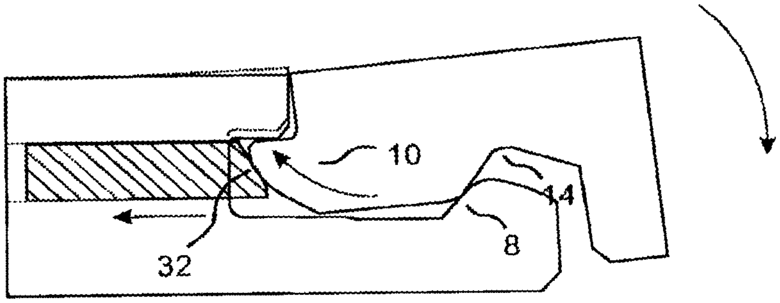
Figure 44D:
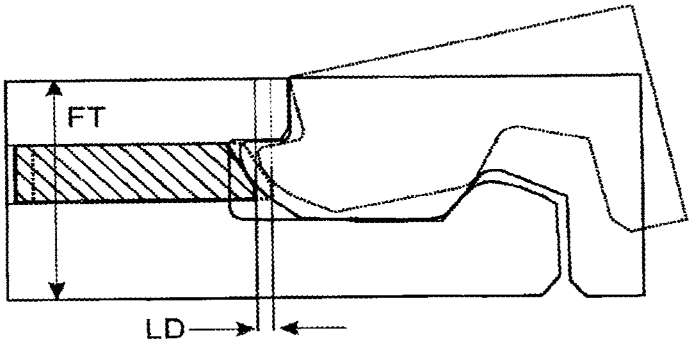
Figure 45A:
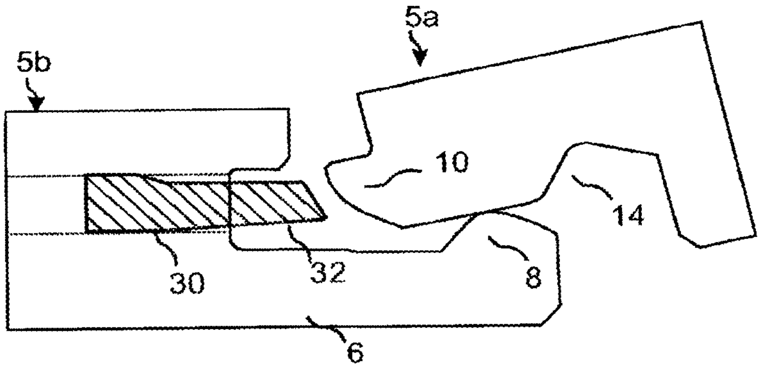
FIGS. 45*a*-45*d* show an embodiment with a flexible edge section.
Figure 45B:
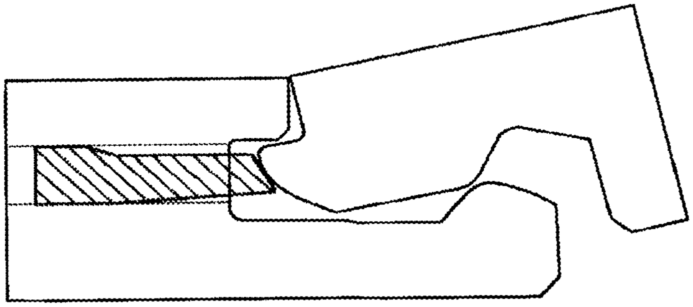
Figure 45C:
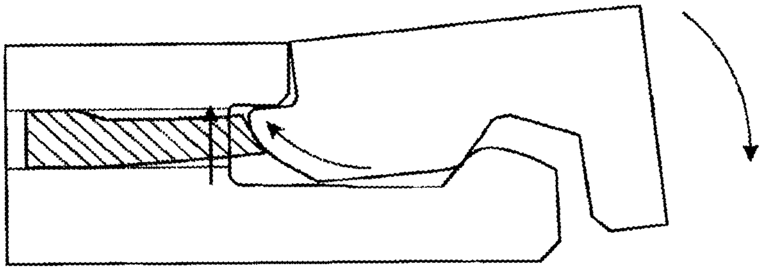
Figure 45D:
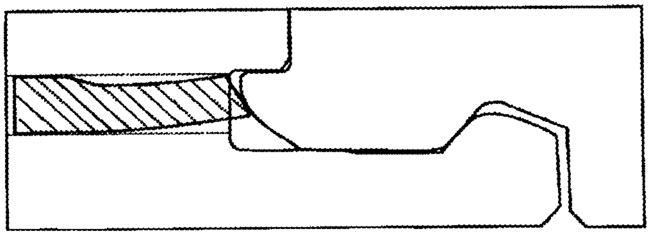

FIGS. 44*a*-44*d* how a long edge tongue 10 and a pressing edge of the displaceable tongue could be formed in order to reduce vertical friction during locking of the long edges and displacement of the displaceable tongue 30 along the short edge. The first step in a locking is generally a linear displacement in angled position of one long edge 5*a* towards a long edge 5*b* of a panel laying flat on the sub floor as shown in FIG. 44*a*. The tongue is preferably pushed an initial distance displacement distance, which could position the short edges in essentially the same plane if for example wedge shaped protrusions are used. The final locking is a turning action as shown in FIG. 44*c* when the locking element 8 and the locking groove 14 are in contact and facilitate the final locking displacement during which action the displaceable tongue 30 is displaced with a locking distance LD. This final displacement should preferably lock the short edges with a vertical pre tension where the panel edge of the groove pane 1' is pressed vertically against the upper part of the strip 6 at the strip panel 1 as for example shown in FIG. 27*b*. The friction between the pressing edge 32 and the tip of the tongue 10 could push the upper part of the edge upwards and create "overwood" at the joint edges in the corner portion between the long end short edges. This could be avoided if the pressing edge 32 is inclined vertically and inwardly against the vertical plane VP and/or rounded. A preferred inclination is 20-40 degrees. It is also an advantage if the tip of the tongue 10 that during locking is in contact with the pressing edge 32 is rounded. The locking distance LD is in the shown embodiment smaller than 0.10 times the floor thickness FT.

FIGS. 45*a*-45*d* show that the vertical friction forces could be reduced further with a flexible pressing edge 32 that could be displaced for example vertically during locking. This principle allows that the locking distance LD could be reduced to zero if required.

Figure 1A:
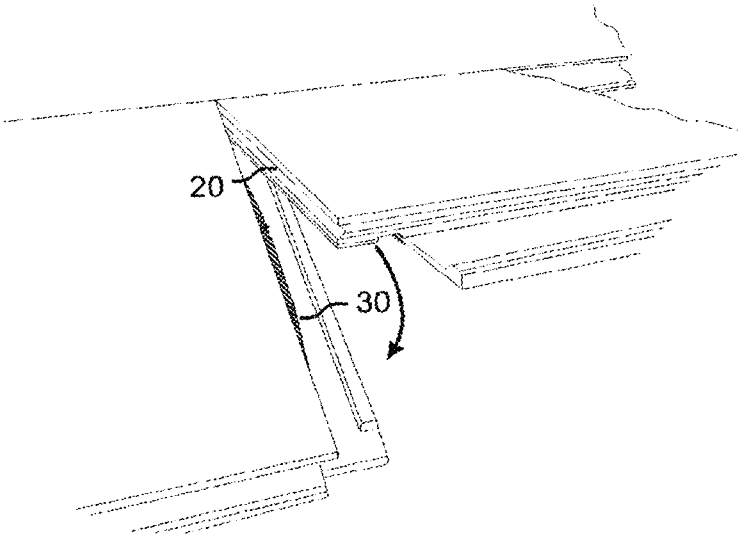
FIGS. 1*a*-1*d* illustrate prior art locking system.
Figure 1B:
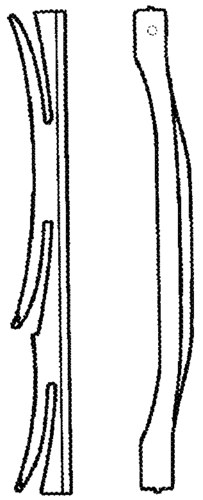
Figure 1C:
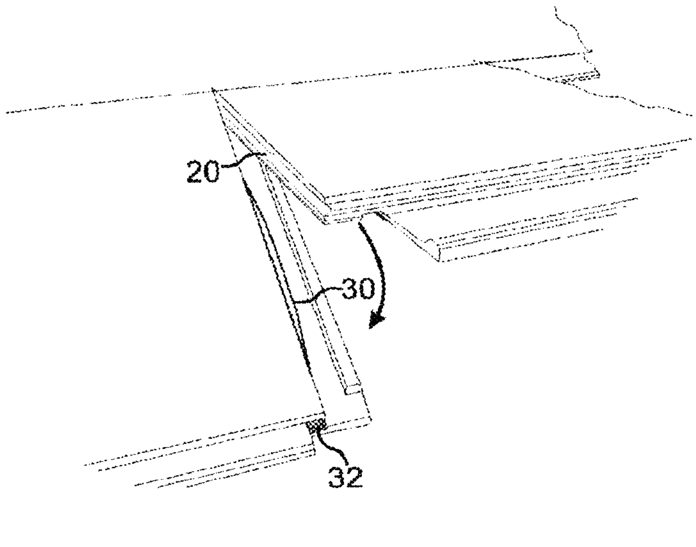
Figure 1D:
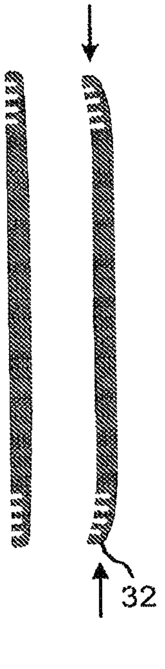
Figure 2A:
FIGS. 2*a*-2*c* show embodiments of prior art locking systems.
Figure 2B:
Figure 2C:
Figure 46A:
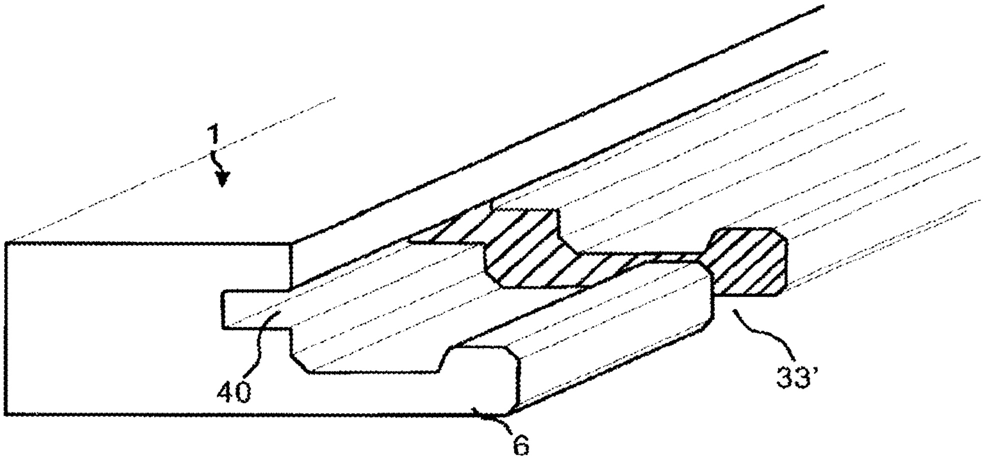
FIGS. 46*a*-46*b* show an embodiment with a cavity formed in a locking strip, which could be used to displace a tongue into an adjacent groove.
Figure 46B:
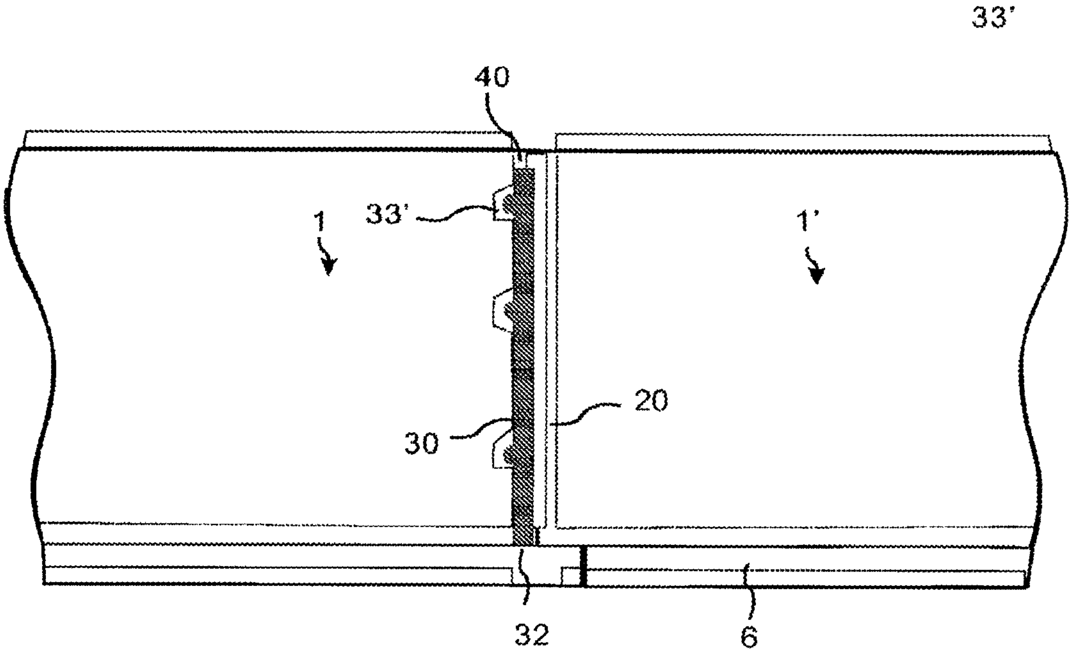

FIGS. 46*a*-46*b* show that the describe methods to form cavities in an edge could be used to displace the known tongue from one groove into an adjacent groove as described in FIG. 1*c*. One or several cavities 33' with horizontally extending inclined (FIG. 46*b*) or parallel (FIG. 47*c*) walls could be formed by cutting through the strip 6 and such an embodiment and production method is more cost efficient than the known methods where thin horizontally cutting saw blades are used to make a cavity.

Figure 47A:
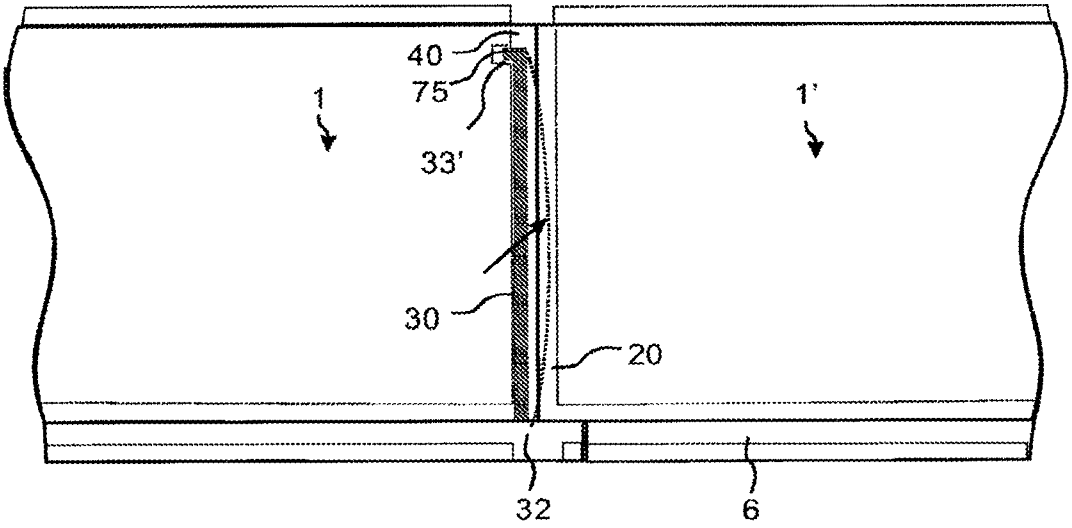
FIGS. 47*a*-47*c* show how cavities could be used to improve prior art locking systems.
Figure 47B:
Figure 47C:
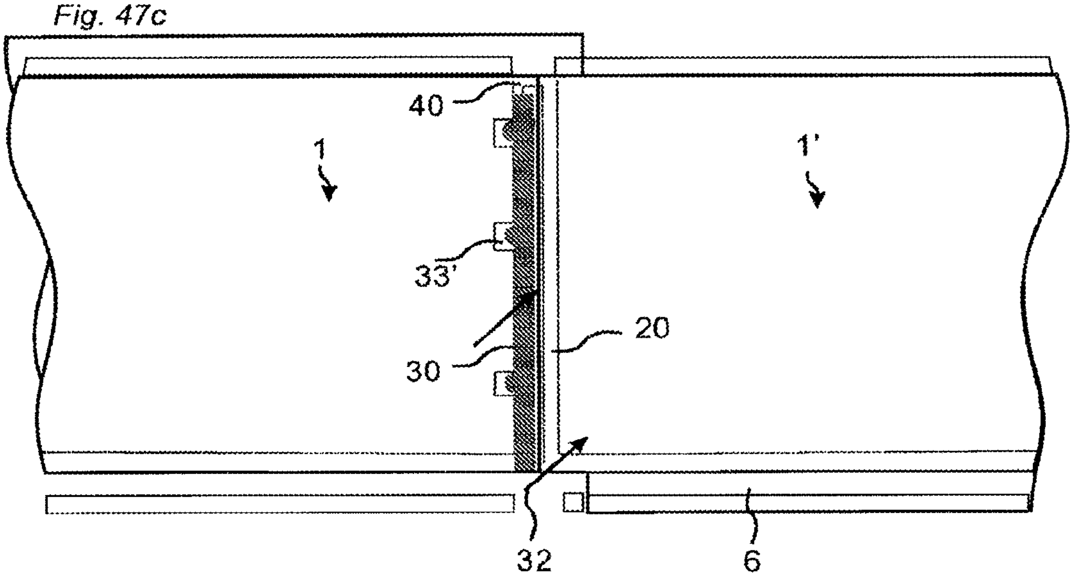

FIG. 47*a* shows that the vertical push folding principle utilizing a bendable tongue 30 that bends into a tongue groove 20 could be improved if a hook 75 is formed at an edge that cooperates with a cavity 33' and prevents displacement. This embodiment makes it possible to lock the first rows with the bending principle. FIG. 47*b* shows that the hook 75 could be flexible and could snap vertically into a protrusion formed preferably on the lower part of the displacement groove 40.

Figure 48A:
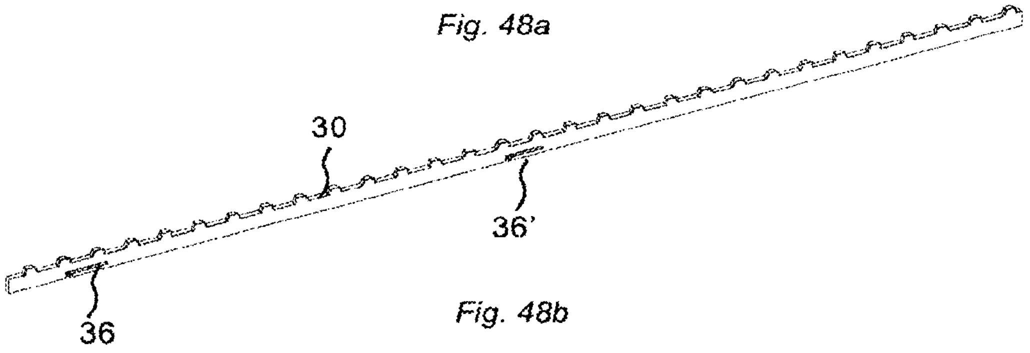
FIGS. 48*a*-48*h* show several embodiments of flexible and displaceable tongues.
Figure 48B:
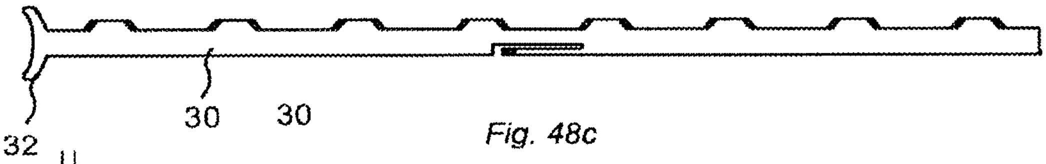
Figure 48C:
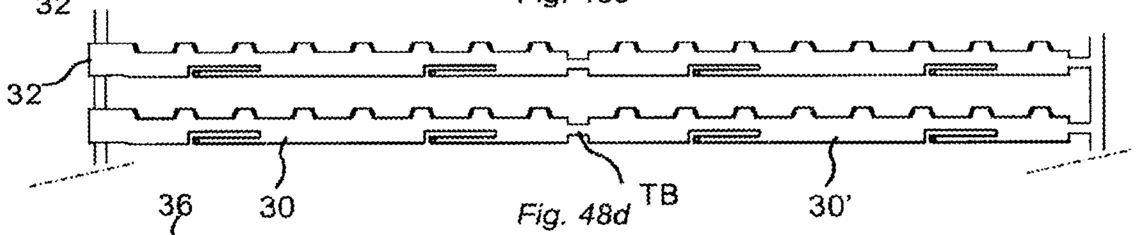
Figure 48D:
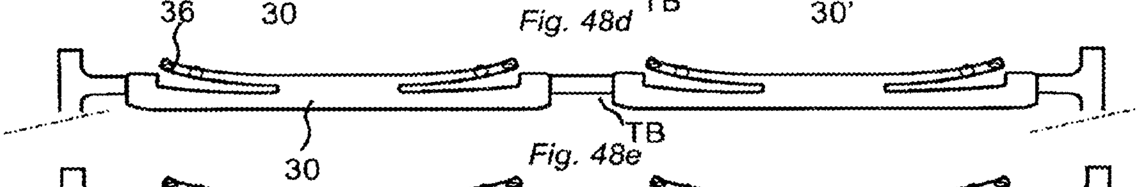
Figure 48E:
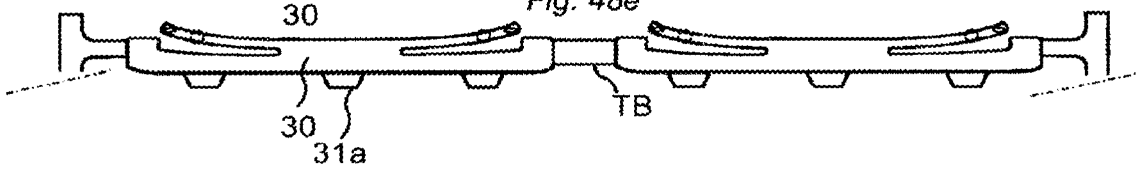
Figure 48F:
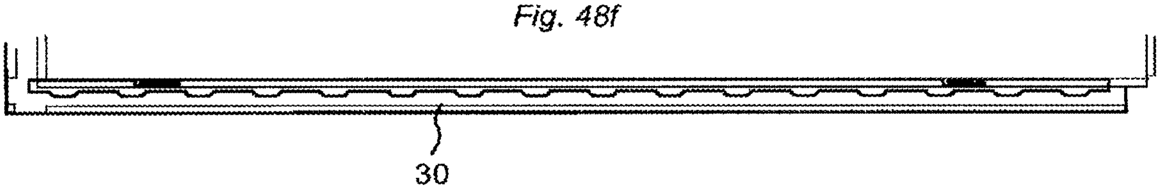
Figure 48G:
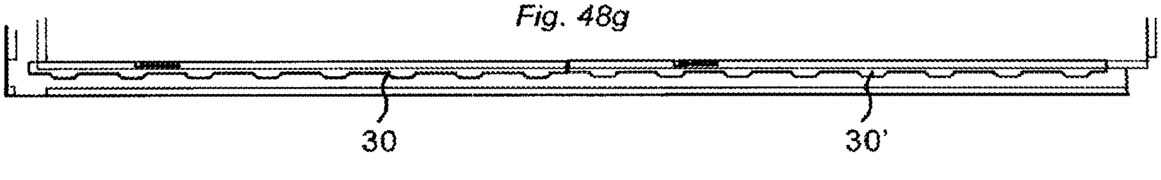
Figure 48H:
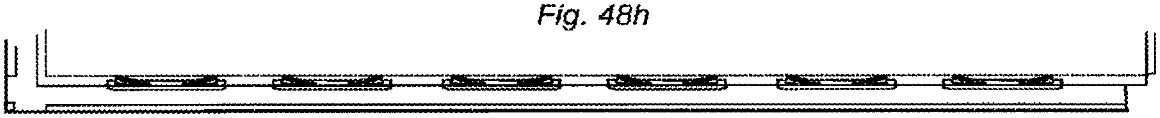

FIGS. 48*a*-48*h* show different embodiments of the invention. FIG. 48*a* shows a long displaceable tongue 30 with two friction connection that is suitable for tile shaped products having a width of 300-400 mm. It is possible to connect an edge over a considerable edge length even if the tongue is rather thin since it is positioned and guided inside the displacement groove and the tongue groove. The length is in the embodiment about 200 times the tongue thickness. FIG. 48*b* show a displaceable tongue 30 with a flexible pressing edge that could be used to create a pre-tension in the length direction after locking. FIG. 48*c* show a tongue blank TB, made with injection moulding comprising two rows of displaceable tongues 30, 30 with protrusions and cavities. This could reduce production costs considerably and the tongues could be produced in tongue blanks comprising for example 2*32=64 tongues with maintained tolerances in the level of a few hundreds or millimetres. All these shown embodiments have essentially equal intermediate distances between the protrusions and this facilitates rational production. It is obvious that the intermediate distances could vary along the joint. FIG. 48*d* shows that the known flexible tongue could be produced in blanks TB comprising two rows. FIG. 48*e* shows a displaceable tongue 30 with protrusions, which also is flexible and could flex partly inwardly into the displacement groove. This could be used to over bridge production tolerances and to create a vertical pre tension. FIGS. 48*f* and 48*g* show that an edge could comprise one displaceable tongue or two tongues 30, 30' or more. FIG. 48*f* shows several small flexible tongues 30, produced preferably in two-row blanks, could be used on an edge to lock with vertical snap folding. The advantage is that the same tongue could be used for all widths.

Figure 49A:
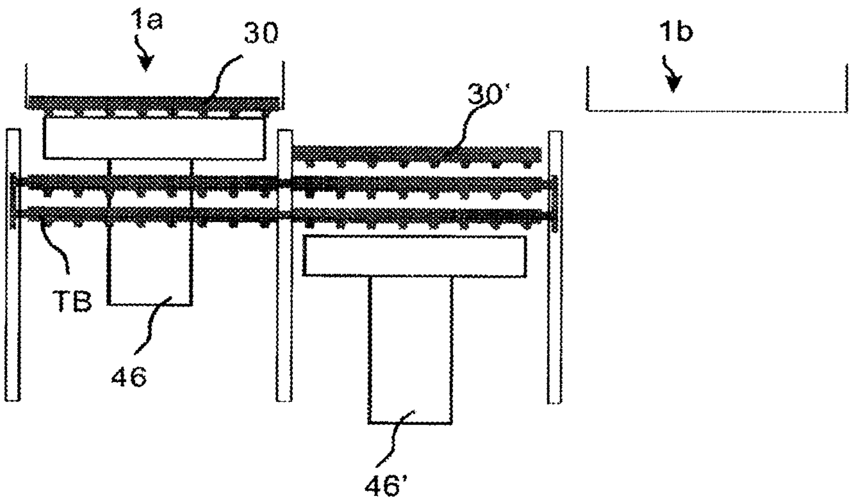
FIGS. 49*a*-49*b* show a method to connect separate parts to an edge with two pushers.
Figure 49B:
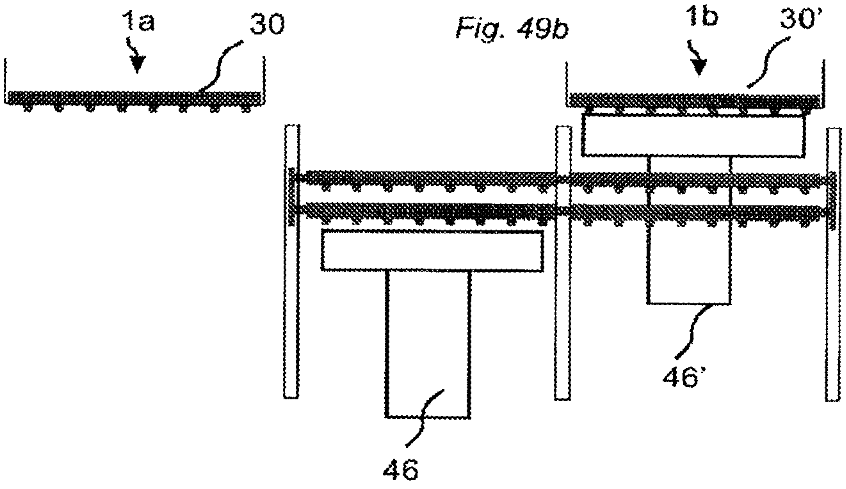

FIG. 49 shows an equipment to connect separate parts 30 to an edge of a floor panel. The equipment is designed to handle tongue blanks TB comprising tongues 30,30' located side by side and one after each other. It comprises at least two pushers 46 and 46. The first pusher 46 connects one of the tongues 30 to one panel edge 1*a* and the other pusher connects an adjacent tongue 30' in the same tongue row to a second panel edge 1*b*. This allows a very high speed and several separate parts could be connected to the same edge.

Figure 50A:
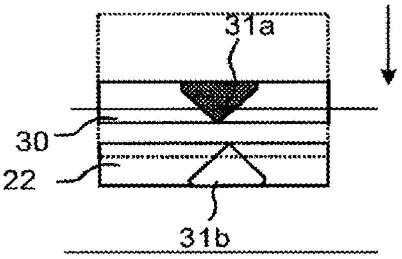
FIGS. 50*a*-50*g* show an embodiment with displaceable parts that are displaced to a correct position automatically during locking.
Figure 50B:
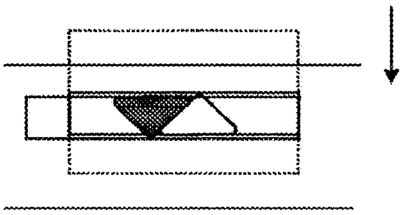
Figure 50C:
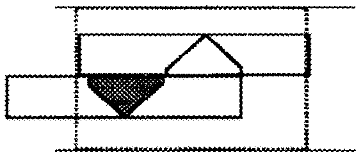
Figure 50D:
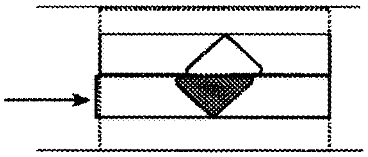
Figure 50E:
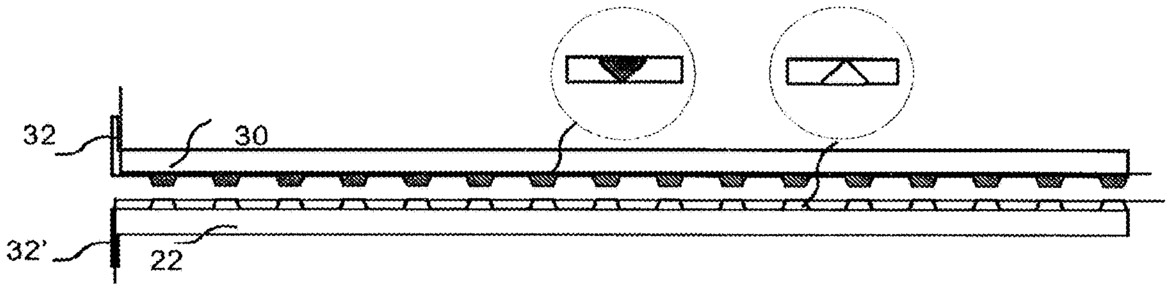
Figure 50F:
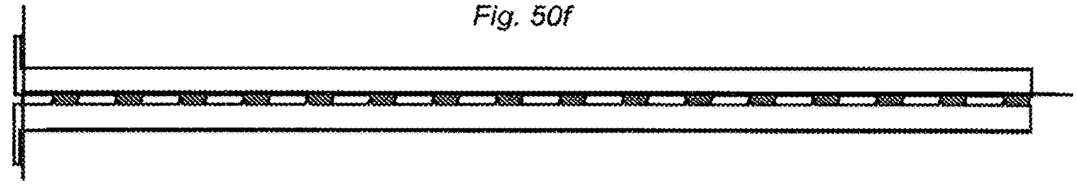
Figure 50G:
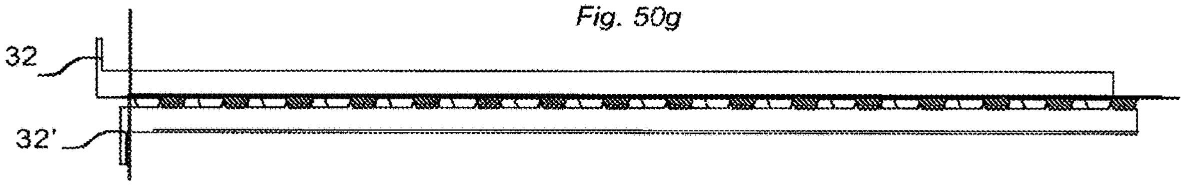

FIGS. 50*a*-50*g* show an embodiment with a displaceable tongue 30 in one edge comprising protrusions 31*a* and a displaceable tongue groove lip 22 in the adjacent edges comprising protrusions 31*b*. The protrusions are wedge formed with their wedge tips pointing at each other during the initial stage of the vertical folding. The wedge shaped protrusions will during locking automatically adjust the two displaceable parts such that the protrusions could pass each other vertically as shown in FIGS. 50*c*, 50*f*, and 50*g*. This will displace one of the two displaceable parts as shown in FIG. 50*g* which thereafter could be pushed back in order to lock the adjacent edges vertically and or horizontally. The two displaceable parts 30, 22 could be essentially identical.

Figure 51A:
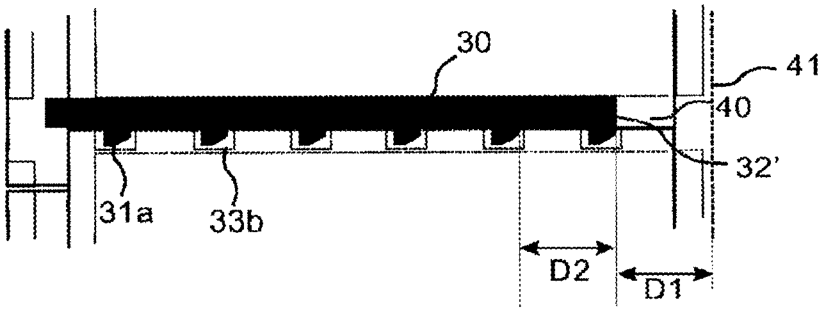
FIGS. 51*a*-51*e* show unlocking of a locking system with a displaceable tongue and locking with a displaceable tongue comprising only one protrusion.
Figure 51B:
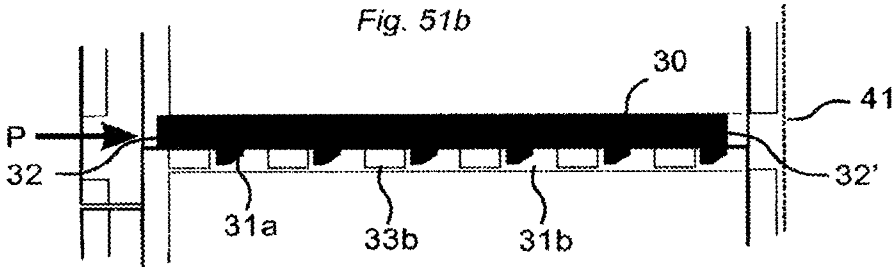
Figure 51C:
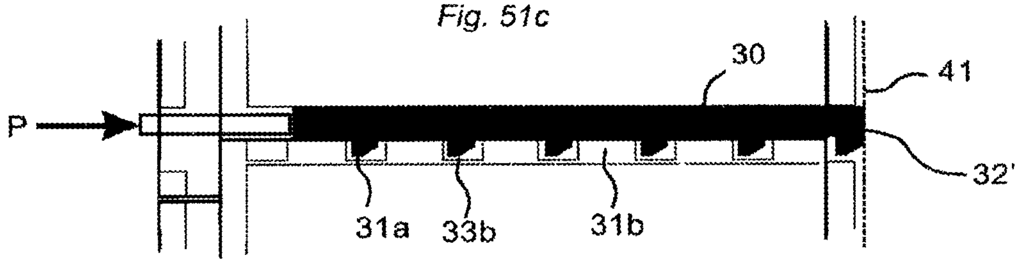

FIGS. 51*a*-51*c* show a method to unlock two panel edges that have been previously locked with a locking system according to the invention. FIG. 51*a* shows the unlocked position with tongue protrusions 31*a* located in or above the groove cavities 33*b*. FIG. 51*b* shows the locked position with the tongue protrusions 31*a* overlapping the groove protrusions 31*b*. The displaceable tongue 30 could be displaced one step further into the edge, as shown in FIG. 51*c*, such that the tongue protrusions 31*a* are located over the groove cavities 33*b*. It is preferred that the outer end 32' of the displaceable tongue 30 is designed such that the unlocked position is automatically obtained when this outer end 32' is in contact with a part of a long edge 41 of a panel installed in a previous row, preferably the inner part of the long edge tongue groove. It is preferred that the tongue initially is positioned such that the distance D1 between the outer end 32' and the contact point on the adjacent long edge is about the same as the distance D2 between two tongue protrusions 31*a*.

Figure 51D:
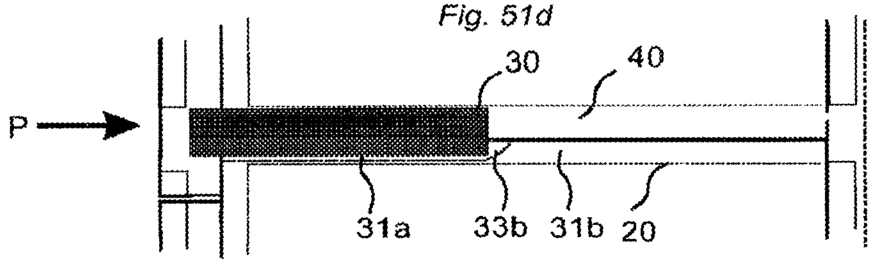

FIG. 51*d* shows an embodiment comprising a displaceable tongue 30 with only one protrusion 31*a* extending horizontally beyond the upper edge. The tongue groove 20 comprises one cavity 33*b* and one protrusion 31*b*. Such an embodiment could be used to lock vertically the middle section of the short edges of narrow panels. The long edges will lock the corner sections. It could preferably also be used in thick rigid panels and in panels with bevels on the surface edges.

Figure 51E:
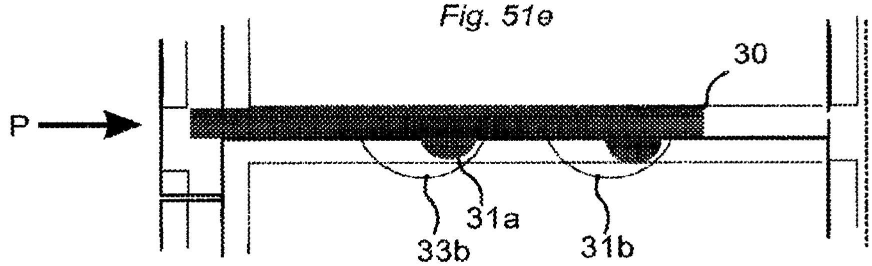

FIG. 51*e* shows an embodiment where the tongue cavities 33*b* are formed with thin and horizontally cutting saw blades.

All methods and principles described for vertical locking of floor panels could be used to lock edges horizontally. The locking element 8 of a strip and the locking groove 14 could for example be replaced with a displaceable locking element with protrusions and cavities that cooperate with protrusions and cavities on the locking groove and lock the panels horizontally.

The invention claimed is:

1. A tool configured to produce protrusions and cavities located after each other along an edge of a floor panel, wherein the tool is a screw shaped cutter with an axis of rotation parallel with the edge of the floor panel, wherein the tool comprises double screw rows of teeth, and wherein the double screw rows of teeth include teeth which are offset in a rotational direction of the tool and which are formed as a single monolithic piece of material.

2. The tool as claimed in claim 1, wherein a cutting diameter of the tool is smaller on an entrance side than on an opposite exit side.

3. The tool as claimed in claim 1, wherein a pitch of the tool defines the intermediate distance of the cavities and the protrusions.

4. The tool as claimed in claim 1, wherein the teeth include teeth made of industrial diamonds.

5. The tool as claimed in claim 1, wherein the tool comprises more than one entrance.

6. A tool configured to produce protrusions and cavities located after each other along an edge of a floor panel, wherein the tool is a screw shaped cutter with an axis of rotation parallel with the edge of the floor panel, the axis of rotation extending in an axial direction, wherein the tool comprises rows of teeth including first and second rows of teeth which are directly adjacent to one another, wherein all teeth of the tool that are directly adjacent in the axial direction are offset relative to each other in a rotational direction of the tool, and where a cutting diameter of the tool is smaller on an entrance side than on an opposite exit side.

7. A tool configured to produce protrusions and cavities located after each other along an edge of a floor panel, wherein the tool is a screw shaped cutter with an axis of rotation parallel with the edge of the floor panel, wherein the tool comprises rows of teeth including first and second rows of teeth which are directly adjacent to one another, wherein teeth of the first row of teeth contact teeth of the second row of teeth, and where a cutting diameter of the tool is smaller on an entrance side than on an opposite exit side.

8. The tool as claimed in claim 6, wherein a pitch of the tool defines the intermediate distance of the cavities and the protrusions.

9. The tool as claimed in claim 6, wherein the teeth of the rows of teeth include teeth made of industrial diamonds.

10. The tool as claimed in claim 6, wherein the tool comprises more than one entrance.

11. The tool as claimed in claim 6, wherein the rows of teeth include double screw rows of teeth.

12. The tool as claimed in claim 1, wherein the tool has a longitudinal side and an end side, wherein the axis of rotation extends through the end side, wherein the tool is configured to produce protrusions and cavities in the floor panel with the longitudinal side and not the end side.

13. The tool as claimed in claim 6, wherein the tool has a longitudinal side and an end side, wherein the axis of rotation extends through the end side, wherein the tool is configured to produce protrusions and cavities in the floor panel with the longitudinal side and not the end side.

14. The tool as claimed in claim 1, wherein the axis of rotation extends in an axial direction, and wherein all teeth of the tool that are directly adjacent in the axial direction are offset relative to each other in the rotational direction of the tool.

15. The tool as claimed in claim 6, wherein the first and second rows of teeth include teeth which are offset in the rotational direction of the tool and which are formed as a single monolithic piece of material.

* * * * *